(12) United States Patent
Takashima et al.

(10) Patent No.: US 8,116,615 B2
(45) Date of Patent: Feb. 14, 2012

(54) INFORMATION PROCESSING APPARATUS, INFORMATION PROCESSING METHOD, PROGRAM STORAGE MEDIUM, AND PROGRAM

(75) Inventors: Yoshikazu Takashima, Tokyo (JP); Motoki Kato, Kanagawa (JP); Toshiya Hamada, Saitama (JP)

(73) Assignee: Sony Corporation, Tokyo (JP)

( * ) Notice: Subject to any disclaimer, the term of this patent is extended or adjusted under 35 U.S.C. 154(b) by 1327 days.

(21) Appl. No.: 10/519,034

(22) PCT Filed: Mar. 31, 2004

(86) PCT No.: PCT/JP2004/004648
§ 371 (c)(1),
(2), (4) Date: Dec. 22, 2004

(87) PCT Pub. No.: WO2004/095834
PCT Pub. Date: Nov. 4, 2004

(65) Prior Publication Data
US 2005/0244137 A1 Nov. 3, 2005

(30) Foreign Application Priority Data
Apr. 24, 2003 (JP) .............................. P2003-119332

(51) Int. Cl.
*H04N 5/76* (2006.01)
(52) U.S. Cl. ...................................................... 386/341
(58) Field of Classification Search ................... 386/52, 386/95, 125, 126
See application file for complete search history.

(56) References Cited

U.S. PATENT DOCUMENTS

| 5,784,528 | A | 7/1998 | Yamane et al. | |
| 6,181,872 | B1 | 1/2001 | Yamane et al. | |
| 6,341,199 | B1 * | 1/2002 | Okada et al. | 386/98 |
| 6,360,055 | B1 * | 3/2002 | Kaneshige et al. | 386/70 |
| 6,393,196 | B1 * | 5/2002 | Yamane et al. | 386/52 |
| 6,922,521 | B2 * | 7/2005 | Okada et al. | 386/83 |

(Continued)

FOREIGN PATENT DOCUMENTS
EP 0 847198 6/1998
(Continued)

OTHER PUBLICATIONS
U.S. Appl. No. 12/614,142, filed Nov. 6, 2009, Kato
(Continued)

*Primary Examiner* — William C Vaughn, Jr.
*Assistant Examiner* — Gelek W Topgyal
(74) *Attorney, Agent, or Firm* — Oblon, Spivak, McClelland, Maier & Neustadt, L.L.P.

(57) ABSTRACT

An information processing apparatus, an information processing method, a program storage medium, and a program for permitting the selection of a recording method maximizes the number of consecutive angle change units with priority given to an AV stream rate. A target AV stream rate is acquired, a jump distance is selected, and a jump time corresponding to the selected distance is acquired. A minimum angle change time is calculated from the jump time and a data read rate. The size of a minimum angle change unit is determined from the minimum angle change time and the AV stream rate. The number of minimum angle change units within the jump distance is calculated. The number of recordable angles is checked. The method is selected whereby the largest number of data items can be recorded consecutively on condition that the necessary number of angles is provided. This invention can be applied to recording/reproducing apparatuses.

27 Claims, 34 Drawing Sheets

U.S. PATENT DOCUMENTS

| | | | |
|---|---|---|---|
| 2004/0076402 A1* | 4/2004 | Jung et al. | 386/69 |
| 2004/0165862 A1* | 8/2004 | Jung et al. | 386/69 |
| 2004/0174795 A1* | 9/2004 | Jung et al. | 369/69 |

FOREIGN PATENT DOCUMENTS

| | | |
|---|---|---|
| JP | 2001-094901 | 4/2001 |
| JP | 2001-94904 | 4/2001 |
| JP | 2003-18549 | 1/2003 |
| JP | 2003-87742 | 3/2003 |
| WO | WO 97/13365 | 4/1997 |

OTHER PUBLICATIONS

Extended European Search Report issued Jan. 18, 2011, in Application No./Patent No. 10011416.4-1522/2265009.

U.S. Appl. No. 12/960,177, filed Dec. 3, 2010, Kato.

* cited by examiner

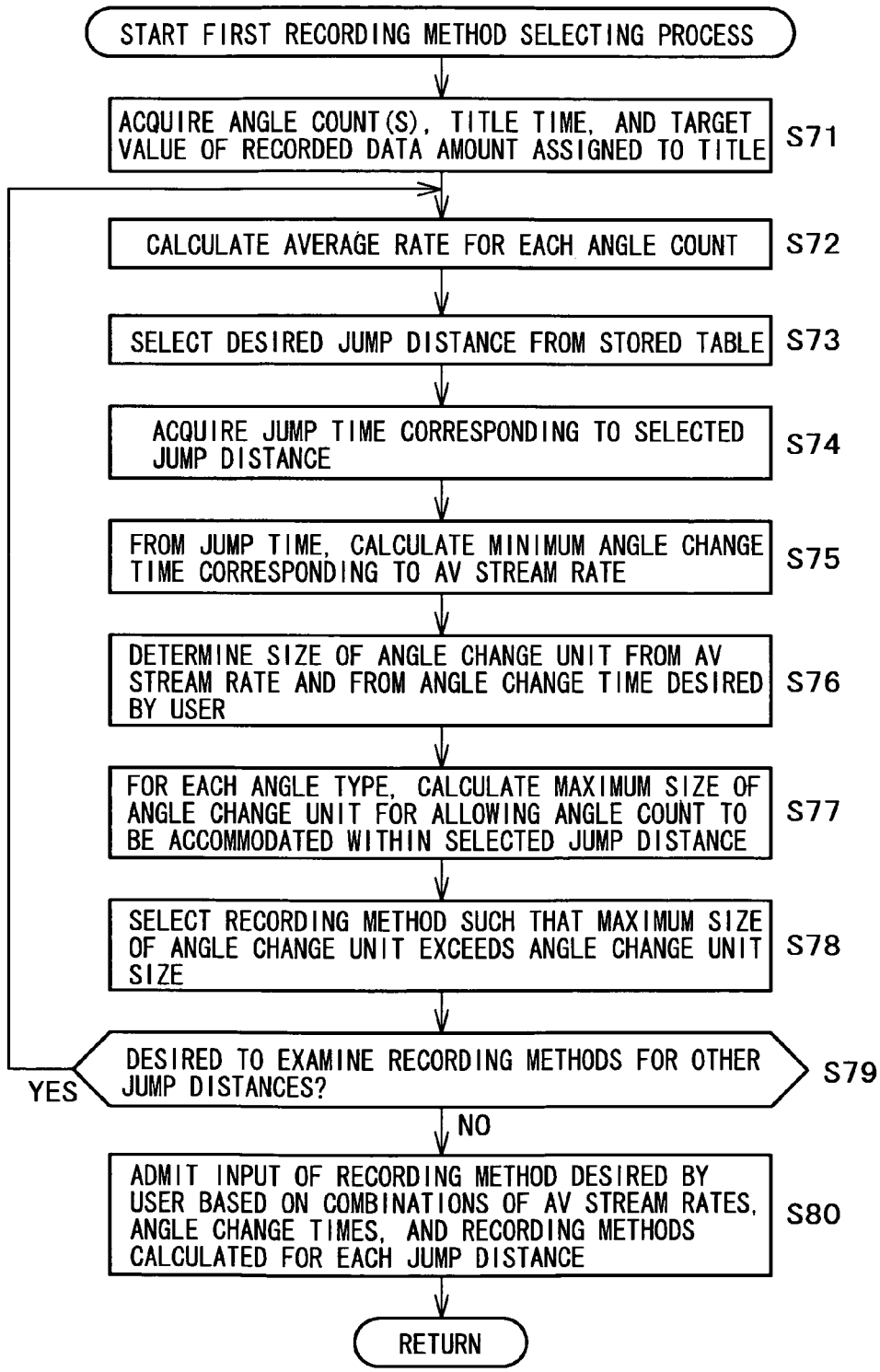

FIG. 19A

| Rmax [10^6 bps] | t[sec] | Tc[sec] | UNIT COUNT | | | | | | | | | |
|---|---|---|---|---|---|---|---|---|---|---|---|---|
| | | | ANGLE COUNT | | | | | | | | | |
| | | | Usize | Umax | | | | | | | | |
| | | | | M=1 | | | M=2 | | | M=4 | | |
| | | | | 3 | 9 | 20 | 3 | 9 | 20 | 3 | 9 | 20 |
| 10 | 0.157 | 0.500 | 0.721 | 2.441 | 0.610 | 0.257 | 1.221 | 0.305 | 0.128 | 0.610 | 0.153 | 0.064 |
| 20 | 0.203 | 0.500 | 1.317 | OK | NG | NG | OK | NG | NG | NG | NG | NG |
| 30 | 0.288 | 0.500 | 1.913 | OK | NG | NG | NG | NG | NG | NG | NG | NG |
| 40 | 0.494 | 0.500 | 2.509 | NG | NG | NG | NG | NG | NG | NG | NG | NG |

FIG. 19B

| Rmax [10^6 bps] | t[sec] | Tc[sec] | UNIT COUNT | | | | | | | | | |
|---|---|---|---|---|---|---|---|---|---|---|---|---|
| | | | ANGLE COUNT | | | | | | | | | |
| | | | Usize | Umax | | | | | | | | |
| | | | | M=1 | | | M=2 | | | M=4 | | |
| | | | | 3 | 9 | 20 | 3 | 9 | 20 | 3 | 9 | 20 |
| 10 | 0.204 | 0.500 | 0.721 | 9.766 | 2.441 | 1.028 | 4.883 | 1.221 | 0.514 | 2.441 | 0.610 | 0.257 |
| 20 | 0.264 | 0.500 | 1.317 | OK | OK | OK | OK | OK | NG | OK | NG | NG |
| 30 | 0.374 | 0.500 | 1.913 | OK | OK | NG | OK | NG | NG | OK | NG | NG |
| 40 | 0.640 | NG | - | NG | NG | NG | NG | NG | NG | NG | NG | NG |

FIG. 19C

| Rmax [10^6 bps] | t[sec] | Tc[sec] | UNIT COUNT | | | | | | | | | |
|---|---|---|---|---|---|---|---|---|---|---|---|---|
| | | | ANGLE COUNT | | | | | | | | | |
| | | | Usize | Umax | | | | | | | | |
| | | | | M=1 | | | M=2 | | | M=4 | | |
| | | | | 3 | 9 | 20 | 3 | 9 | 20 | 3 | 9 | 20 |
| 10 | 0.266 | 0.500 | 0.125 | 19.531 | 4.883 | 2.056 | 9.766 | 2.441 | 1.028 | 4.883 | 1.221 | 0.514 |
| 20 | 0.344 | 0.500 | 0.945 | OK | OK | OK | OK | OK | OK | OK | OK | OK |
| 30 | 0.488 | 0.500 | 1.868 | OK | OK | OK | OK | OK | OK | OK | OK | NG |
| 40 | 0.836 | NG | - | NG | NG | NG | NG | NG | NG | NG | NG | NG |

FIG. 20

| UNIT COUNT | M=1 | | | | M=2 | | | | M=4 | | | |
|---|---|---|---|---|---|---|---|---|---|---|---|---|
| ANGLE COUNT | 3 | 9 | | 20 | 3 | 9 | | 20 | 3 | 9 | | 20 |
| DATA ITEM COUNT (FOR 2 HOURS) | 43200 | 129600 | | 288000 | 21600 | 64800 | | 144000 | 10800 | 32400 | | 72000 |
| DATA ITEM COUNT (FOR 4 HOURS) | 86400 | 259200 | | 576000 | 43200 | 129600 | | 288000 | 21600 | 64800 | | 144000 |

F I G. 2 1
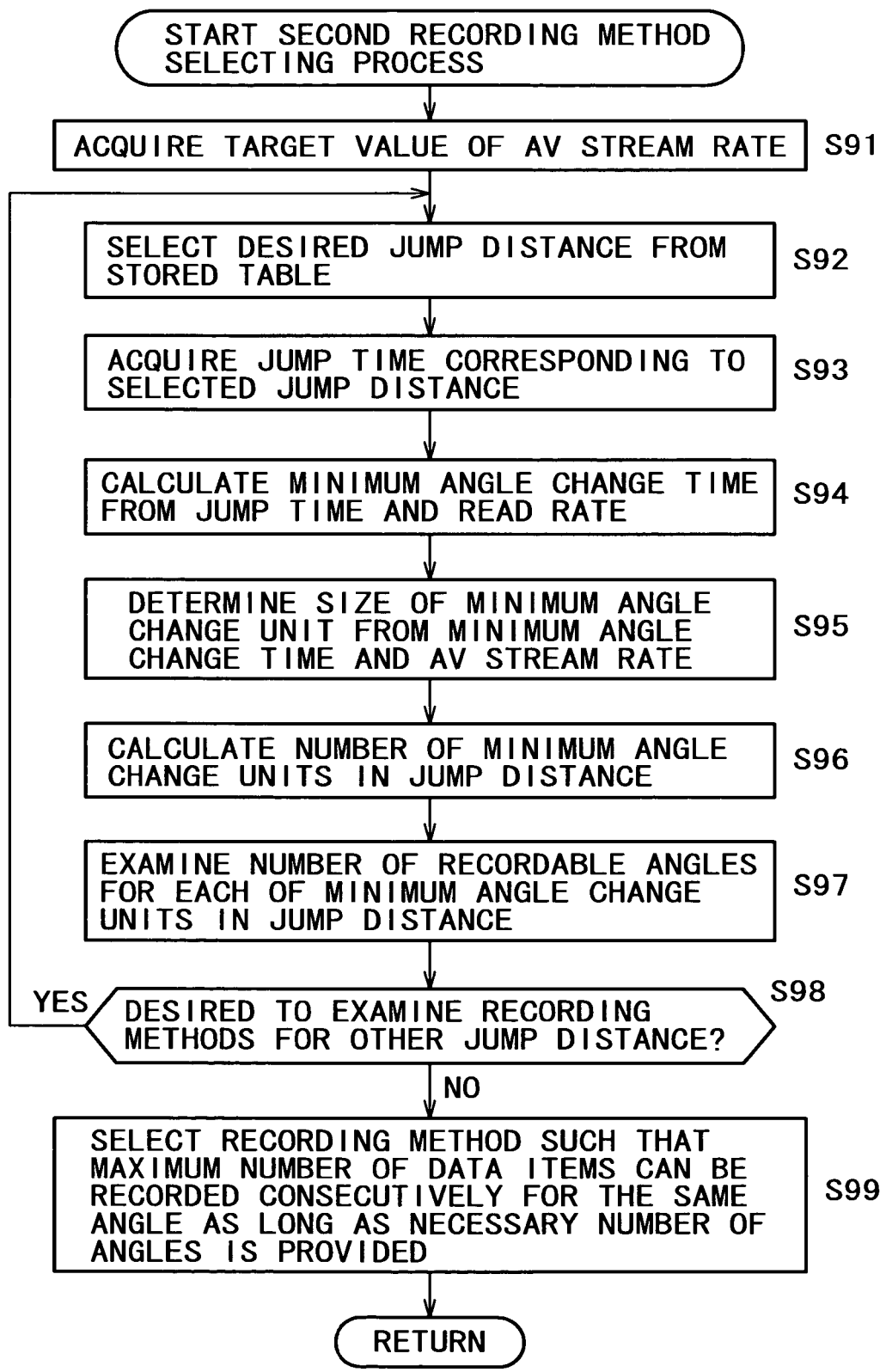

FIG. 22A

| Rmax [$10^6$ bps] | 10 | 20 | 30 | 40 |
|---|---|---|---|---|
| t [sec] | 0.157 | 0.203 | 0.288 | 0.494 |
| Usize [$2^{20}$ byte] | 0.31 | 0.61 | 1.15 | 2.48 |
| j/Usize | 31 | 16 | 8 | 3 |
| MAX ANGLE COUNT FOR M=1 | 16 | 9 | 5 | 2 |
| MAX ANGLE COUNT FOR M=2 | 8 | 5 | 3 | 1 |
| MAX ANGLE COUNT FOR M=4 | 4 | 3 | 2 | 1 |

FIG. 22B

| Rmax [$10^6$ bps] | 10 | 20 | 30 | 40 |
|---|---|---|---|---|
| t [sec] | 0.204 | 0.264 | 0.374 | 0.640 |
| Usize [$2^{20}$ byte] | 0.37 | 0.75 | 1.46 | 3.18 |
| j/Usize | 106 | 51 | 26 | 12 |
| MAX ANGLE COUNT FOR M=1 | 54 | 26 | 14 | 7 |
| MAX ANGLE COUNT FOR M=2 | 27 | 13 | 7 | 4 |
| MAX ANGLE COUNT FOR M=4 | 14 | 7 | 4 | 2 |

FIG. 22C

| Rmax [$10^6$ bps] | 10 | 20 | 30 | 40 |
|---|---|---|---|---|
| t [sec] | 0.266 | 0.344 | 0.488 | 0.836 |
| Usize [$2^{20}$ byte] | 0.44 | 0.95 | 1.87 | 4.11 |
| j/Usize | 176 | 82 | 41 | 19 |
| MAX ANGLE COUNT FOR M=1 | 89 | 42 | 21 | 10 |
| MAX ANGLE COUNT FOR M=2 | 45 | 21 | 11 | 5 |
| MAX ANGLE COUNT FOR M=4 | 23 | 11 | 6 | 3 |

FIG. 24A

| Rmax [10⁶ bps] | t [sec] | UNIT COUNT / ANGLE COUNT / Usize | Umax M=1 | | | Umax M=2 | | | Umax M=4 | | |
|---|---|---|---|---|---|---|---|---|---|---|---|
| | | | 3 | 9 | 20 | 3 | 9 | 20 | 3 | 9 | 20 |
| | | | 2.441 | 0.610 | 0.257 | 1.221 | 0.305 | 0.128 | 0.610 | 0.153 | 0.064 |
| 10 | 0.157 | 0.312 | OK | OK | NG | OK | NG | NG | OK | NG | NG |
| 20 | 0.203 | 0.610 | OK | OK | NG | OK | NG | NG | OK | NG | NG |
| 30 | 0.288 | 1.155 | OK | NG | NG | OK | NG | NG | NG | NG | NG |
| 40 | 0.494 | 2.479 | NG | NG | NG | NG | NG | NG | NG | NG | NG |

FIG. 24B

| Rmax [10⁶ bps] | t [sec] | UNIT COUNT / ANGLE COUNT / Usize | Umax M=1 | | | Umax M=2 | | | Umax M=4 | | |
|---|---|---|---|---|---|---|---|---|---|---|---|
| | | | 3 | 9 | 20 | 3 | 9 | 20 | 3 | 9 | 20 |
| | | | 4.883 | 1.221 | 0.514 | 2.441 | 0.610 | 0.257 | 1.221 | 0.305 | 0.128 |
| 10 | 0.204 | 0.368 | OK | OK | OK | OK | OK | NG | OK | NG | NG |
| 20 | 0.264 | 0.754 | OK | OK | NG | OK | NG | NG | OK | NG | NG |
| 30 | 0.374 | 1.461 | OK | NG | NG | OK | NG | NG | NG | NG | NG |
| 40 | 0.640 | 3.178 | OK | NG | NG | NG | NG | NG | NG | NG | NG |

FIG. 24C

| Rmax [10⁶ bps] | t [sec] | UNIT COUNT / ANGLE COUNT / Usize | Umax M=1 | | | Umax M=2 | | | Umax M=4 | | |
|---|---|---|---|---|---|---|---|---|---|---|---|
| | | | 3 | 9 | 20 | 3 | 9 | 20 | 3 | 9 | 20 |
| | | | 9.766 | 2.441 | 1.028 | 4.883 | 1.221 | 0.514 | 2.441 | 0.610 | 0.257 |
| 10 | 0.266 | 0.125 | OK | OK | OK | OK | OK | OK | OK | OK | OK |
| 20 | 0.344 | 0.945 | OK | OK | OK | OK | OK | NG | OK | NG | NG |
| 30 | 0.488 | 1.868 | OK | OK | NG | OK | NG | NG | OK | NG | NG |
| 40 | 0.836 | 4.110 | OK | NG | NG | OK | NG | NG | NG | NG | NG |

```
PlayItem{
  if(MultiAngle type) {
    num_of_angles
    for(angle=0; angle<num_of_angles; angle++) {    → CLIP INFORMATION 1,
      Clip_information_file_name[angle]               CLIP INFORMATION 2,
    }                                                 CLIP INFORMATION 3,
    IN_time                                         → T1
    OUT_time                                        → T4
  }
}
```

FIG. 32

```
PlayItem{
    if(MultiAngle type) {
        num_of_angles
        Clip_information_file_name[angle]  → CLIP INFORMATION X
        IN_time                             → T1
        OUT_time                            → T4
    }
}
```

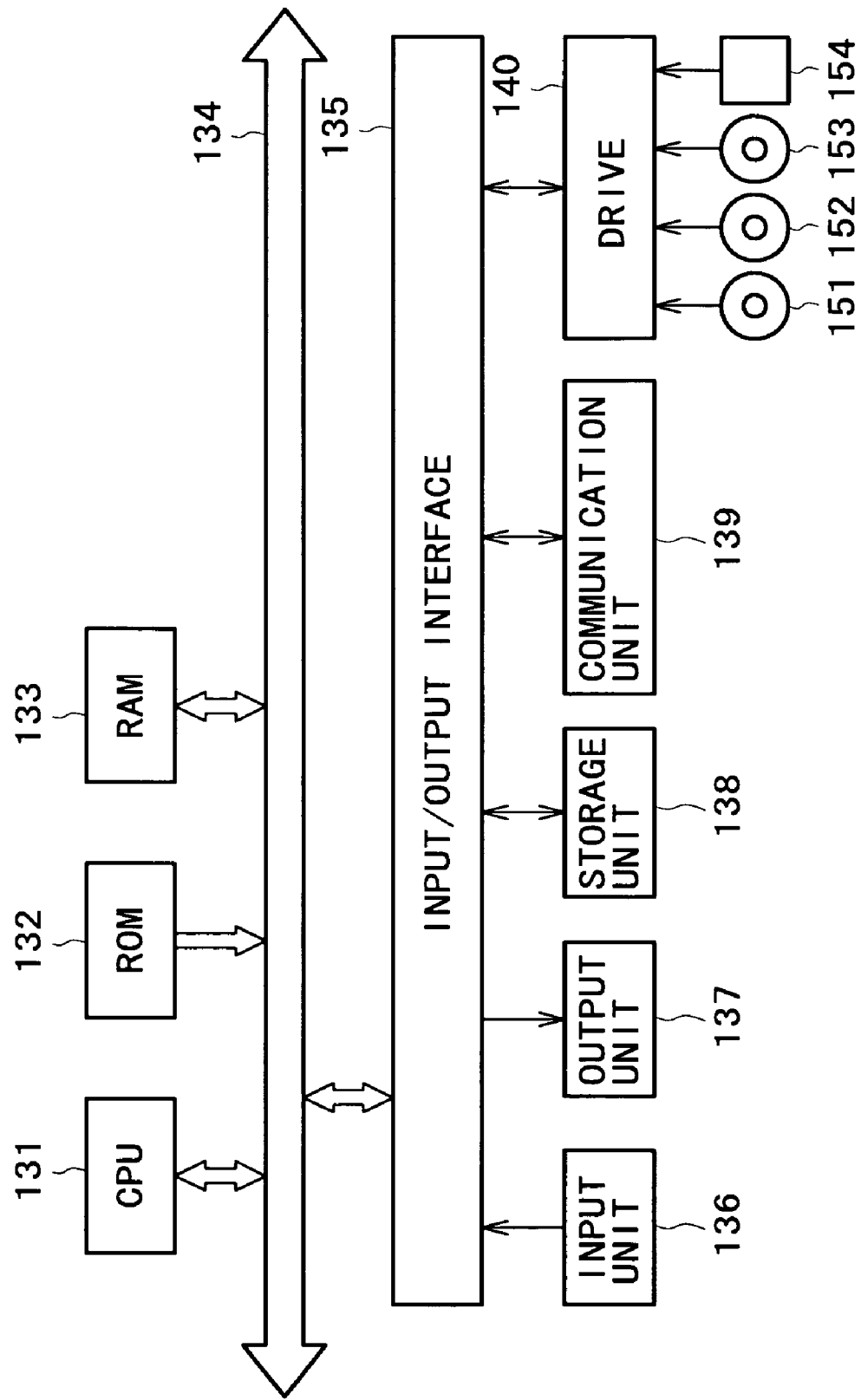

INFORMATION PROCESSING APPARATUS, INFORMATION PROCESSING METHOD, PROGRAM STORAGE MEDIUM, AND PROGRAM

TECHNICAL FIELD

The present invention relates to an information processing apparatus, an information processing method, a program storage medium, and a program. More particularly, the invention relates to an information processing apparatus, an information processing method, a program storage medium, and a program for recording data having a plurality of reproduction paths to a recording medium.

BACKGROUND ART

When a plurality of data items composed of video and audio data are reproduced from a recording medium where they are recorded, it is necessary to carry out at high speed the processes of determining where to read an AV stream from, of decoding what has been read, and of searching for relevant marks. To date, such processes are performed illustratively by resorting to the following method (e.g., refer to Japanese Patent Laid-open No. 2002-158971):

The method involves managing an actual content stream using clip information while controlling reproduction of the AV stream based on play lists. As attribute information about the AV stream, address information "SPN_ATS_start, SPN_STC_start" about discontinuities in the AV stream is recorded to the clip information, together with information "EP_map, TU_map" associating time information with address information in the AV stream, as well as time information clip marks for characteristic pictures in the AV stream.

A typical recording medium carrying the above-mentioned plurality of data items formed by video and audio data is DVD-Video (digital versatile disk-video). The DVD-Video format includes specifications regarding multi-angle reproduction. Over a reproduction segment in which multi-angle reproduction is available, the user can select a desired angle for reproduction. In such a case, angles can be changed in seamless fashion by the recording/reproducing apparatus in use.

FIG. 1 is an explanatory view of a multi-angle format for DVD-Video. A multi-angle reproduction segment is made up of a plurality of subordinate reproduction segments called a cell each. In the example of FIG. 1, the multi-angle reproduction segment is formed by three cells #i+1 through #i+3 for angles #1 through #3 respectively. Actual AV stream data corresponding to the cells is called VOB's (video objects).

FIG. 2 is an explanatory view of an interleaved block structure for implementing multi-angle reproduction of DVD-Video. An interleaved block is constituted by a plurality of interleaved units (ILVU's). The VOB's corresponding to the cells making up a multi-angle reproduction segment are divided into ILVU's. The multiple VOB's constituting the multi-angle reproduction segment are multiplexed in increments of ILVU's. Each ILVU begins with a closed GOP (group of pictures).

The reproduction of DVD-Video with seamless angle change takes place illustratively as follows: suppose that the user changes reproduction paths from angle 2 to angle 1 to angle 3. In that case, the recording/reproducing apparatus jumps over the disk as shown in FIG. 3 so as to read data from ILVU1, ILVU2 and ILVU3 successively for reproduction.

Each ILVU starts with DSI (data search information) which has an address of the destination ILVU to which to jump for the next angle.

When the AV stream is laid out as shown in FIG. 3, a jump occurs at every ILVU even when reproduction is continued at angle A. The frequent jumps can make reproduction unstable. Because the AV stream is laid out in such a fragmented manner on the recording medium, the amount of AV stream layout information is bound to increase.

DISCLOSURE OF INVENTION

The present invention has been made in view of the above circumstances and provides inventive arrangements for optimally laying out data without fragmenting its AV stream while allowing reproduction paths to change seamlessly.

In carrying out the invention and according to a first aspect thereof, there is provided an information processing apparatus for recording an AV stream to a recording medium, the information processing apparatus comprising: generating means for generating the AV stream constituting each of a plurality of reproduction paths; controlling means for controlling the generation of the AV stream by the generating means; and recording means for recording to the recording medium the AV stream generated by the generating means; wherein the AV stream is constituted by data blocks making up predetermined units; and wherein the controlling means controls parameters for the AV stream generated by the generating means as well as a layout of the data blocks, in accordance with information indicative of reproducing characteristics in effect when the AV stream recorded on the recording medium is reproduced therefrom.

Preferably, the information indicative of the reproducing characteristics may denote relations between jump distances between the data blocks recorded in separate locations on the hand, and jump times corresponding respectively to the jump distances on the other hand, for use during reproduction of the AV stream in keeping with the reproduction paths.

The parameters for the AV stream under control of the controlling means may preferably include a rate of the AV stream.

The parameters for the AV stream under control of the controlling means may preferably include the number of the reproduction paths.

Preferably, the generating means may interleave the AV stream in such a manner that the plurality of reproduction paths are divided into a predetermined number of the data blocks laid out successively; and the controlling means may determine the number of the data blocks in controlling the layout of the interleaved data blocks.

The information processing apparatus according to the first aspect of the invention may further comprise inputting means for admitting an input operation made by a user; wherein, in response to the input operation made by the user through the inputting means, the controlling means may control the parameters for the AV stream generated by the generating means as well as the layout of the data blocks by giving priority to a predetermined parameter among the parameters.

The information processing apparatus above may further comprise storing means for storing the information indicative of the reproducing characteristics; wherein the controlling means may control the parameters for the AV stream generated by the generating means as well as the layout of the data blocks on the basis of the information indicative of the reproducing characteristics which is stored in the storing means.

The information processing apparatus may further comprise reproducing means for reproducing the AV stream recorded on the recording medium; wherein the controlling means may control the parameters for the AV stream generated by the generating means as well as the layout of the data blocks, in accordance with the information indicative of the reproducing characteristics in effect when the AV stream is reproduced by the reproducing means.

The controlling means may preferably generate first management information which includes map information for indicating locations of entry points of the AV stream and which is used to control AV stream status, the controlling means further generating second management information for managing the reproduction paths by setting up change points of each of the reproduction paths in accordance with the entry points included in the map information; and the recording means may further record the first management information and the second management information to the recording medium.

Preferably, the generating means may encode the AV stream in such a manner that the AV stream concludes within each of segments delimited by the change points; and the controlling means may create as said map information a correspondence table describing relations of correspondence between presentation timestamps of the entry points on the one hand and packet numbers on the other hand.

Preferably, the generating means may encode the AV stream in such a manner that each of the segments has a video stream made up of a closed group of packets called the closed GOP starting with an I picture, the first packet of the closed GOP being a video packet; and the AV stream generated by the generating means may be included in a transport stream.

On all the reproduction paths, the generating means may preferably use an identical value representing packet ID's of the video packets in the transport stream as well as an identical value representing packet ID's of audio packets in the transport stream.

The information processing apparatus according to the first aspect of the invention may further comprise source packetizing means for turning the transport stream in each of the segments into source packets; wherein the recording means may record the transport stream which has been turned into source packets in each of the segments by the source packetizing means, to the recording medium as an AV stream file.

Preferably, the correspondence table may further include change information indicating whether it is possible to change the reproduction paths at each of the entry points; and the controlling means may set the change points on the basis of the change information.

Preferably, the controlling means may generate first management information which includes map information for indicating locations of starting points of the AV stream on each of the reproduction paths as well as locations of entry points of the AV streams and which is used to control AV stream status, the controlling means further generating second management information which includes designation information for designating a starting point and an end point of each of the AV streams and for designating the AV stream for each of the reproduction paths and which is used for reproduction management; and the recording means may further record the first management information and the second management information to the recording medium.

Preferably, the generating means may encode the AV stream in such a manner that the AV stream concludes within each of segments delimited by the change points; and the controlling means may create a correspondence table describing relations of correspondence between presentation timestamps of the entry points on the one hand and packet numbers on the other hand.

The generating means may preferably encode the AV stream in such a manner that each of the segments has a video stream made up of a closed group of packets called the closed GOP starting with an I picture, the first packet of the closed GOP being a video packet; and the AV stream generated by the generating means may be included in a transport stream.

The generating means may preferably encode the AV stream in such a manner that each of the segments has a video stream headed by a closed group of packets called the closed GOP, the rest of the video stream comprising unclosed GOP's.

The information processing apparatus according to the first aspect of the invention may further comprise source packetizing means for turning the transport stream in each of the segments into source packets; wherein the recording means may record the transport stream which has been turned into source packets in each of the segments by the source packetizing means, to the recording medium as an AV stream file.

The controlling means may preferably create the correspondence table corresponding to each of the AV stream files.

As outlined above, where the information processing apparatus of this invention is in use, an AV stream constituting each of a plurality of reproduction paths is generated. The generation of the AV stream is suitably controlled. The AV stream thus generated is recorded to a recording medium. The AV stream is constituted by data blocks making up predetermined units. Parameters for the AV stream as well as a layout of the data blocks are controlled in accordance with information indicative of reproducing characteristics in effect when the AV stream recorded on the recording medium is reproduced therefrom.

According to a second aspect of the invention, there is provided an information processing method for use with an information processing apparatus for recording an AV stream to a recording medium, the information processing method comprising the steps of: determining parameters for the AV stream as well as a layout of data blocks constituting the AV stream, in accordance with information indicative of reproducing characteristics in effect when the AV stream recorded on the recording medium is reproduced therefrom; generating the AV stream constituting each of a plurality of reproduction paths based on the parameters for the AV stream and on the layout of the data blocks determined in the determining step along with the parameters; and controlling the recording of the AV stream generated in the generating step to the recording medium.

According to a third aspect of the invention, there is provided a program storage medium which stores a program for causing a computer to record an AV stream to a recording medium, the program comprising the steps of: determining parameters for the AV stream as well as a layout of data blocks constituting the AV stream, in accordance with information indicative of reproducing characteristics in effect when the AV stream recorded on the recording medium is reproduced therefrom; generating the AV stream constituting each of a plurality of reproduction paths based on the parameters for the AV stream and on the layout of the data blocks determined in the determining step along with the parameters; and controlling the recording of the AV stream generated in the generating step to the recording medium.

According to a fourth aspect of the invention, there is provided a program for causing a computer to record an AV stream to a recording medium, the program comprising the steps of: determining parameters for the AV stream as well as a layout of data blocks constituting the AV stream, in accordance with information indicative of reproducing characteristics in effect when the AV stream recorded on the recording medium is reproduced therefrom; generating the AV stream constituting each of a plurality of reproduction paths based on the parameters for the AV stream and on the layout of the data blocks determined in the determining step along with the parameters; and controlling the recording of the AV stream generated in the generating step to the recording medium.

Through the use of the information processing method and program of this invention, as outlined above, parameters for an AV stream as well as a layout of data blocks constituting the AV stream are determined in accordance with information indicative of reproducing characteristics in effect when the AV stream recorded on a recording medium is reproduced therefrom. The AV stream constituting each of a plurality of reproduction paths is generated based on the parameters for the AV stream and on the layout of the data blocks determined earlier along with the parameters. The recording of the generated AV stream to the recording medium is suitably controlled.

BRIEF DESCRIPTION OF DRAWINGS

FIG. 18 is a flowchart of steps constituting a first recording method selecting process;

FIG. 19A is an explanatory view of results calculated by the first recording method selecting process;

FIG. 19B is an explanatory view of other results calculated by the first recording method selecting process;

FIG. 19C is an explanatory view of other results calculated by the first recording method selecting process;

FIG. 20 is an explanatory view presenting relations between the number of consecutive angle change units and the number of data items;

FIG. 21 is a flowchart of steps constituting a second recording method selecting process;

FIG. 22A is an explanatory view of results calculated by the second recording method selecting process;

FIG. 22B is an explanatory view of other results calculated by the second recording method selecting process;

FIG. 22C is an explanatory view of other results calculated by the second recording method selecting process;

FIG. 24A is an explanatory view of results calculated by the third recording method selecting process;

FIG. 24B is an explanatory view of other results calculated by the third recording method selecting process;

FIG. 24C is an explanatory view of other results calculated by the third recording method selecting process;

FIG. 32 is a view indicating a syntax of a play item for use in managing a clip AV stream file shown in FIG. 31;

FIG. 34 is a block diagram outlining a typical structure of a personal computer.

BEST MODE FOR CARRYING OUT THE INVENTION

Figure 1:
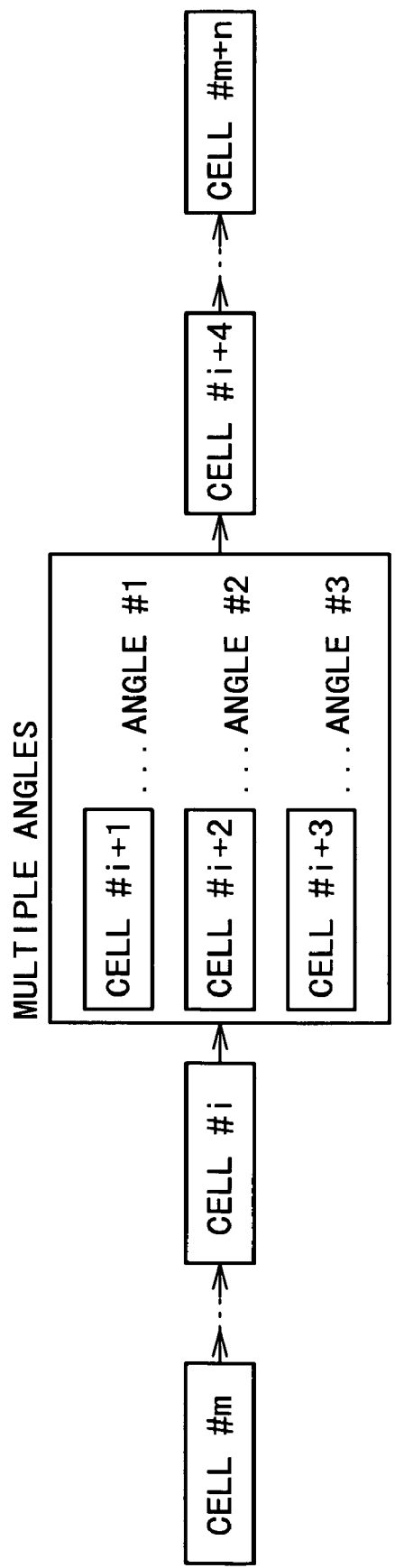
FIG. 1 is an explanatory view of a multi-angle format for DVD-Video.
Figure 2:
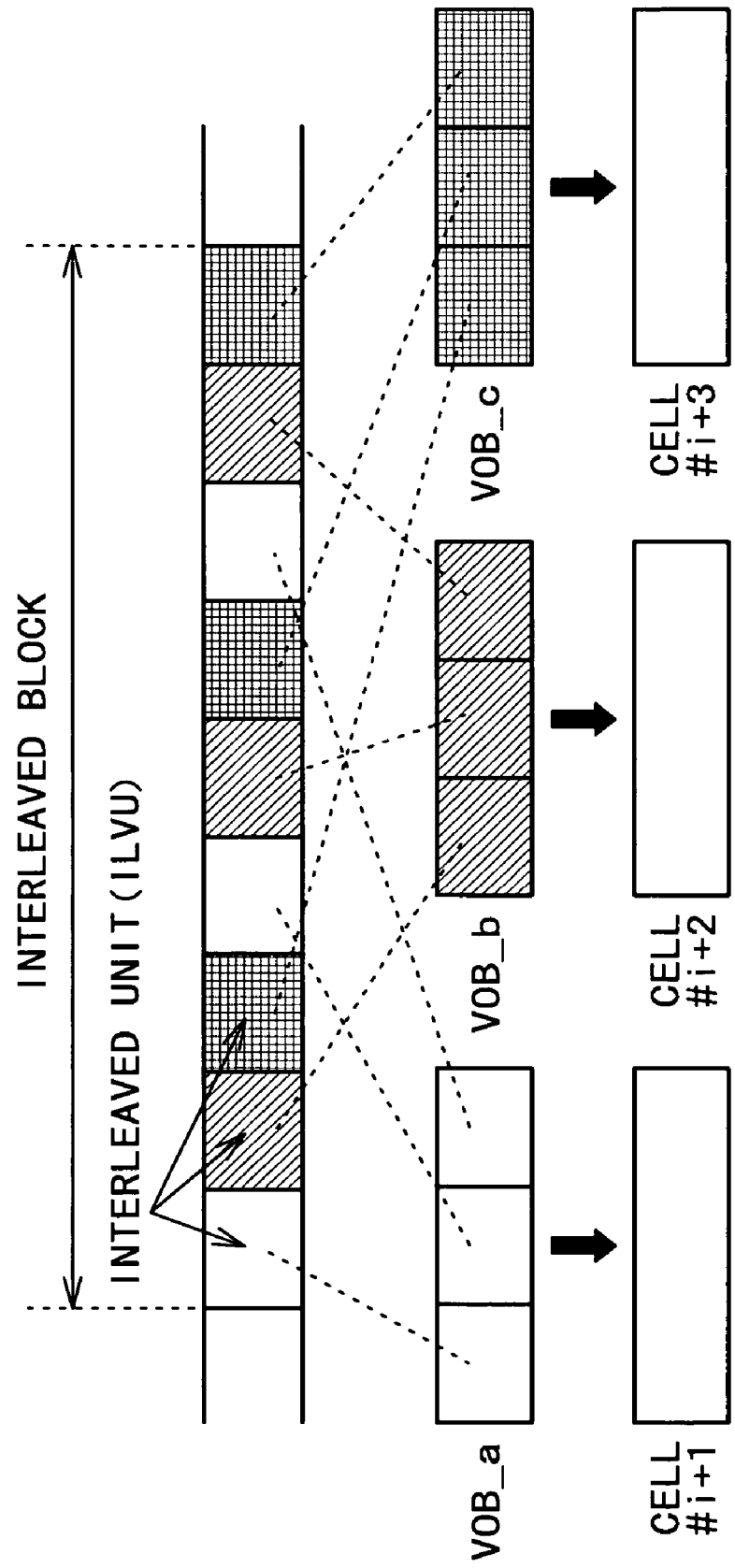
FIG. 2 is an explanatory view of an interleaved block structure.
Figure 3:
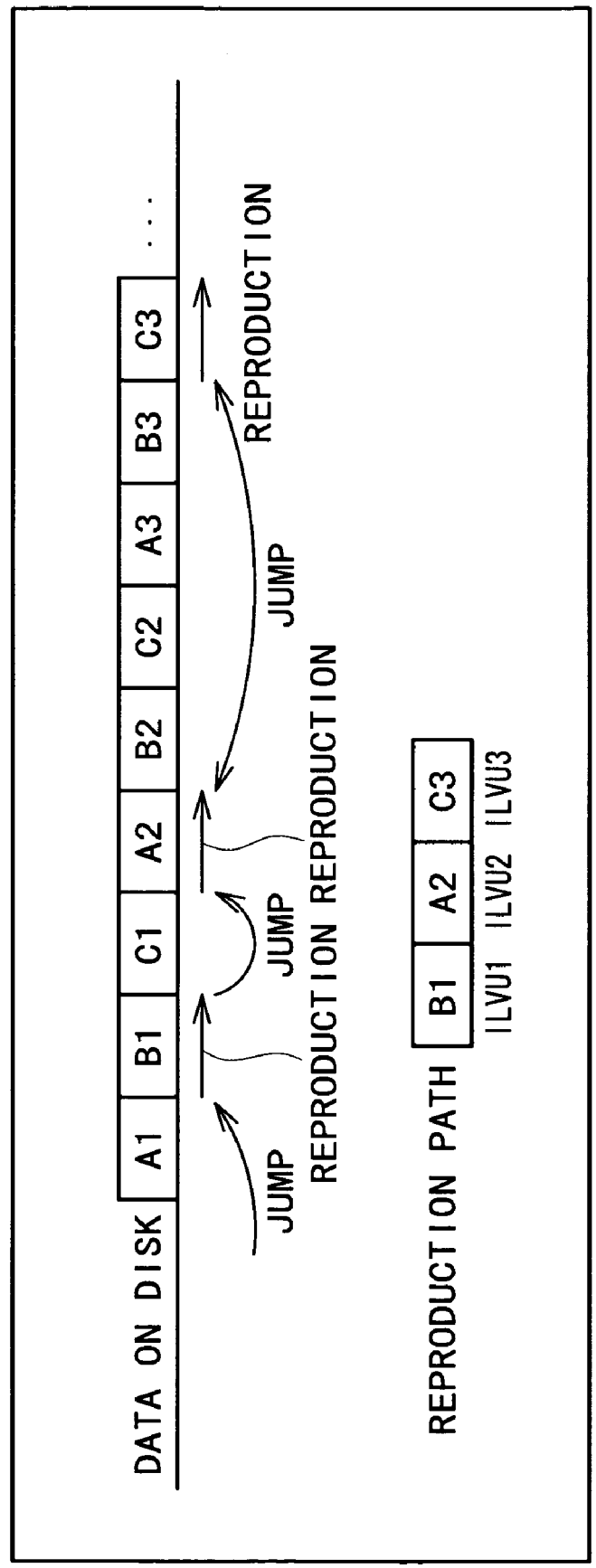
FIG. 3 is an explanatory view showing how jumps occur during reproduction.
Figure 4:
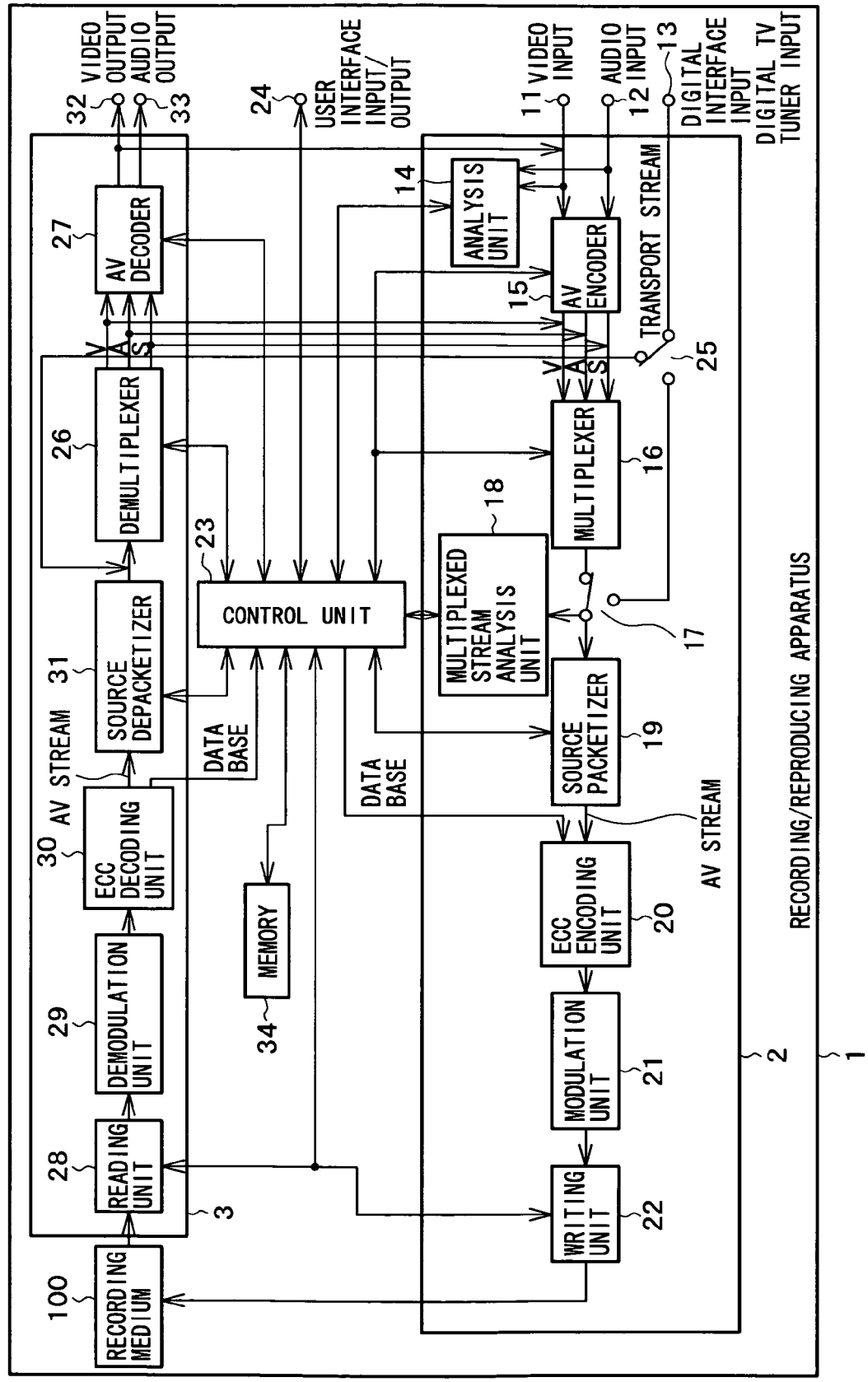
FIG. 4 is a block diagram indicating an internal structure of a recording/reproducing apparatus embodying this invention.

Preferred embodiments of this invention will now be described with reference to the accompanying drawings. FIG. 4 is a block diagram indicating an internal structure of a recording/reproducing apparatus 1 embodying this invention.

Described first is a structure of a recording unit 2 that records externally input signals to a recording medium. The recording/reproducing apparatus 1 is structured to receive and store externally input analog or digital data.

Analog video and audio signals are input to terminals 11 and 12 respectively. The video signal input to the terminal 11 is forwarded to an analysis unit 14 and an AV encoder 15. From the terminal 12, the audio signal is send to the analysis unit 14 and AV encoder 15 as well.

The analysis unit 14 extracts characteristics such as scene changes from the input video and audio signals. The AV encoder 15 encodes the input video and audio signals so as to create an encoded video stream (V), an encoded audio stream (A), and system information (S) such as AV sync signals for output to a multiplexer 16.

The encoded video stream is illustratively a video stream coded in MPEG-2 (Moving Picture Experts Group Phase 2). The encoded audio stream is illustratively an audio stream coded in MPEG-1 or in Dolby AC-3 (trademark) The multiplexer 16 multiplexes the input video and audio streams in accordance with input system information, creating a multiplexed data stream for output to a multiplexed stream analysis unit 18 and a source packetizer 19.

The multiplexed stream is illustratively an MPEG-2 transport stream or an MPEG-2 program stream. The source packetizer 19 encodes the input multiplexed stream into an AV stream made up of source packets in keeping with the application format of a recording medium 100 to which to record the stream. The AV stream is subjected to ECC (error correction code) encoding by an ECC encoding unit 20 and to modulation by a modulation unit 21, before being output to a writing unit 22. The writing unit 22 writes AV stream files to the recording medium 100 such as a DVD in accordance with control signals from a control unit 23.

A terminal 13 admits a transport stream such as digital TV broadcasts coming from a digital interface or from a digital TV tuner (neither shown). The transport stream input to the terminal 13 is recorded by one of two methods: either the stream is recorded in transparent fashion, or the stream is recorded after being re-encoded illustratively to reduce the recording bit rate. Information for designating the recording method is input to the control unit 23 from a terminal 24 serving as a user interface.

Where the input transport stream is to be recorded transparently, the transport stream received through the terminal 13 is output to the multiplexed stream analysis unit 18 and source packetizer 19 via switches 25 and 17. Subsequent processing steps up to the recording of the AV stream to the recording medium 100 are the same as the above-mentioned steps for encoding the analog input audio and video signals and for recording the encoded signals, and thus will not be discussed further.

Where the input transport stream is to be re-encoded before being recorded, the transport stream received through the terminal 13 is input to a demultiplexer 26 via the switch 25. The demultiplexer 26 demultiplexes the input transport stream so as to extract a video stream (V), an audio stream (A) and system information (S).

Following extraction by the demultiplexer 26, the video stream (V) is output to an AV decoder 27 while the audio stream (A) and system information (S) are forwarded to the multiplexer 16. The AV decoder 27 decodes the input video stream and outputs a reproduced video signal out of the stream to the AV encoder 15. The AV encoder 15 encodes the input video signal into an encoded video stream (V) for output to the multiplexer 16.

In keeping with the input system information, the multiplexer 16 multiplexes the audio stream and system information coming from the demultiplexer 26 as well as the video stream from the AV encoder 15 in order to create a multiplexed stream for output to the multiplexed stream analysis unit 18 and to the source packetizer 19 via the switch 17. Subsequent processing steps up to the recording of the AV stream to the recording medium 100 are the same as the above-mentioned steps for encoding the analog input audio and video signals and for recording the encoded signals, and thus will not be discussed further.

The recording/reproducing apparatus 1 records AV stream files to the recording medium 100 along with application database information for explaining the files. The application database information is created by the control unit 23. The control unit 23 is supplied with moving picture characteristic information from the analysis unit 14, with AV stream characteristic information from the multiplexed stream analysis unit 18, and with user-input designation information from the terminal 24. As needed, the control unit 23 refers to diverse kinds of information stored in a memory 34.

The moving picture characteristic information coming from the analysis unit 14 is generated thereby when the AV encoder 15 encodes video signals. More specifically, the analysis unit 14 analyzes the content of input video and audio signals and creates accordingly information about characteristic pictures (i.e., clip marks) in the input moving picture signals. What is created here is information for designating characteristic clip mark pictures such as program start points, scene change points, start and end points of commercial messages (CM), titles, telop indications, and thumbnail images in the input video signals. The information about the characteristic pictures (clip marks) further includes stereo-to-monaural change points and silent pauses in the audio signals.

The picture designating information is input to the multiplexer 16 through the control unit 23. When multiplexing the encoded pictures designated as clip marks by the control unit 23, the multiplexer 16 sends back to the control unit 23 information for identifying the encoded pictures in the AV stream. More specifically, the information is address information which specifies either PTS (presentation timestamps) for the pictures or the addresses of the pictures when they are encoded in the AV stream. The control unit 23 associates in storage the types of the characteristic pictures with the information for identifying the encoded pictures in the AV stream.

The AV stream characteristic information fed from the multiplexed stream analysis unit 18 is information which concerns the encoding of the AV stream to be recorded and which is generated by the multiplexed stream analysis unit 18. Illustratively, the AV stream characteristic information includes: timestamps and address information for the I pictures in the AV stream, system time clock discontinuity information, encoding parameters in the AV stream, and change point information about the encoding parameters in the AV stream. Where the transport stream input through the terminal 13 is to be recorded transparently, the multiplexed stream analysis unit 18 detects the above-mentioned clip mark pictures from the input transport stream and generates accordingly information for identifying the pictures designated by type and by clip mark.

The user's designation information fed from the terminal 24 illustratively includes: conditions for determining an AV stream recording method, to be discussed later; information for specifying user-designated reproduction segments in the AV stream; text in characters for explaining what is contained in the reproduction segments; and information about book marks and resume points to be set for the scenes preferred by the user.

The memory 34 holds information necessary for determining the AV stream recording method, such as information indicating relations between jump times and jump distances and determined by a function of a driving unit (not shown). The driving unit rotates the recording medium 100 so as to have the reading unit 28 positioned where appropriate on the recording medium 100. The information is retrieved from the memory 34 as needed by the control unit 23.

The control unit 23 determines the AV stream recording method based on the above-described input information as well as on the information held in the memory 34. The control unit 23 further creates clips constituting a database for the AV stream, a database of play lists each containing a group of play items representative of reproduction segments of the AV stream, management information (info.dvr) about what is recorded on the recording medium 100, and thumbnail picture information. These pieces of information constitute application database information which, as with the AV stream, is subjected to ECC encoding by the ECC encoding unit 20 and to modulation by the modulation unit 21 before being input to the writing unit 22. The writing unit 22 records database files to the recording medium 100 in keeping with control signals coming from the control unit 23.

In other words, the clips make up information for managing AV stream status, and the play lists constitute information for managing the reproduction paths of the AV stream. The application database information mentioned above will be discussed later in more detail.

When the AV stream files (files of video and audio data) and application database information recorded on the recording medium 100 are to be reproduced therefrom by a reproduction unit 3, the control unit 23 first instructs the reading unit 28 to read the application database information from the recording medium 100. In turn, the reading unit 28 reads the application database information from the recording medium 100. The retrieved application database information is input to the control unit 23 after undergoing demodulation by a demodulation unit 29 and error correction by an ECC decoding unit 30.

In keeping with the application database information, the control unit 23 outputs a table of play lists read from the recording medium 100 to the user interface through the terminal 24. The user selects desired play lists from the play list table on display. Information about the play lists designated by the user for reproduction is input through the terminal 24 to the control unit 23. In turn, the control unit 23 instructs the reading unit 28 to retrieve the AV stream files necessary for reproducing the play lists. In accordance with the instruction, the reading unit 28 reads the corresponding AV stream from the recording medium 100 and outputs the retrieved stream to the demodulation unit 29. The demodulation unit 29 carries out necessary steps to demodulate the input AV stream. The ECC decoding unit 30 performs ECC decoding and outputs the decoded data to a source depacketizer 31.

The source depacketizer 31 converts the AV stream read from the recording medium 100 and in a suitably processed application format into a stream that can be processed by the demultiplexer 26. The demultiplexer 26 outputs to the AV decoder 27 the video stream (V), audio stream (A), and system information (S) such as AV sync signals constituting the reproduction segments (i.e., play items) of the AV stream designated by the control unit 23. The AV decoder 27 decodes the video and audio streams so as to output reproduced video and audio signals through terminals 32 and 33 respectively.

If information for designating random access reproduction or special reproduction is input through the terminal 24 serving as the user interface, the control unit 23 determines the locations from which to read the AV stream from the recording medium 100 in accordance with the content of the AV stream database (i.e., clips), and instructs the reading unit 28 to read the AV stream accordingly. Illustratively, if a user-designated play list is to be reproduced starting from a specified point in time, the control unit 23 instructs the reading unit 28 to read data starting from the I picture having the timestamp closest to the specified time.

Suppose that the user selects a clip mark from among the clip marks in the clip information recorded as part of the AV stream database constituting the application database information (for example, the user at a display unit serving as the user interface may perform an input operation to select one of the thumbnail pictures from a thumbnail picture list comprising program start points and scene change points stored as clip marks). In such a case, the control unit 23 determines the location from which to read the AV stream on the recording medium 100 in accordance with the content of the clip information, and instructs the reading unit 28 to read the AV stream accordingly. That is, the control unit 23 instructs the reading unit 28 to read data starting from the I picture having the address closest to that address in the AV stream at which the user-selected picture is stored. In turn, the reading unit 28 reads the data from the designated address. The data thus retrieved is subjected to processing by the demodulation unit 29, ECC decoding unit 30, and source depacketizer 31 before being input to the demultiplexer 26. The processed data from the demultiplexer 26 is decoded by the AV decoder 27 whereby the AV data indicated by the address of the picture at the selected clip mark is reproduced.

If user designates high-speed reproduction (i.e., fast-forward playback), the control unit 23 instructs the reading unit 28 to read I picture data successively from the AV stream in accordance with the AV stream database (clips).

Given the instruction, the reading unit 28 reads AV stream data from the random access points designated as the locations where the I pictures are recorded. The retrieved data undergoes relevant downstream processes before being reproduced.

Described below is how the user edits the AV stream recorded on the recording medium 100. There may be cases in which the user wants to create a new reproduction path (i.e., new play list) by designating desired reproduction segments of the AV stream recorded on the recording medium 100. For example, the user might wish to create a reproduction path whereby a singer A's segments are to be reproduced from a popular song program A followed by the singer A's more segments from another popular song program B. In such a case, information denoting the start points (in-points) and end points (out-points) of the desired reproduction segments is input to the control unit 23 through the terminal 24 serving as the user interface. In turn, the control unit 23 creates a database formed by groups (play lists) of the applicable reproduction segments (play items) in the AV stream.

If the user wants to delete a portion of the AV stream recorded on the recording medium 100, information representing the in-point and out-point of the segment to be deleted is input to the control unit 23 through the terminal 24 serving as the user interface. Given the information, the control unit 23 changes the play list database so that the necessary AV stream portions alone will be referenced and instructs the writing unit 22 to delete the unnecessary stream portion from the AV stream.

Suppose now that the user wants to create a new reproduction path by designating certain reproduction segments of the AV stream recorded on the recording medium 100 and that the user wants to have each of the designated reproduction segments reproduced seamlessly. In that case, the control unit 23 creates a database formed by groups (play lists) of the applicable reproduction segments (play items) in the AV stream, and re-encodes and re-multiplexes those parts of the video stream which are close to the connection points of the reproduction segments.

More specifically, information about the in-point pictures and out-point pictures of the reproduction segments is input to the control unit 23 through the terminal 24. In turn, the control unit 23 instructs the reading unit 28 to read data necessary for reproducing the in-point and out-point pictures. Given the instruction, the reading unit 28 reads the data from the recording medium 100 and outputs the retrieved data to the demultiplexer 26 through the demodulation unit 29, ECC decoding unit 30, and source depacketizer 31.

By analyzing the data input to the demultiplexer 26, the control unit 23 determines a video stream re-encoding method (in the form of a change in picture_coding_type and allocation of the amount of the encoded bits to be re-encoded)

and a video-stream re-multiplexing method. The determined methods are supplied to the AV encoder 15 and multiplexer 16.

The demultiplexer 26 separates the input stream into a video stream (V), an audio stream (A) and system information (S). The video stream is formed by the data to be input to the AV decoder 27 and by the data to be sent to the multiplexer 16. The AV decoder-bound data is needed for the re-encoding. That is, the data is first decoded by the AV decoder 27. The decoded pictures are then re-encoded by the AV encoder 15 to constitute the video stream. The multiplexer-bound data is not subject to re-encoding; it is copied from the original stream. The audio stream and system information are directly input to the multiplexer 16.

The multiplexer 16 multiplexes the input streams into a multiplexed stream for output in accordance with information coming from the control unit 23. The multiplexed stream is processed by the ECC encoding unit 20 and modulation unit 21 before being input to the writing unit 22. The writing unit 22 writes the AV stream to the recording medium 100 in keeping with control signals supplied by the control unit 23.

Figure 5:
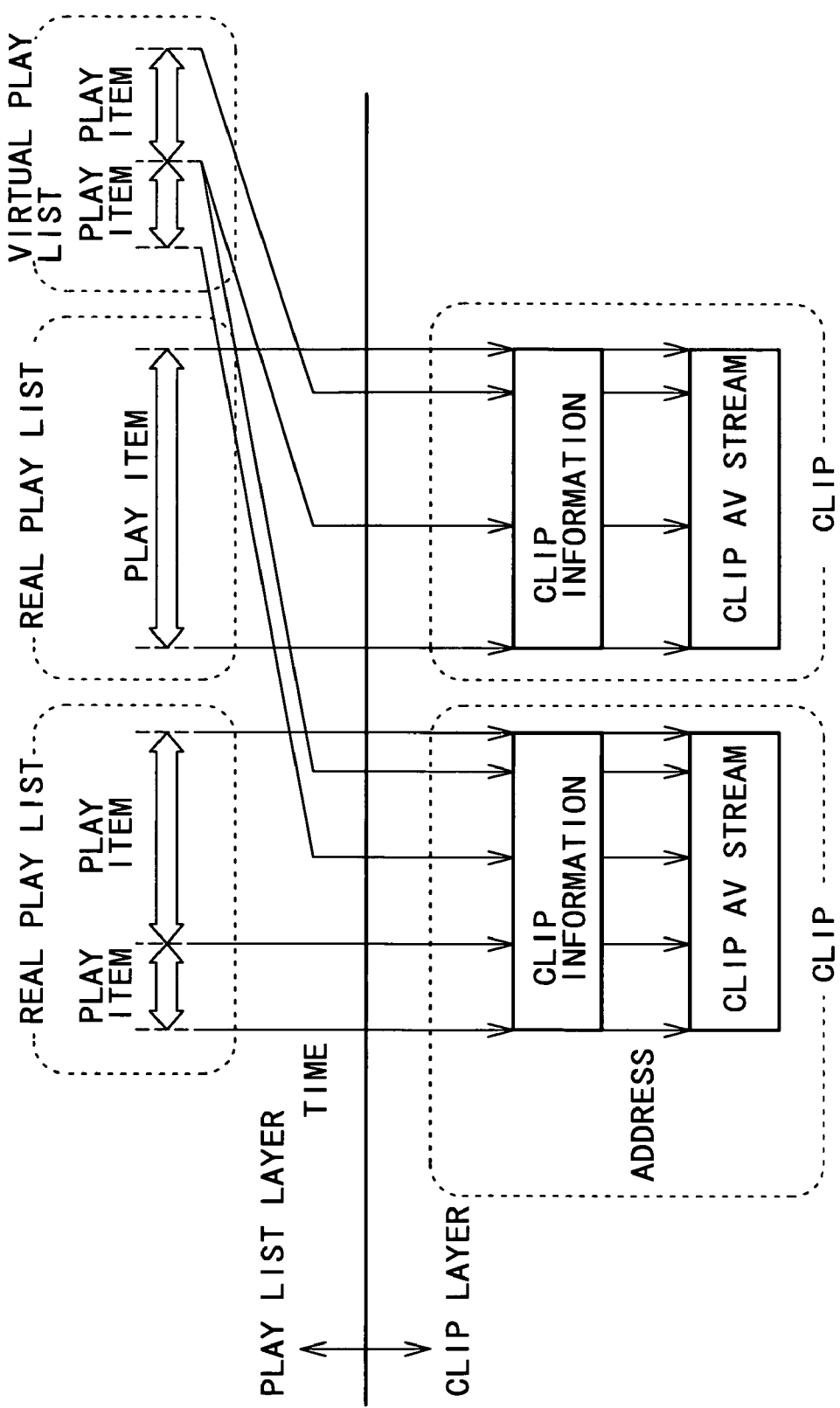
FIG. 5 is an explanatory view of an application format structure on a recording medium used by the embodiment of the invention.

What follows is a description of the application database information and the reproducing or editing processes to be carried out based on that database information. FIG. 5 shows an application format structure on the recording medium 100 used by this embodiment of the invention.

The application format has two layers: a play list layer and a clip layer for AV stream management. All clips and play lists on the disk are managed by use of volume information. In this case, one AV stream paired with its attached information is considered an object called a clip. An AV stream file is called a clip AV stream file whose attached information is called a clip information file.

One clip AV stream file stores an MPEG-2 transport stream laid out as data according to the structure determined by the application format. Whereas files are generally structured as a string of bytes each, the content of a clip AV stream file is structured along the time axis. Entry points (I pictures) in clips are designated primarily on a time base. When the timestamps of access points (including entry points) to clips are given, a clip information file is useful for finding the address from which to start reading data in each clip AV stream file.

Details of the play list are described below with reference to FIG. 5. Play lists are provided to let the user select desired segments in clips and easily edit what is selected. Each play list is a group of reproduction segments in clips. One reproduction segment in a given clip is called a play item defined by a pair of an in-point and an out-point along the time axis. A play list is thus formed by putting together one or a plurality of play items.

There are two kinds of play lists: a real play list and a virtual play list. A real play list shares the stream portion of the clip referenced by the list. That is, the real play list occupies on the disk the data amount corresponding to the stream portion of the clip referenced by the list. If any real play list is deleted, the stream portion of the clip referenced by that list is also deleted.

A virtual play list does not share clip data. It follows that the clip content remains unchanged even if any virtual play list is changed or deleted.

Figure 6:
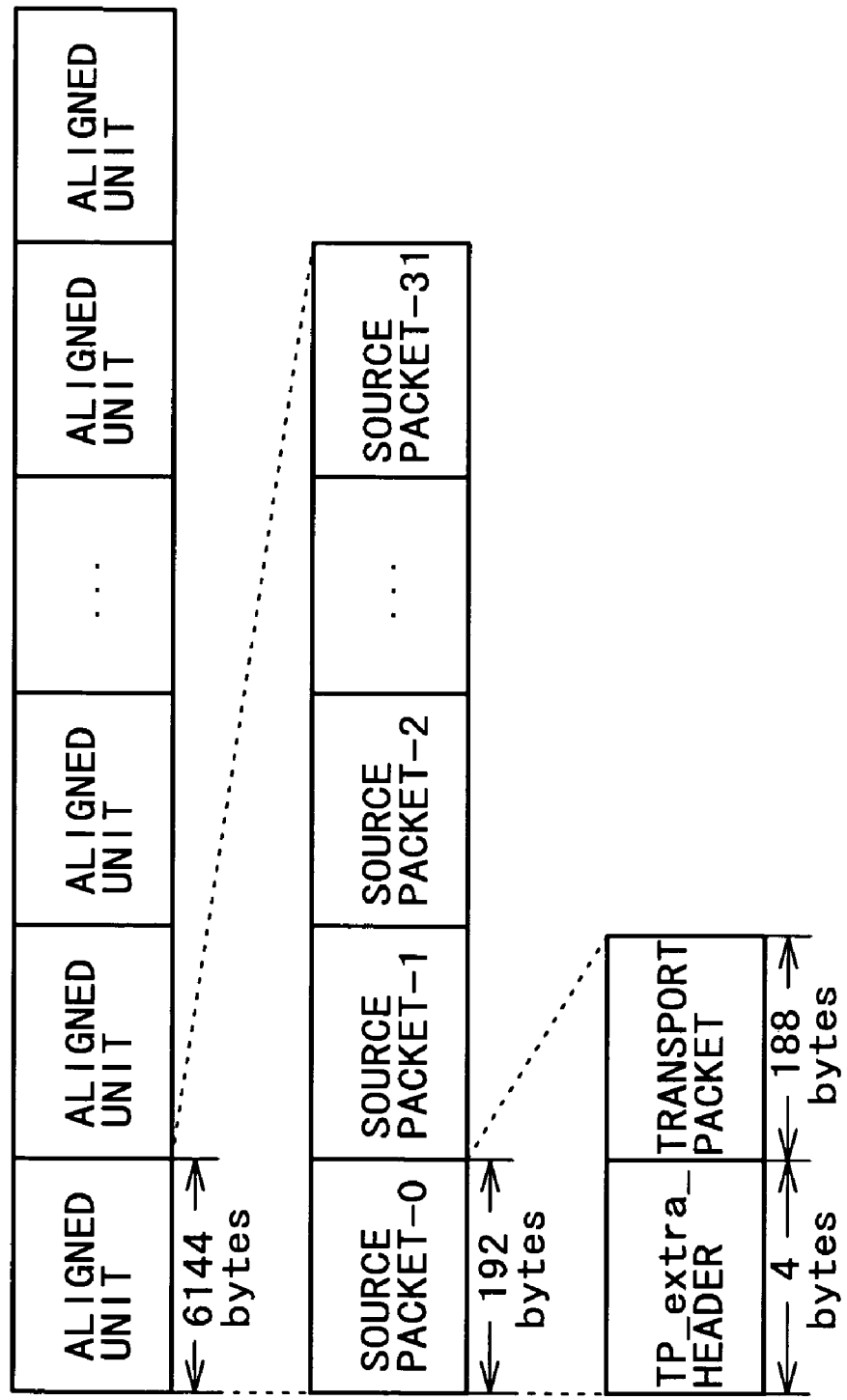
FIG. 6 is a schematic view outlining a structure of an AV stream file.

A DVR MPEG-2 transport stream will now be described. FIG. 6 outlines a structure of an AV stream file.

The AV stream file has the structure of a DVR MPEG-2 transport stream. The DVR MPEG-2 transport stream is made up of a whole number of aligned units. One aligned unit is 6,144 bytes (2,048×3 bytes) long. An aligned unit begins with the first byte of a source packet. One source packet is 192 bytes long and is constituted by a TP_extra_header and a transport packet. The TP_extra_header is four bytes long and the transport packet is 188 bytes long.

One aligned unit is composed of 32 source packets. The last aligned unit in the DVR MPEG-2 transport stream is also formed by 32 source packets. That means the DVR MPEG-2 transport stream terminates on an aligned unit boundary. If the number of transport packets in an input transport stream recorded on the recording medium 100 is not a multiple of 32, then the source packets having a null packet (i.e., transport packet with PID=0x1FFF) are used in the last aligned unit. A file system (i.e., control unit 23) does not add extra information (effective information) to the DVR MPEG-2 transport stream.

Inventive arrangements for changing multiple angles seamlessly during reproduction will now be described with reference to FIG. 7. The seamless change means that angles can be changed without interrupting pictures or sounds being reproduced.

Where a multi-angle reproduction segment includes angles #1, #2 and #3, each angle represents one play list. In the example of FIG. 7, the angles #1, #2 and #3 are constituted by play lists #1, #2 and #3 respectively. AV stream data items corresponding to the reproduction segments of the angles #1, #2 and #3 are called a clip 1 (clip AV stream 1), a clip 2 (clip AV stream 2) and a clip 3 (clip AV stream 3) respectively.

Figure 7:
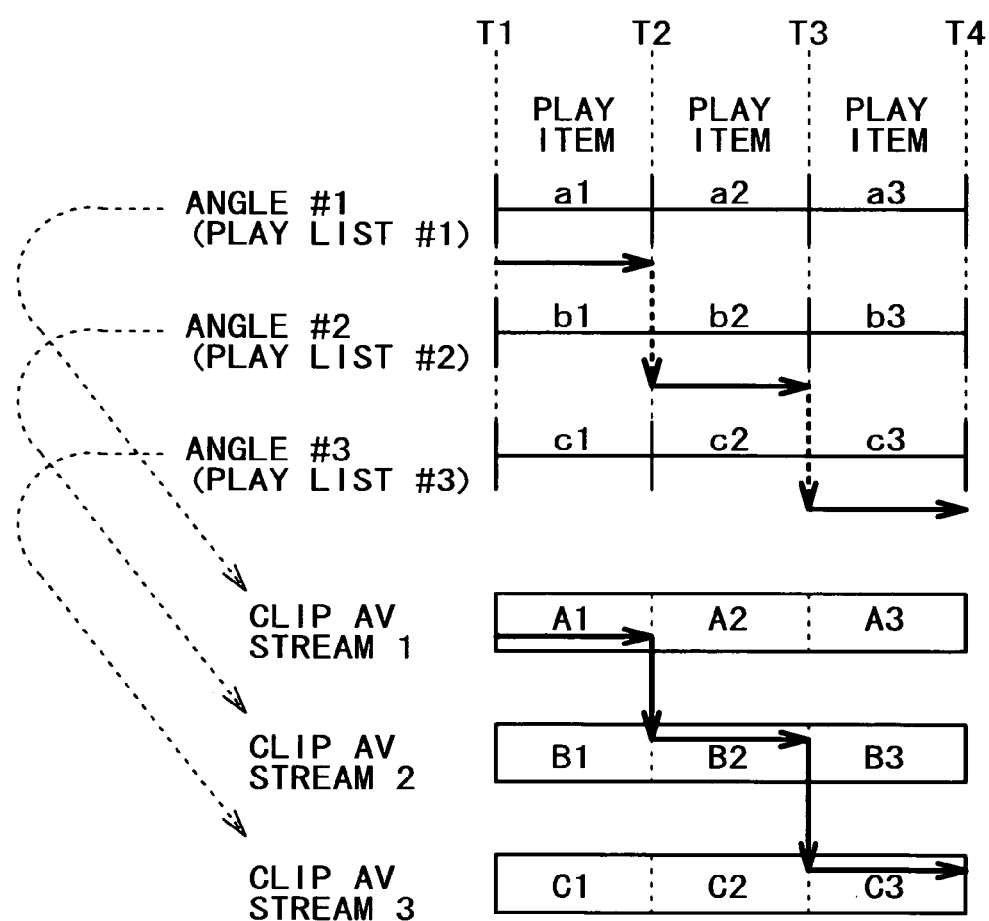
FIG. 7 is an explanatory view showing how multiple angles are changed seamlessly.

In the example of FIG. 7, each reproduction segment is divided into different play items at each point in time where one angle can be followed by another angle (i.e., angle change point). Illustratively, where the reproduction segment of the angle #1 is divided into three parts, the play list #1 is made up of three play items representing reproduction segments a1, a2 and a3 which in turn correspond to AV stream data A1, A2 and A3 of the clip 1 respectively. Likewise, where the reproduction segment of the angle #2 is divided into three parts, the play list #2 is formed by three play items representing reproduction segments b1, b2 and b3 which correspond to AV stream data B1, B2 and B3 of the clip 2 respectively. Similarly, where the reproduction segment of the angle #3 is split into three parts, the play list #3 is composed of three play items representing reproduction segments c1, c2 and c3 which correspond to AV stream data C1, C2 and C3 of the clip 3 respectively.

The play items corresponding to the reproduction segments a1, b1 and c1 share the same pair of an in-point (IN_time) and an out-point (OUT_time). Illustratively, IN_time is T1 and OUT_time is T2. Likewise, the play items corresponding to the reproduction segments a2, b2 and c2 share the same pair of an in-point (IN_time) and an out-point (OUT_time). Illustratively, IN_time is T2 and OUT_time is T3 in this case. Similarly, the play items corresponding to the reproduction segments a3, b3 and c3 also share the same pair of an in-point (IN_time) and an out-point (OUT_time). Illustratively, IN_time is T3 and OUT_time is T4. T1, T2, T3 and T4 each denote PTS (presentation timestamp) in AV streams. The timestamps T1, T2, T3 and T4 may be arranged at regular intervals.

Figure 8:
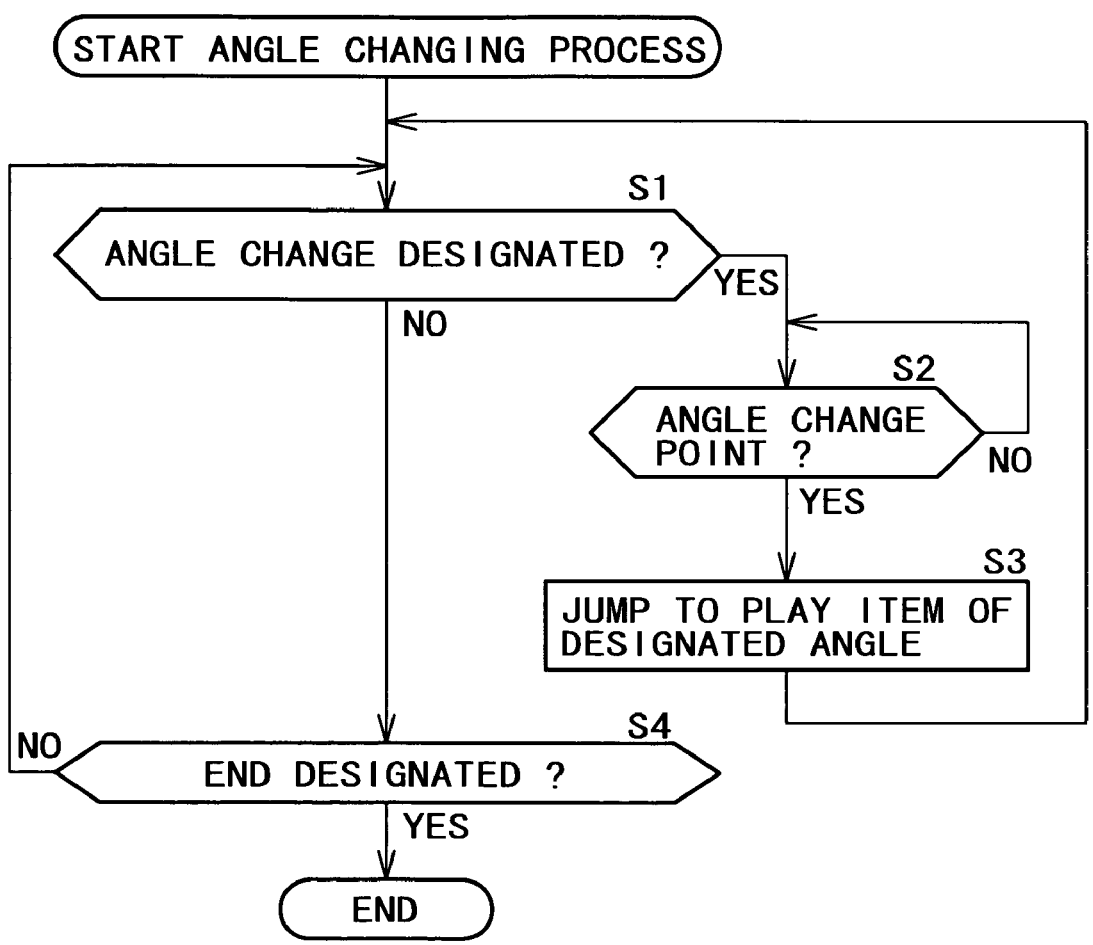
FIG. 8 is a flowchart of steps constituting a process for seamlessly changing multiple angles.

Described below with reference to the flowchart of FIG. 8 is an angle changing process. This is a basic process by which to change multiple angles seamlessly during reproduction.

In step S1, the control unit 23 determines whether the user has given an instruction to change the angle currently used for reproduction with another angle. If in step S1 the instruction to change angles is found given, step S2 is reached. In step S2, the control unit 23 determines whether the current reproducing location is at an angle change point.

If in step S2 the current location is not found to be at an angle change point, step S2 is repeated until the current location is found to have reached an angle change point. When the current location is found to be at an angle change point in step S2, step S3 is reached. In step S3, the control unit 23 causes the reproducing location to jump to an AV stream head defined by the play items of the designated angle. The AV stream data is then reproduced. At the end of step S3, control is returned to step S1, and the subsequent steps are repeated.

If in step S1 the instruction to change angles is not detected, step S4 is reached. In step S4, the control unit 23 determines whether the user has given an instruction to end reproduction. If in step S4 the instruction to end reproduction is not found given, step S1 is reached again and the subsequent steps are repeated. If the instruction to end reproduction is detected in step S4, this process is terminated.

Where angles are changed as described above in the example of FIG. 7, that AV stream data A1 in the clip AV stream 1 which corresponds to the reproduction segment of the angle #1 is reproduced first, followed by the AV stream data B2 in the clip AV stream 2 corresponding to the reproduction segment of the angle #2 and by the AV stream data C3 in the clip AV stream 3 corresponding to the reproduction segment of the angle #3, in that order.

In the above-described process, the clip information file of each clip provides information representing the start and end addresses of each of the play items for jumps to be made to the AV stream heads, as well as data size (in bytes) information.

Figure 9:
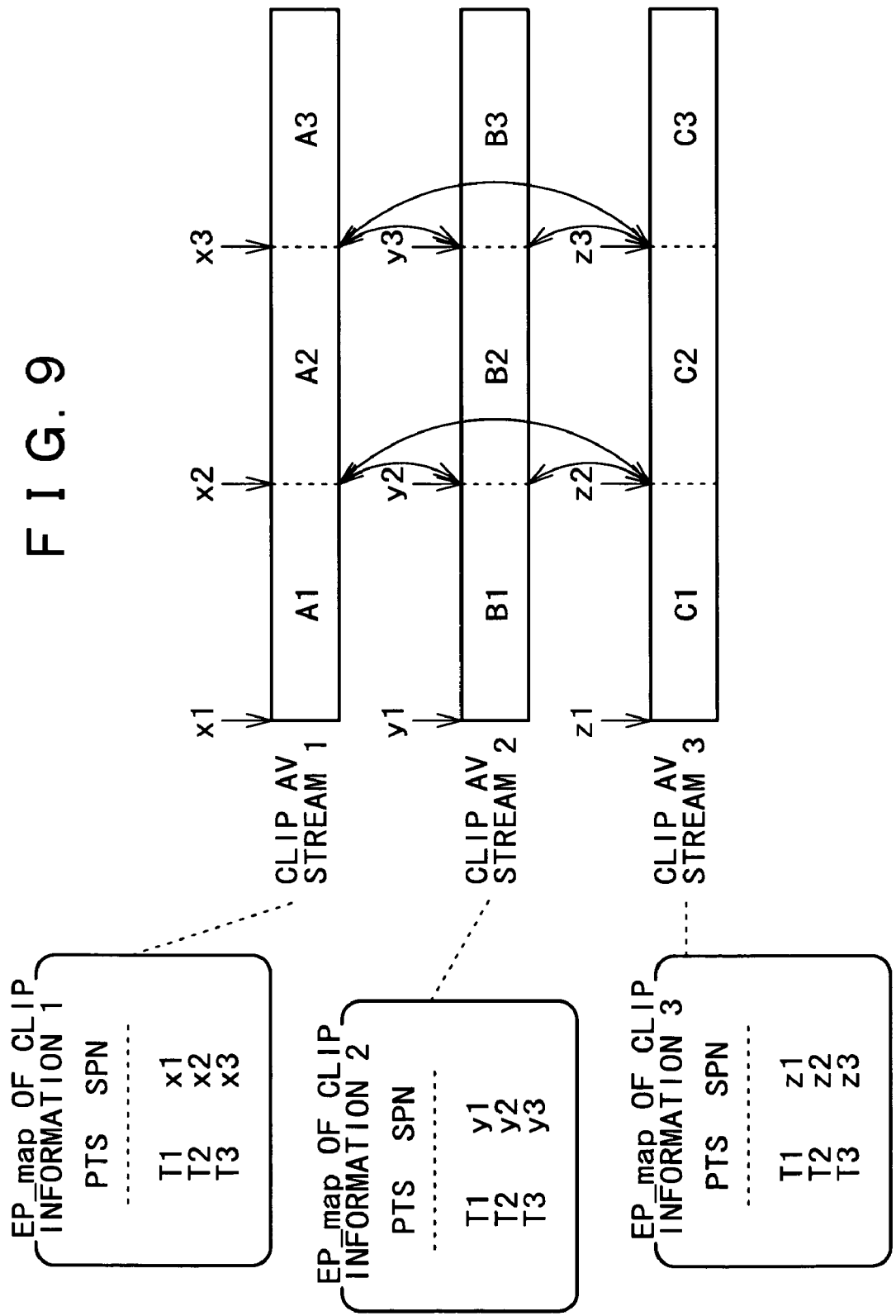
FIG. 9 is a schematic view illustrating data content of clip information files.

FIG. 9 schematically illustrates data content of clip information files. The video stream data in each of the AV stream data A1, B1 and C1 starts with a closed GOP headed by a sequence header. The same timestamp T1 is given to each of the AV stream data A1, B1 and C1 which start being displayed for the same display period (T1-T2). The closed GOP refers to a group of pictures that are encoded so as to conclude within one segment (e.g., reproduction segments a1, b1 and c1). Naturally, the GOP does not apply if the pictures involved are encoded so as to conclude within each segment, i.e., if there exists no predictive relation between one segment (e.g., reproduction segment a1) and any other segment (e.g., reproduction segment b1).

Likewise, the video stream data in each of the AV stream data A2, B2 and C2 starts with a closed GOP headed by a sequence header. The same timestamp T2 is given to each of the AV stream data A2, B2 and C2 which start being displayed for the same display period (T2-T3).

Furthermore, the video stream data in each of the AV stream data A3, B3 and C3 also starts with a closed GOP headed by a sequence header. The same timestamp T3 is given to each of the AV stream data A3, B3 and C3 which start being displayed for the same display period (T3-T4). The video stream data in each of all AV stream data A1, B1, C1, A2, B2, C2, A3, B3 and C3 starts with a closed GOP in which the first picture to be displayed is an I picture.

The audio stream data in the AV stream data A1, B1 and C1 is the same, and so is the audio stream data in the AV stream data A2, B2 and C2. Furthermore, the audio stream data in the AV stream data A3, B3 and C3 is the same as well.

Each of the AV stream data A1, B1 and C1 includes video and audio packets. The first packet is always a video packet in each of the AV stream data A1, B1 and C1. The payload of the first video packet begins with an I picture headed by a sequence header and a GOP header. Likewise, the first packet is a video packet in each of the AV stream data A2, B2 and C2; the payload of the first video packet begins with an I picture headed by a sequence header and a GOP header. Similarly, the first packet is also a video packet in each of the AV stream data A3, B3 and C3; the payload of the first video packet also begins with an I picture headed by a sequence header and a GOP header.

Alternatively, each of the AV stream data A1, B1 and C1 may begin with PAT (program association table) and PMT (program map table) followed by video packets of the first elementary stream that comes behind.

The clip information file has a map called EP_map describing the relations of correspondence between the timestamps of entry points to clips on the one hand, and the source packet numbers of the source packets from which to start decoding streams in clip AV stream files on the other hand. The source packet number refers to a number which is incremented by 1 when given serially to each of the source packets (FIG. 6) in an AV stream file. The source packet number at the beginning of the file is zero.

Suppose now that the first packet numbers of the AV stream data A1, A2 are A3 are x1, x2 and x3 respectively; that the first packet numbers of the AV stream data B1, B2 and B3 are y1, y2 and y3 respectively; and that the first packet numbers of the AV stream data C1, C2 and C3 are z1, z2 and z3 respectively. On that assumption, EP_map of clip information 1, 2 and 3 contains what is shown in FIG. 9.

In EP_map of the clip information 1 about the clip AV stream 1, the payloads of the source packets identified by the numbers x1, x2 and x3 are shown starting with I pictures having display start timestamps of T1, T2 and T3 respectively.

In EP_map of the clip information 2 about the clip AV stream 2, the payloads of the source packets identified by the numbers y1, y2 and y3 are shown starting with I pictures also having the display start timestamps of T1, T2 and T3 respectively.

In EP_map of the clip information 3 about the clip AV stream 3, the payloads of the source packets identified by the numbers z1, z2 and z3 are shown starting with I pictures having the display start timestamps of T1, T2 and T3 respectively as well.

In other words, the payloads of the source packets identified by the numbers x1, y1 and z1 each start with the I picture having the display start timestamp of T1; the payloads of the source packets identified by the numbers x2, y2 and z2 each start with the I picture having the display start timestamp of T2; and the payloads of the source packets identified by the numbers x3, y3 and z3 each start with the I picture having the display start timestamp of T3.

Figure 10:
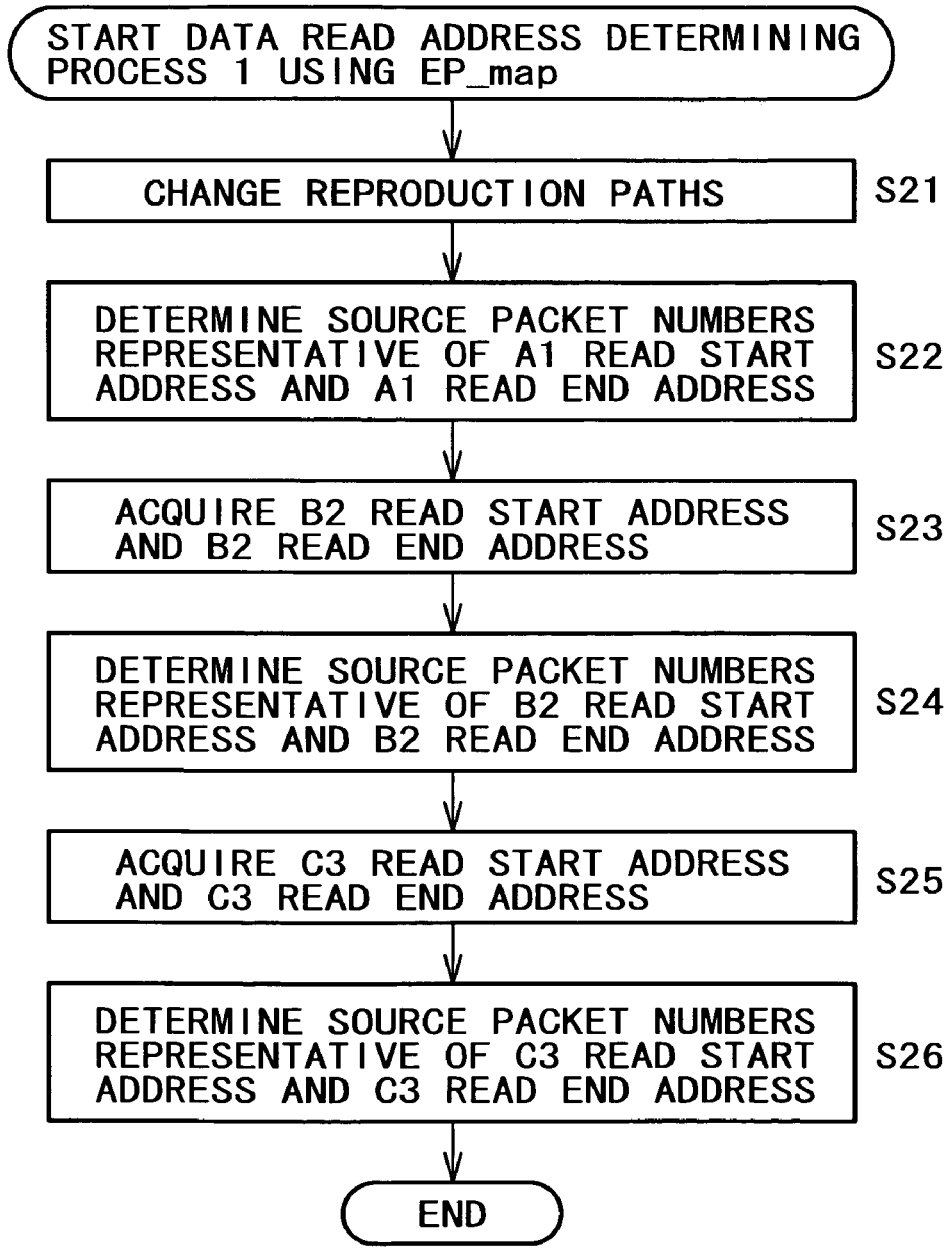
FIG. 10 is a flowchart of steps constituting a data read address determining process 1 using EP_map.

Described below with reference to the flowchart of FIG. 10 is a data read address determining process 1 performed using EP_map. In this example, angles are changed during reproduction over the reproduction segment a1 defined by the first play item of the angle #1, over the reproduction segment a2 defined by the second play item of the angle #2, and over the reproduction segment a3 defined by the third play item of the angle #3.

In step S21, reproduction paths are changed. More specifically, the control unit 23 acquires from EP_map of the clip 1 the read start address and read end address of the AV stream data A1 in order to read the AV stream data A1 corresponding to the reproduction segment a1 defined by the first play item of the angle #1.

In step S22, the control unit 23 reads from EP_map the source packet number x1 corresponding to the timestamp T1 as the read start address of the AV stream data A1 and the source packet number x2 corresponding to the timestamp T2 as the read end address of the AV stream data A1, and determines the source packet number (x2−1) immediately preceding the source packet number x2.

In step S23, the control unit 23 acquires from EP_map of the clip 2 the read start address T2 and read end address T3 of the AV stream data B2 in order to read the AV stream data B2 corresponding to the reproduction segment b2 defined by the second play item of the angle #2. In step S24, the control unit 23 determines the source packet number y2 corresponding to the timestamp T2 as the read start address of the AV stream data B2, and the source packet number (y3−1) immediately preceding the source packet number y3 corresponding to the timestamp T3 as the read end address of the AV stream data B2.

In step S25, the control unit 23 acquires from EP_map of the clip 3 the read start address T3 and read end address T4 of the AV stream data C3 in order to read the AV stream data C3 corresponding to the reproduction segment c3 defined by the third play item of the angle #3. In step S26, the control unit 23 determines the source packet number z3 corresponding to the timestamp T3 as the read start address of the AV stream data C3, and the last source packet number of the clip 3 as the read end address of the AV stream data C3. This terminates the process of FIG. 10.

In the manner described above, the data read addresses are determined using EP_map, and the reproduction segments defined by the play items are reproduced accordingly.

Figure 11:
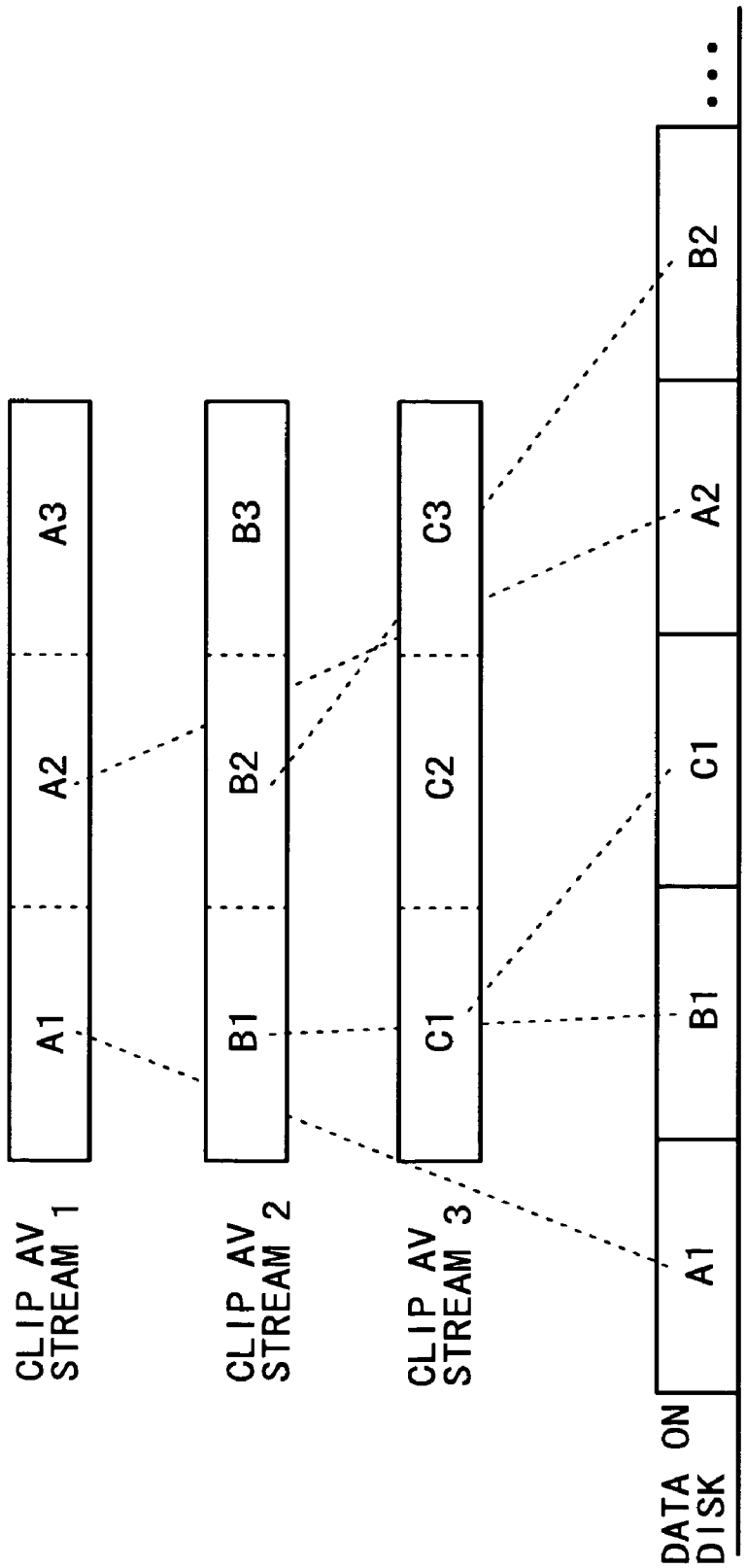
FIG. 11 is an explanatory view of a method whereby a plurality of clips are interleaved and recorded.

How a plurality of clips are multiplexed and recorded will now be described with reference to FIG. 11. As shown in FIG. 11, when AV stream data items corresponding to the play items of multiple angles are to be recorded to the recording medium 100, the AV stream data of the angles involved may be interleaved in increments of an angle change unit (the smallest increment in which angles can be changed), such as A1, B1, C1, A2, B2, C2, A3, B3 and C3. This arrangement minimizes the jump time required for an angle change per play item.

Figure 12:
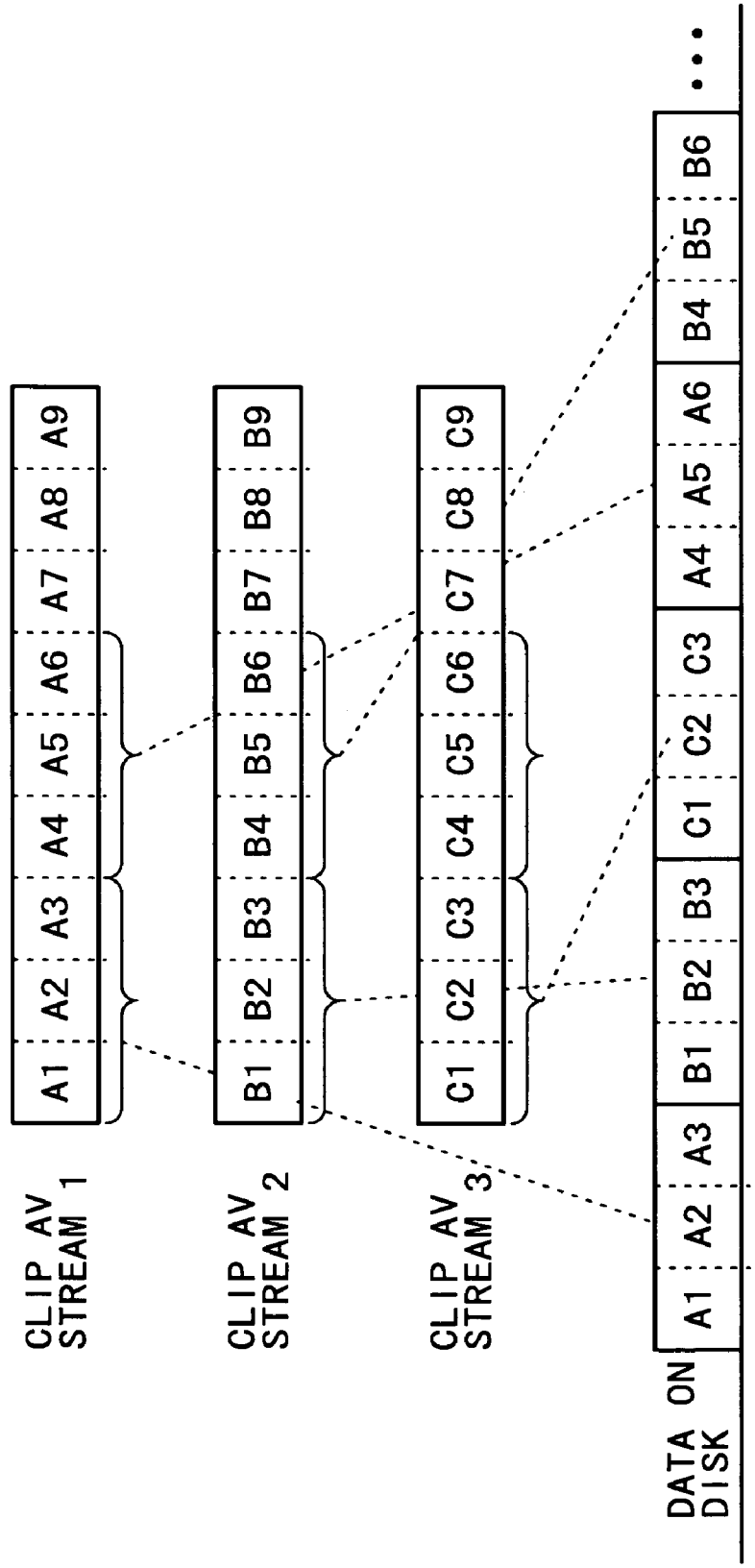
FIG. 12 is an explanatory view of another method whereby a plurality of clips are interleaved and recorded.

Described below with reference to FIG. 12 is another method whereby a plurality of clips are multiplexed and recorded. As shown in FIG. 12, when AV stream data items corresponding to the play items of multiple angles are to be recorded to the recording medium 100, the AV stream data of the angles involved may be interleaved in increments of a plurality of (e.g., three) consecutive angle change units (e.g., A1, A2 and A3 as a group; B1, B2 and B3 as another group; and C1, C2 and C3 as yet another group out of A1, B1, C1, A2, B2, C2, A3, B3 and C3). When the AV stream data items recorded in interleaved fashion as shown in FIG. 12 are reproduced with angles changed, the addresses of the angle change points (e.g., source packet numbers x1, x2, x3, etc., corresponding to the timestamps T1, T2, T3, etc., as the read start addresses of the AV stream data A1, A2, A3, etc., in FIG. 13) are acquired from EP_map of each AV stream as in the case of FIG. 9.

As described above with reference to FIG. 12, where each group of consecutive angle change units constitutes an ILVU (interleaved unit), the jump time required for an angle change from one play item to another is longer than in the example of FIG. 11, but the amount of management data in the segmented file data is made smaller than in the earlier example. In the case of FIG. 12, the amount of management data in the segmented file data is about one third of the amount required in the example of FIG. 11.

When recording multi-angle AV stream data to the recording medium 100, the user may choose one of the two recording methods above for multiplexing the clips to be recorded as shown in FIGS. 11 and 12. The choice depends on the priority being given either to the access speed of the drive reproducing data from the recording medium 100 or to the amount of management data in the file data.

Figure 13:
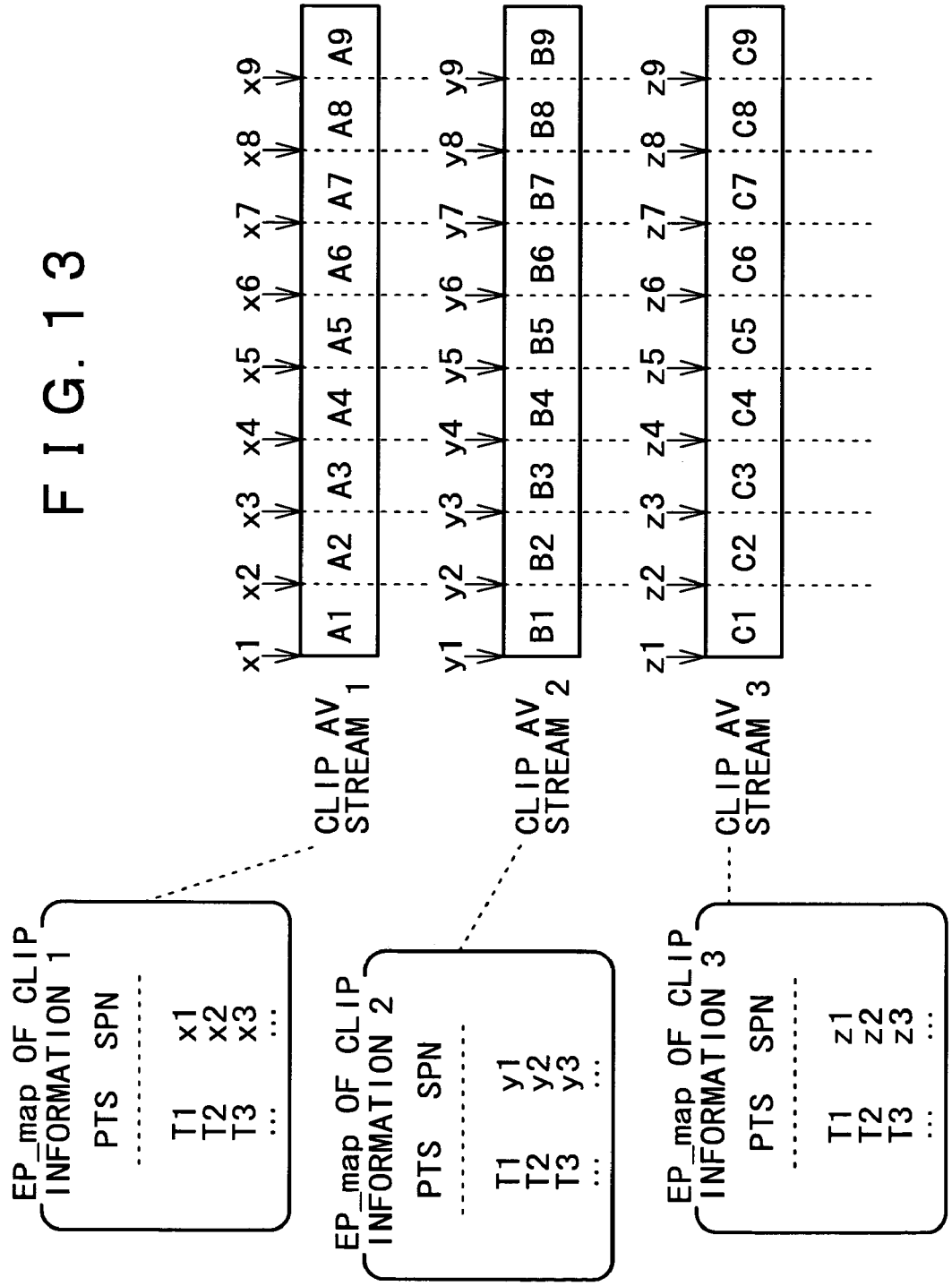
FIG. 13 is a schematic view presenting data content of clip information files.

In the example of FIG. 13, all entry points contained in each EP_map are angle change points. If the entry points in any EP_map include those that are not angle change points, that EP_map may record flags indicating whether or not each of the entry points therein is an angle change point, as illustrated in FIG. 14.

Figure 14:
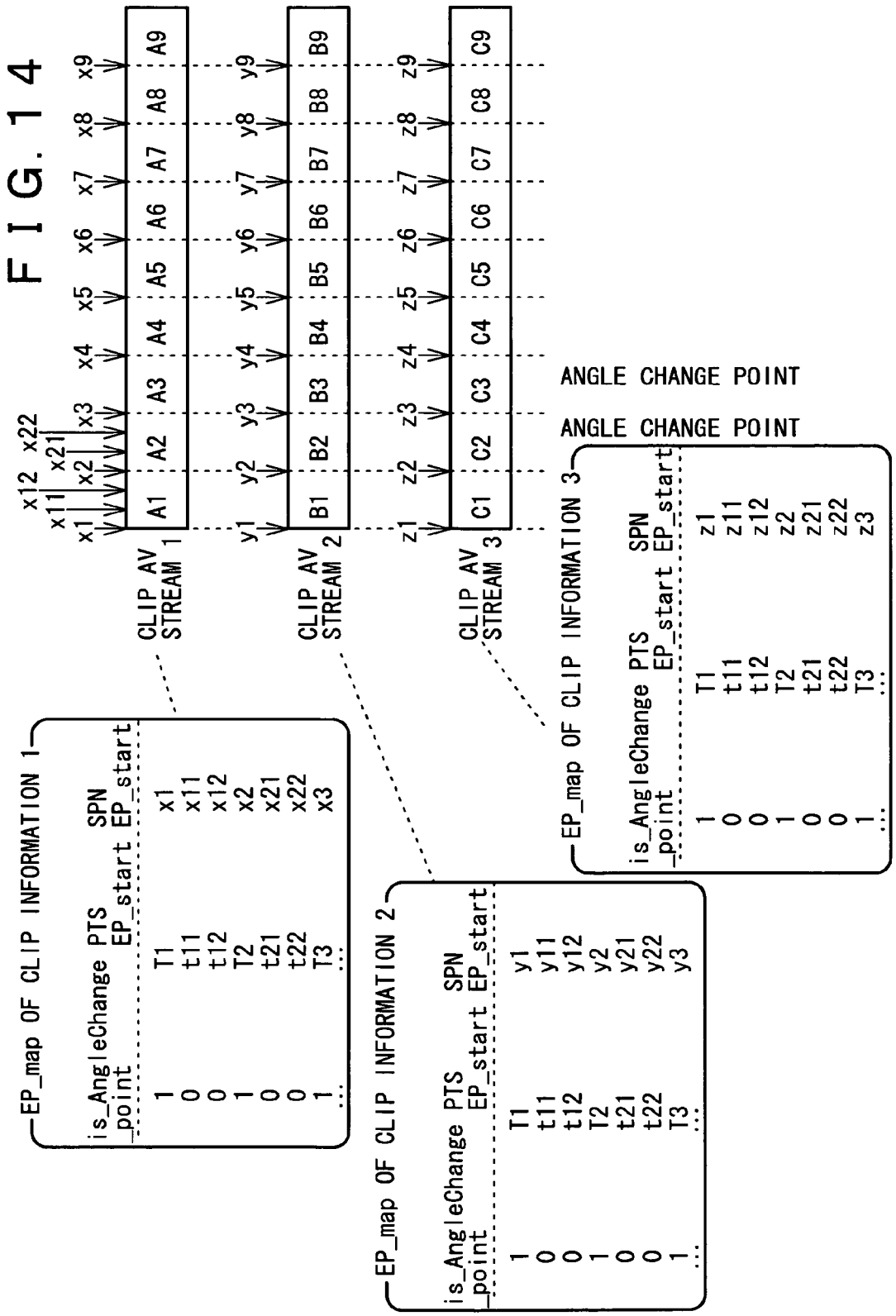
FIG. 14 is a schematic view depicting data content of clip information files applicable to the method shown in FIG. 12.

As shown in FIG. 14, each of the entry points in EP_map for the clip information 1 corresponding to the clip 1 (clip AV stream 1) has field data made up of "is_AngleChange_point," "PTS_EP_start," and "SPN_EP_start."

The field data "is_AngleChange_point" indicates whether angles can be changed at the entry point in question. The field data "SPN_EP_start" denotes the packet number corresponding to that entry point. The data field "PTS_EP_start" represents the display start time of the entry point.

Illustratively, angles can be changed at the entry points whose "SPN_EP_start" is x1, x2 or x3. The data "is_AngleChange_point" is "1" for each of these entry points. By contrast, angles cannot be changed at the entry points whose "SPN_EP_start" is x11 or x12. In this case, "is_AngleChange_point" is "0" for each entry point. In other words, the field data "is_AngleChange_point" being set to "0" signifies that seamless angle change is not guaranteed at the entry point in question, i.e., that AV stream data may or may not be supplied continuously at a required bit rate.

The same applies to EP_map for the clip information 2 corresponding to the clip 2 (clip AV stream 2). Angles can be changed at the entry points whose "SPN_EP_start" is y1, y2 or y3. In this case, "is_AngleChange_point" is also "1" for each entry point.

The same also applies to EP_map for the clip information 3 corresponding to the clip 3 (clip AV stream 3). Angles can be changed at the entry points whose "SPN_EP_start" is z1, z2 or z3. Here, "is_AngleChange_point" is also "1" for each entry point.

Suppose that AV stream data recorded in interleaved fashion as shown in FIG. 12 is to be reproduced with angles changed. In such a case, the addresses of angle change points (e.g., source packet numbers x1, x2, x3, etc., corresponding to timestamps T1, T2, T3, etc., as the read start addresses of AV stream data A1, A2, A3, etc., in FIG. 14) are acquired from EP_map of each AV stream as depicted in FIG. 14, as well as in FIG. 9 as discussed earlier.

As described above, when recording a plurality of clips of multi-angle AV stream data in a multiplexed manner to the recording medium 100, the user may choose in advance the number of consecutive angle change units (each being the smallest increment in which angles can be changed). The choice depends on the priority being given either to the access speed of the drive reproducing data from the recording medium 100 or to the amount of management data in the file data. In the example of FIG. 11, the number of consecutive angle change units for three angles is 1. In the example of FIG. 12, the number of consecutive angle change units for three angles is 3.

The range of numbers M of consecutive angle change units for allowing data to be reproduced without interruption is determined by a number of factors: the time required for a jump over a predetermined distance for reproduction, the speed at which to read data from such jumps, the rate for AV streams to be recorded, and the number of angles involved.

Figure 15:
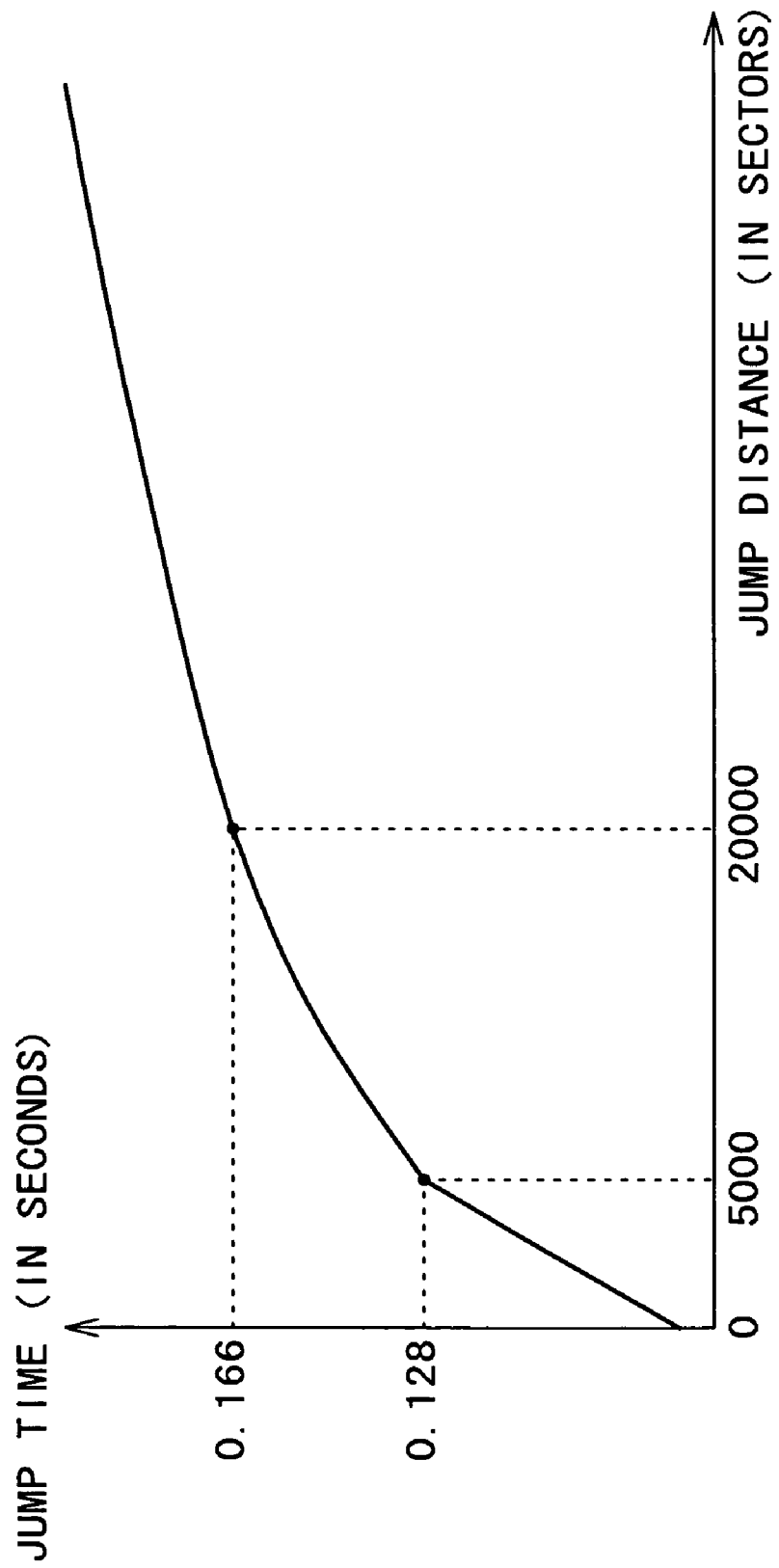
FIG. 15 is an explanatory view illustrating relations between jump distances and jump times.

As shown illustratively in FIG. 15, the capability of the reading unit 28 as part of the reproduction unit 3 in the recording/reproducing apparatus 1 determines relations between jump distances for continuously reproducing discontinuous cells on the one hand, and the jumps times required to execute such jumps on the other hand.

For example, with the data read rate set at 54 Mbps, if a jump over 5,000 sectors is needed in order to consecutively reproduce discontinuous cells, then a jump time of 0.128 seconds is required. For a jump over 20,000 sectors, a jump time of 0.166 seconds is needed.

The memory 34 retains a table of jump times associated with jump distances. The control unit 23 references that table in the memory 34 when determining an appropriate recording method.

Figure 16:
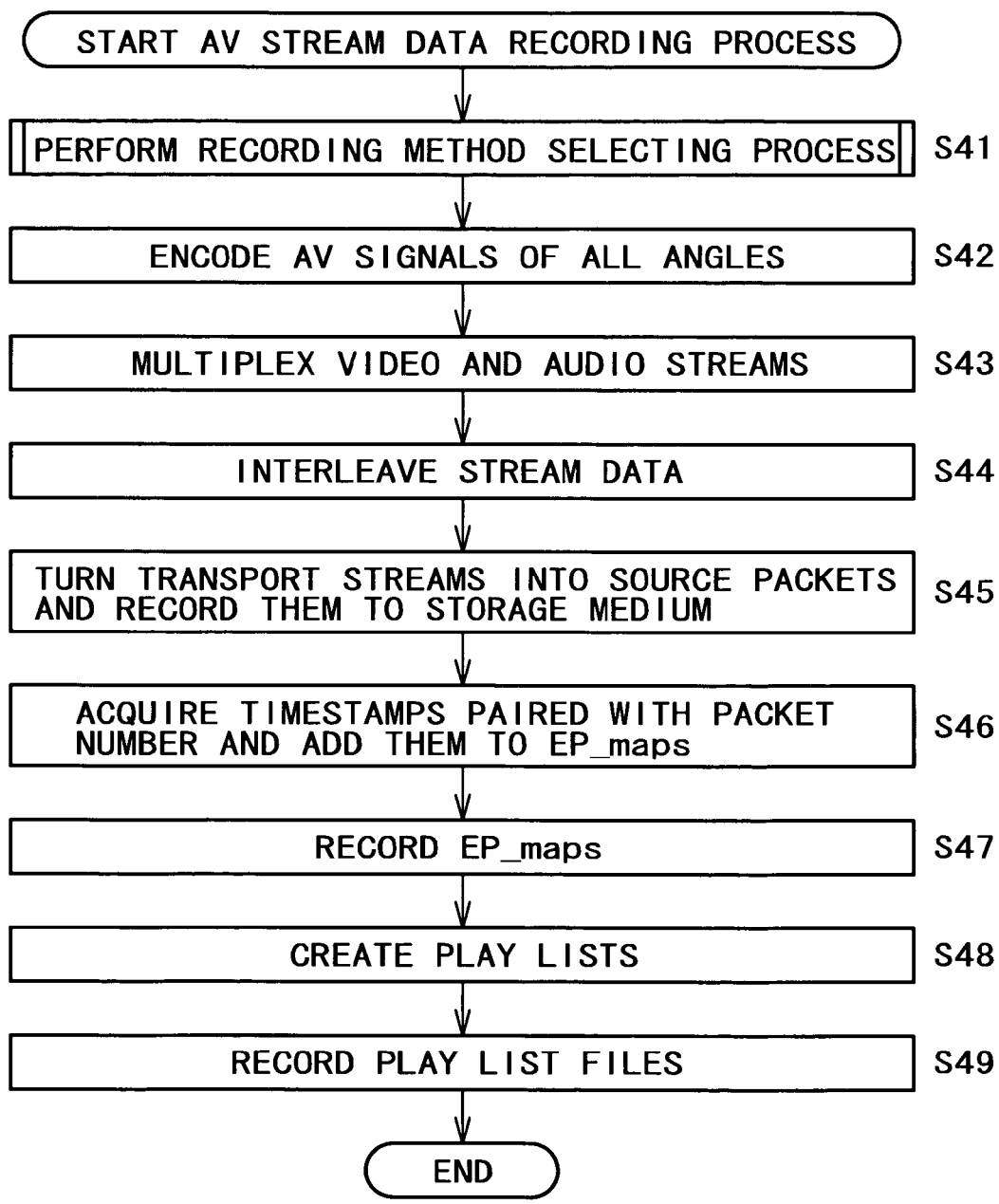
FIG. 16 is a flowchart of steps constituting a process for recording AV stream data for multi-angle use.
Figure 17:
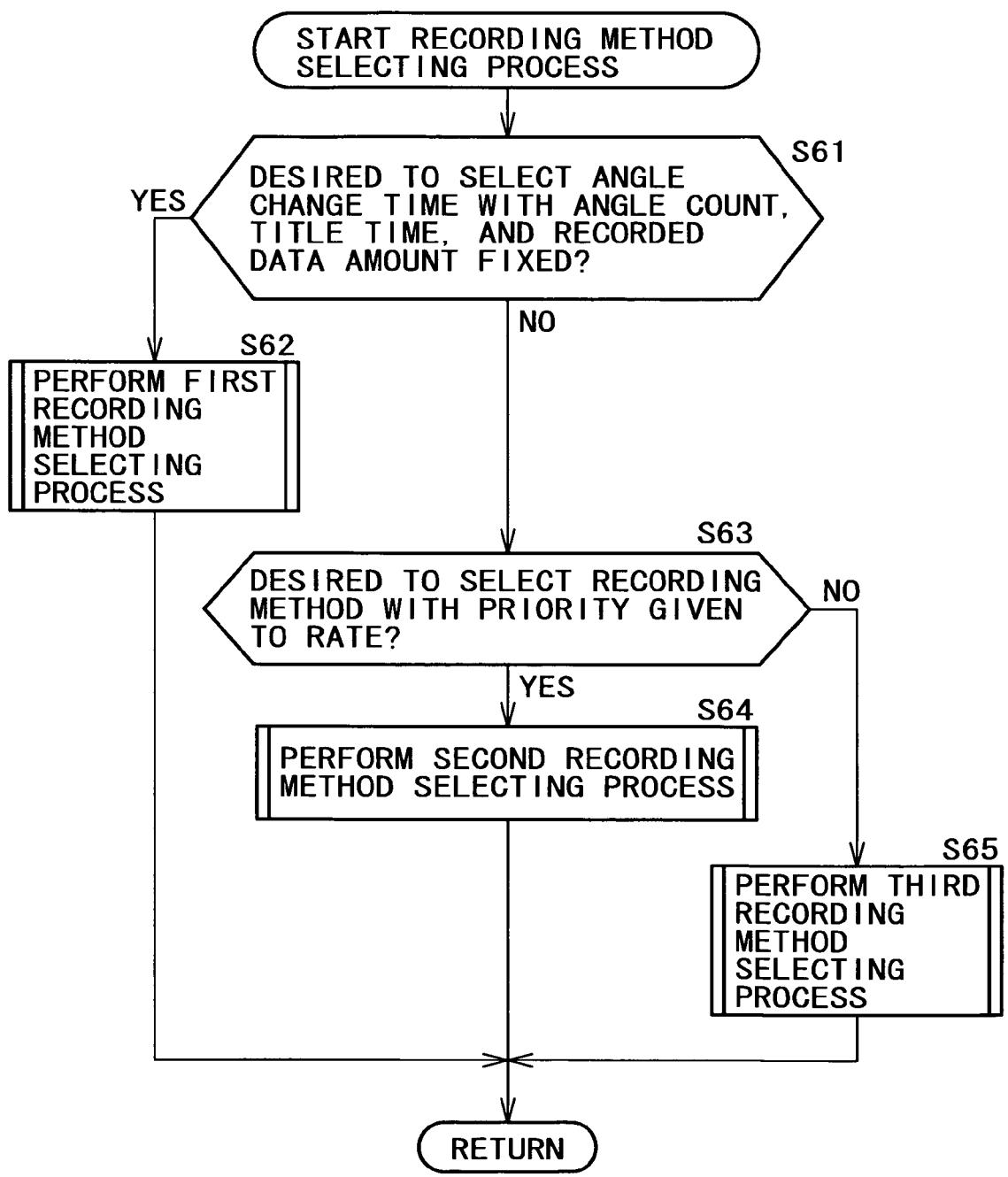
FIG. 17 is a flowchart of steps constituting a recording method selecting process.

Described below with reference to the flowchart of FIG. 16 is the process for recording AV stream data to the recording medium 100 for multi-angle use. In step S41, a recording method selecting process, to be described later with reference to FIG. 17, is carried out. In step S42, the AV encoder 15 encodes video signals of the segments involved into a video stream starting with a closed GOP, and encodes audio signals of the segments into an audio stream. The encoding process is performed on the video and audio signals for all angles in keeping with the parameters designated by the recording method selected by the recording method selecting process in step S41.

In step S43, the multiplexer 16 multiplexes the video and audio streams of the segments involved into a transport stream per segment. In step S44, the AV stream data for each angle is interleaved according to the data layout designated by the recording method selected by the recording method selecting process in step S41. The multiplexer 16 performs its multiplexing process in such a manner that the first packet is always a video packet starting with an I picture of a closed GOP.

In step S45, the source packetizer 19 turns the transport stream of each segment into source packets. The writing unit 22 records the source packets to the recording medium 100 as AV stream files. This is how multi-angle clip AV stream files formed by the transport streams composed of the recorded source packets are created on the recording medium 100. For all angles, the packet ID (PID) is the same for the video packets in the transport streams, and the packet ID is also the same for the audio packets in the transport streams.

In step S46, the multiplexed stream analysis unit 18 acquires the timestamp of the I picture heading the transport stream per segment, and the packet number of the packet whose payload starts with an I picture in the transport stream. The control unit 23 adds the acquired pair of the timestamp and packet number to EP_map (if EP_map does not exist, it is created).

In step S47, the control unit 23 causes the writing unit 22 to record EP_map created for each of the clip AV stream files to a predetermined area on the recording medium 100 in concentrated fashion.

In step S48, the control unit 23 creates play lists. In step S49, the control unit 23 causes the writing unit 22 to record play list files having data structures representing each of the segments in play item form, to a predetermined area on the recording medium 100 in concentrated fashion. If, as shown in FIG. 14, the entry points placed in EP_map include those that are not angle change points, then the angle change points are established on the basis of the flags in EP_map (each flag is either "1" or "0") when the control unit 23 creates play lists in step S48. This is how AV stream data for multi-angle use is recorded to the recording medium 100.

Described below with reference to the flowchart of FIG. 17 is the recording method selecting process carried out in step S41 of FIG. 16. In step S61, according to the user's operation input from the terminal 24, the control unit 23 determines whether or not to select an angle change time with an angle count, a title time, and a recorded data amount all fixed.

If in step S61 the angle change time is found to be selected with the angle count, title time, and recorded data amount fixed, step S62 is reached. In step S62, a first recording method selecting process, to be discussed later with reference to FIG. 18, is performed. At the end of the process in step S62, control is passed on to step S42 in FIG. 16.

If in step S61 the angle change time is not found to be selected with the angle count, title time, and recorded data amount fixed, step S63 is reached. In step S63, based on the user's operation input from the terminal 24, the control unit 23 determines whether or not to select the recording method with priority given to the rate.

If in step S63 the recording method is found to be selected with priority given to the rate, then step S64 is reached. In step S64, a second recording method selecting process, to be described later with reference to FIG. 21, is carried out. At the end of the process in step S64, control is passed on to step S42 in FIG. 16.

Figure 23:
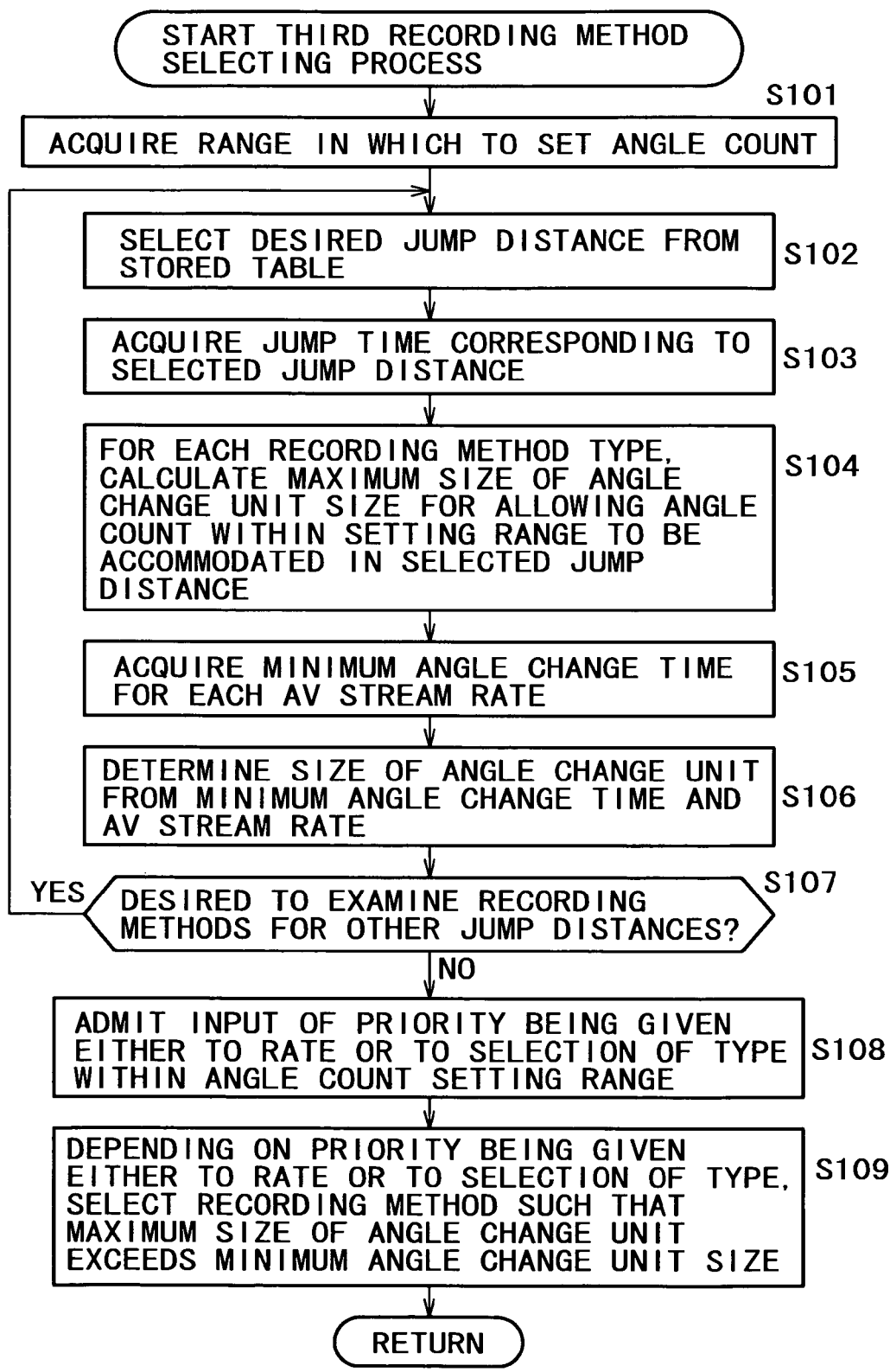
FIG. 23 is a flowchart of steps constituting a third recording method selecting process.

If in step S63 the recording method is not found to be selected with priority given to the rate, then a recording method with the priority given to the angle count is selected. That is, step S65 is reached and a third recording method selecting process, to be discussed later with reference to FIG. 23, is executed. At the end of the process in step S65, control is passed on to step S42 in FIG. 16.

In the manner described above, one of a plurality of recording method selecting processes is selected as desired by the user whose operation input is supplied through the terminal 24.

It is assumed that one of three data recording methods, i.e., types A, B and C, is to be selected. Type A is a method whereby the number M of consecutive angle change units per ILVU is set to 1; type B is a method whereby the number M of consecutive angle change units per ILVU is set to 2; and type C is a method whereby the number M of consecutive angle change units per ILVU is set to 4. If the selected data recording method is type A, one angle change unit is found per ILVU. In this case, data is recorded in the following order: A1, B1, C1, A2, B2, C2, A3, B3, C3, etc. If the selected data recording method is type B, two angle change units are furnished per ILVU. Data is then recorded in the order of A1, A2, B1, B2, C1, C2, A3, A4, B3, B4, etc. If the selected data recording method is type C, four angle change units are provided per ILVU. In that case, data is recorded in the following order: A1, A2, A3, A4, B1, B2, B3, B4, C1, C2, C3, C4, etc.

The first recording method selecting process performed in step S62 of FIG. 17 will now be described with reference to the flowchart of FIG. 18. In step S71, according to the user's operation input from the terminal 24, the control unit 23 acquires an angle count or counts, a title time required for the title to be recorded (i.e., AV data 1), and a target value of the recorded data amount assigned to the title.

In step S72, the control unit 23 calculates an average rate for one or a plurality of angle counts selected, on the basis of what was acquired in step S71: the angle count or counts, the time for the title to be recorded, and the target value of the recorded data amount assigned to the title. The average rate $R_{ave}$ is obtained using the expression (1) below:

$$\text{average rate } R_{ave} = \text{data amount/angle count/title time} \qquad (1)$$

Illustratively, if there are three angles, if the title time is two hours, and if the data amount is 20 GB, then the average rate $R_{ave}$ is 3.33 (GB/h)=7.40×10$^6$ (bps).

In step S73, the control unit 23 selects an appropriate jump distance "j" from the table held in the memory 34 in accordance with the user's operation input from the terminal 24. In step S74, the control unit 23 references the memory 34 to acquire a jump time $T_{acc}$ corresponding to the jump distance "j" selected in step S73. It is assumed here that the table in the memory 34 retains jump times $T_{acc}$ corresponding to the jump distances "j" over 5,000 sectors, 20,000 sectors, and 40,000 sectors.

In step S75, from the jump time acquired in step S74, the control unit 23 calculates a minimum angle change time "t" corresponding to an AV stream rate $R_{max}$ which is at least equal to the average rate $R_{ave}$. Illustratively, the AV stream rate $R_{max}$ is $10\times10^6$ (bps), $20\times10^6$ (bps), $30\times10^6$ (bps), or $40\times10^6$ (bps). The minimum angle change time "t" is calculated using the expression (3) obtained by modifying the expression (2) below:

$$R_{ud} \times (t - T_{acc}) = R_{max} \times t \qquad (2)$$

$$t = T_{acc} \times R_{max} / (R_{ud} - R_{max}) \qquad (3)$$

where, $R_{ud}$ stands for a data read rate. To reproduce data seamlessly requires making the minimum angle change time longer than the sum of the times taken up by data read and jump operations. More specifically, when a given ILVU of data is read at the data read rate $R_{ud}$, the read data is reproduced successively at a predetermined AV stream rate. If a jump to the location from which the next ILVU starts getting read is not completed between the termination of the data read operation and the end of the ILVU data reproduction, then the ongoing data reproduction is interrupted. On the left side of the expression (2) above, $(t-T_{acc})$ denotes the time it takes to read one ILVU of data. It follows that $R_{ud} \times (t-T_{acc})$ represents the data amount of one ILVU. On the right side of the expression (2), "$R_{max} \times t$" stands for the amount of the data reproduced during the minimum angle change time "t" at the AV stream rate of $R_{max}$.

In step S76, the control unit 23 acquires an angle change time $T_c$ desired by the user whose operation input is supplied through the terminal 24. From the AV stream rate and the angle change time $T_c$ desired by the user, the control unit 23 determines an angle change unit size $U_{size}$ using the expression (4) shown below. The angle change time $T_c$ must be longer than the minimum angle change time "t." If the angle change time $T_c$ desired by the user is found shorter than the minimum angle change time "t," then the angle change unit size $U_{size}$ will not be calculated. The expression for use in step S76 is as follows:

$$U_{size} = T_c \times R_{max}/8 + \alpha \qquad (4)$$

where, $\alpha$ denotes a coefficient of the overhead generated during data read operations. This coefficient is specific to each recording medium. Illustratively, $\alpha$ is about twice as large as media access block size or EEC block size and is approximately $0.125 \times 10^6$ (bytes).

In step S77, the control unit 23 calculates, for each of angle count types A through C, a maximum size $U_{max}$ of the angle change unit for allowing each angle count N to be accommodated within the selected jump distance using the expression (5) below:

$$U_{max} = j/((2N-2)M) \qquad (5)$$

In step S78, the control unit 23 selects the recording method such that the maximum size $U_{max}$ of the angle change unit exceeds the angle change unit size $U_{size}$.

In particular, the calculated maximum size $U_{max}$ of the angle change unit is compared with the angle change unit size $U_{size}$ for each candidate recording method. The recording method whereby the calculated maximum size $U_{max}$ of the angle change unit is greater than the angle change unit size $U_{size}$ is then selected as a usable recording method.

In step S79, according to the user's operation input from the terminal 24, the control unit 23 determines whether or not to examine the recording methods for any jump distance other than the distance selected in step S73. If in step S79 the recording methods are found desired to be examined for any other jump distance, step S73 is reached again and the subsequent steps are repeated on that jump distance.

If in step S79 the recording methods are not found desired to be examined for any jump distance other than the distance selected in step S73, step S80 is reached. In step S80, the control unit 23 presents the user with information about the combinations of the calculated AV stream rates, angle change times, and recording methods for each of the jump distances involved. The information is output through the terminal 24 and displayed illustratively on a suitable display device so that the user may verify what is displayed before selecting an appropriate recording method. In turn, the control unit 23 admits the input of the recording method desired by the user through the terminal 24. Control is then passed on to step S42 of FIG. 16.

Typical results of the calculations above are explained below with reference to FIGS. 19A, 19B and 19C. These figures indicate some results of the calculations performed with the data read rate $R_{ud}$ set for 54 Mbps. FIG. 19A is an explanatory view of representative results of the calculations performed on the jump distance of 5,000 sectors selected in step S73, with the jump time $T_{acc}$ set for 0.128 seconds. FIG. 19B is an explanatory view of typical results of the calculations carried out on the jump distance of 20,000 sectors selected in step S73, with the jump time $T_{acc}$ set for 0.166 seconds. FIG. 19C is an explanatory view of what has resulted from the calculations executed on the jump distance of 40,000 sectors selected in step S73, with the jump time $T_{acc}$ set for 0.217 seconds.

Illustratively, if the jump distance is 5,000 sectors, if the jump time $T_{acc}$ is 0.128 seconds, and if the angle change time $T_c$ desired by the user is 0.5 seconds, then $U_{size}$, incremented in $2^{20}$ bytes, is calculated at 0.721 ($2^{20}$ bytes) when $R_{max}=10\times10^6$ (bps), as shown in FIG. 19A. $U_{size}=1.317$ ($2^{20}$ bytes) when $R_{max}=20\times10^6$ (bps); $U_{size}=1.913$ ($2^{20}$ bytes) when $R_{max}=30\times10^6$ (bps); and $U_{size}=2.509$ ($2^{20}$ bytes) when $R_{max}=40\times10^6$ (bps). Similarly, the same relations between $R_{max}$ and $U_{size}$ apply to the case where the jump distance is 20,000 sectors and the jump time $T_{acc}$ is 0.166 seconds, as well as to the case where the jump distance is 40,000 sectors and the jump time $T_{acc}$ is 0.217 seconds, as indicated in FIGS. 19B and 19C. In the two cases of FIGS. 19B and 19C, however, $U_{size}$ cannot be calculated because "t" is greater than $T_c$ with $R_{max}=40\times10^6$ (bps) when the jump distance is 20,000 sectors or 40,000 sectors.

The calculation of the maximum size $U_{max}$ of the angle change unit by use of the expression (5) above will now be described. In the example of FIG. 19A, if the selected jump distance is 5,000 sectors and if the jump time $T_{acc}$ is 0.128 seconds, then the maximum size $U_{max}$ of the angle change unit with M=1 for N=3, 9, and 20, incremented in $2^{20}$ bytes, is calculated at 2.441 ($2^{20}$ bytes), 0.610 ($2^{20}$ bytes), and 0.257 ($2^{20}$ bytes) respectively. Likewise, the maximum size $U_{max}$ of the angle change unit with M=2 for N=3, 9 and 20 is calculated at 1.221 ($2^{20}$ bytes), 0.305 ($2^{20}$ bytes), and 0.128 ($2^{20}$ bytes) respectively. With M=4 for N=3, 9, and 20, the maximum size $U_{max}$ is calculated at 0.610 ($2^{20}$ bytes), 0.153 ($2^{20}$ bytes), and 0.064 ($2^{20}$ bytes) respectively.

In the example of FIG. 19B, if the selected jump distance is 20,000 sectors and if the jump time $T_{acc}$ is 0.166 seconds, then the maximum size $U_{max}$ Of the angle change unit with M=1 for N=3, 9, and 20 is calculated at 9.766 ($2^{20}$ bytes), 2.411 ($2^{20}$ bytes), and 1.028 ($2^{20}$ bytes) respectively. Likewise, the maximum size $U_{max}$ of the angle change unit with M=2 for N=3, 9, and 20 is calculated at 4.883 ($2^{20}$ bytes), 1.221 ($2^{20}$ bytes), and 0.514 ($2^{20}$ bytes) respectively. With M=4 for N=3, 9, and 20, the maximum size $U_{max}$ is calculated at 2.441 ($2^{20}$ bytes), 0.610 ($2^{20}$ bytes), and 0.257 ($2^{20}$ bytes) respectively.

Furthermore, in the example of FIG. 19C, if the selected jump distance is 40,000 sectors and if the jump time $T_{acc}$ is 0.217 seconds, then the maximum size $U_{max}$ of the angle change unit with M=1 for N=3, 9, and 20 is calculated at 19.531 ($2^{20}$ bytes), 4.883 ($2^{20}$ bytes), and 2.056 ($2^{20}$ bytes) respectively. Likewise, the maximum size $U_{max}$ of the angle change unit with M=2 for N=3, 9, and 20 is calculated at 9.766 ($2^{20}$ bytes), 2.441 ($2^{20}$ bytes), and 1.028 ($2^{20}$ bytes) respectively. With M=4 for N=3, 9 and 20, the maximum size $U_{max}$ is calculated at 4.883 ($2^{20}$ bytes), 1.221 ($2^{20}$ bytes) and 0.514 ($2^{20}$ bytes) respectively.

On the basis of the calculated results above, the maximum size $U_{max}$ of the angle change size is compared with the angle change unit size $U_{size}$ for each of the candidate recording methods. The recording method whereby the calculated maximum size $U_{max}$ of the angle change unit is greater than the angle change unit size $U_{size}$ is then selected as a usable recording method. More particularly, the recording methods marked "OK" in FIGS. 19A through 19C are selected as usable methods. Illustratively, if the jump distance is 5,000 sectors and if the jump time $T_{acc}$ is 0.128 seconds, then the AV stream rate $R_{max}$ of $10 \times 10^6$ (bps), $20 \times 10^6$ (bps) or $30 \times 10^6$ (bps) with M=1 for the angle count of 3, or of $10 \times 10^6$ (bps) with M=2 for the angle count of 3, may be selected as a usable recording method.

For example, if the angle count of 3 is selected in step S71 and if the user selects the jump distance of 5,000 sectors only, then the number of consecutive angle change units is maximized with M=2 when the AV stream rate $R_{max}$ is calculated at $10 \times 10^6$ (bps), as shown in FIG. 19A. If the user also selects the jump distance of 20,000 sectors, the recording method whereby the number of consecutive angle change units becomes 4 (M=4) may be selected, with the AV stream rate $R_{max}$ at $10 \times 10^6$ (bps), $20 \times 10^6$ (bps), or $30 \times 10^6$ (bps). If the user further selects the jump distance of 40,000 sectors, then the recording method whereby the number of consecutive angle change units becomes 4 (M=4) may be selected, with the AV stream rate $R_{max}$ at $10 \times 10^6$ (bps), $20 \times 10^6$ (bps), or $30 \times 10^6$ (bps).

If the angle count of 9 is selected in step S71 and if the user selects the jump distance of 20,000 sectors, then the number of consecutive angle change units is maximized with M=2 when the AV stream rate $R_{max}$ is calculated at $10 \times 10^6$ (bps). If the user selects the jump distance of 40,000 sectors, then the number of consecutive angle change units is maximized with M=4 when the AV stream rate $R_{max}$ is calculated at $10 \times 10^6$ (bps) or $20 \times 10^6$ (bps). If the angle count of 20 is selected in step S71 and if the user selects the jump distance of 20,000 sectors, then the only selectable recording method is one whereby the maximum number of consecutive angle change units is 1 (M=1) and the AV stream rate $R_{max}$ is calculated at $10 \times 10^6$ (bps). If the user selects the jump distance of 40,000 sectors, then the number of consecutive angle change units is maximized with M=4 when the AV stream rate $R_{max}$ is calculated at $10 \times 10^6$ (bps).

Through the processes discussed above, it is possible to select the recording methods suitable for recording data for eventual seamless reproduction based on the user-designated conditions reflecting the number of angles involved, the time required for the title to be recorded, and recorded data amount. Any one of these viable recording methods may then be selected by the user.

As described above, the amount of information for managing data layout can be reduced by raising the number of consecutive angle change units. With the minimum number of consecutive angle change units increased, it is possible to lower the number of data items (i.e., total ILVU count) for each of the angle counts involved. That is, as shown in FIG. 20, if the title time is the same for the same angle count, the number of data items in effect when M=1 is double the count in effect when M=2 and four times the count in effect when M=4.

The amount of information for managing data layout increases in proportion to the number of data items. An increase in the time required for recording the title translates into a larger number of data items, so that the amount of information for managing data layout is also raised. For these reasons, if there are a plurality of recording methods whereby the storage capacity of the recording medium is used effectively in keeping with the user-established conditions for recording data, suitable arrangements may be implemented to automatically select the recording method where the number of consecutive angle change units is maximized, or to prompt the user to choose that recording method.

Described below with reference to the flowchart of FIG. 21 is the second recording method selecting process carried out in step S64 of FIG. 17. In step S91, the control unit 23 acquires a target value $R_{max}$ of the AV stream rate in keeping with the user's operation input from the terminal 24.

In step S92, the control unit 23 selects an appropriate jump distance "j" from a table in the memory 34 according to the user's operation input from the terminal 24. In step S93, the control unit 23 references the memory 34 to acquire a jump time $T_{acc}$ corresponding to the jump distance selected in step S92. It is assumed that the table in the memory 34 contains jump times $T_{acc}$ corresponding to the jump distances of 5,000 sectors, 20,000 sectors, and 40,000 sectors.

In step S94, the control unit 23 calculates a minimum angle change time "t" corresponding to the target value $R_{max}$ of the AV stream rate from the jump time $T_{acc}$ acquired in step S93 and from the data read rate $R_{ud}$ of the recording/reproducing apparatus 1. The minimum angle change time "t" is calculated by use of the expression (3) shown above.

In step S95, the control unit 23 determines the size $U_{size}$ of a minimum angle change unit from the minimum angle change time "t" acquired in step S94 and from the AV stream rate $R_{max}$, using the expression (6) below:

$$U_{size} = t \times R_{max}/8 + \alpha \qquad (6)$$

where, $\alpha$ denotes the coefficient of the overhead generated during data read operations. This coefficient is specific to each recording medium. Illustratively, $\alpha$ is about $0.125 \times 10^6$ (bytes).

In step S96, the control unit 23 calculates the number of minimum angle change units within the jump distance selected in step S92, from the minimum angle change unit size $U_{size}$ computed in step S95.

In step S97, the control unit 23 examines a recordable angle count N for each of the minimum angle change units within the jump distance calculated in step S96.

The number of angle change units that should go into the jump distance is given as (2N−2)M, where N stands for the number of angles and M denotes the number of consecutive angle change units for the same angle. The number M of consecutive angle change units is 1, 2 and 4 for the recording method types A, B and C respectively. Therefore, a maximum usable angle count N is a value that will not exceed what is obtained by dividing the jump distance selected in step S92 by the minimum angle change unit size $U_{size}$ (obtained in step S96).

In step S98, based on the user's operation input from the terminal 24, the control unit 23 determines whether or not to examine the recording methods for any jump distance other than the distance selected in step S92. If in step S98 the recording methods are found desired to be examined for any other jump distance, step S92 is reached again and the subsequent steps are repeated on that jump distance.

If in step S98 the recording methods are not found desired to be examined for any jump distance other than the distance selected in step S92, then step S99 is reached. In step S99, the control unit 23 selects the method whereby the largest number of data items can be recorded consecutively for the same angle as long as the necessary angle count N for recording data as desired by the user is provided and the process goes on to step S42.

Typical results of the calculations carried out by the second recording method selecting process above are shown in FIGS. 22A, 22B and 22C. As with the first process, these figures indicate results of the calculations performed with the data read rate $R_{ud}$ set for 54 Mbps.

FIG. 22A is an explanatory view of representative results of the calculations performed on the jump distance of 5,000 sectors selected in step S92, with the jump time $T_{acc}$ set for 0.128 seconds. FIG. 22B is an explanatory view of typical results of the calculations carried out on the jump distance of 20,000 sectors selected in step S92, with the jump time $T_{acc}$ set for 0.166 seconds. FIG. 22C is an explanatory view of what has resulted from the calculations executed on the jump distance of 40,000 sectors selected in step S92, with the jump time $T_{acc}$ set for 0.217 seconds.

Suppose that in reference to FIG. 22A, the target value $R_{max}$ of the AV stream rate acquired in step S91 is $10 \times 10^6$ (bps) and that the jump distance selected in step S92 is 5,000 sectors. On these assumptions, the minimum angle change time "t" is calculated at 0.157 seconds using the expression (3) and the minimum angle change unit size $U_{size}$ at 0.31 ($2^{20}$ bytes) using the expression (6). With 31 minimum angle change units thus accommodated in the jump distance, the maximum angle count N in effect when (2N−2)M is 31 or less is 16 for M=1, 8 for M=2, and 4 for M=4. It follows that if the user needs 5 angles, then the recording method to be selected is one whereby the AV stream rate $R_{max}$ is $10 \times 10^6$ (bps), the jump distance is 5,000 sectors, the number M of consecutive angle change units is 2, and the angle count N is 5.

Likewise, if the target value $R_{max}$ of the AV stream rate is $20 \times 10^6$ (bps) and if the jump distance is 5,000 sectors, then the minimum angle change time "t" is calculated at 0.203 seconds and the minimum angle change unit size $U_{size}$ at 0.61 ($2^{20}$ bytes). With 16 minimum angle change units thus accommodated in the jump distance, the maximum angle count N in effect when (2N−2)N is 16 or less is 9 for M=1, 5 for M=2, and 3 for M=4.

If the target value $R_{max}$ of the AV stream rate is $30 \times 10^6$ (bps) and if the jump distance is 5,000 sectors, then the minimum angle change time "t" is calculated at 0.288 seconds and the minimum angle change unit size $U_{size}$ at 1.15 ($2^{20}$ bytes). With 8 minimum angle change units thus accommodated in the jump distance, the maximum angle count N in effect when (2N−2)M is 8 or less is 5 for M=1, 3 for M=2, and 2 for M=4.

If the target value $R_{max}$ of the AV stream rate is $40 \times 10^6$ (bps) and if the jump distance is 5,000 sectors, then the minimum angle change time "t" is calculated at 0.494 seconds and the minimum angle change unit size $U_{size}$ at 2.48 ($2^{20}$ bytes). With 3 minimum angle change units thus accommodated in the jump distance, the maximum angle count N in effect when (2N−2)M is 3 or less is 5 for M=1, 1 for M=2, and 1 for M=4.

The same calculations also apply if the jump distance selected in step S92 is 20,000 sectors and if the jump time $T_{acc}$ is 0.166 seconds. The results of the calculations are indicated in FIG. 22B. Illustratively, if the user sets the target value $R_{max}$ of the AV stream rate for $40 \times 10^6$ (bps) and decides to need 5 angles, then the number M of consecutive angle change units for the recording method to be selected is 1. If the user sets the target value $R_{max}$ of the AV stream rate for $20 \times 10^6$ (bps) and decides to need 10 angles, then the number M of consecutive angle change units for the recording method to be selected is 2. The same calculations also apply when the jump distance selected in step S92 is 40,000 sectors, with the results of the calculations shown in FIG. 22C. In this example, if the user sets the target value $R_{max}$ of the AV stream rate for $40 \times 10^6$ (bps) and decides to need 5 angles, then the number M of consecutive angle change units for the recording method to be selected is 2. If the user sets the target value $R_{max}$ of the AV stream rate for $20 \times 10^6$ (bps) and decides to need 10 angles, then the number M of consecutive angle change units for the recording method to be selected is 4.

Through the process described above, it is possible to select the recording method whereby data is recorded with the highest priority given to the target value of the AV stream rate for subsequent seamless data reproduction in compliance with user-designated conditions.

Described below with reference to the flowchart of FIG. 23 is the third recording method selecting process carried out in step S65 of FIG. 17. In step S101, the control unit 23 acquires the range in which to set the number of angles on the basis of the user's operation input coming from the terminal 24.

In step S102, according to the user's operation input from the terminal 24, the control unit 23 selects the desired jump distance "j" from a table in the memory 34. In step S103, the control unit 23 references the memory 34 to acquire a jump time $T_{acc}$ corresponding to the jump distance selected in step S102. It is also assumed here that the table in the memory 34 contains jump times $T_{acc}$ corresponding to the jump distances of 5,000 sectors, 20,000 sectors, and 40,000 sectors.

In step S104, the control unit 23 calculates a maximum size $U_{max}$ of the angle change unit for allowing the angle count within the acquired setting range to be accommodated in the selected jump distance for each of recording method types A through C, using the expression (7) below:

$$U_{max} = j/((2N-2)M) \quad (7)$$

In step S105, the control unit 23 acquires the minimum angle change time "t" for each AV stream rate $R_{max}$ using the expression (3) given above.

In step S106, the control unit 23 determines the angle change unit size $U_{size}$ from the minimum angle change time "t" calculated in step S105 and from the AV stream rate $R_{max}$, by use of the expression (6) indicated above.

In step S107, according to the user's operation input from the terminal 24, the control unit 23 determines whether or not to examine the recording methods for any jump distance other than the distance selected in step S102. If in step S107 the recording methods are found desired to be examined for any other jump distance, step S102 is reached again and the subsequent steps are repeated on that jump distance.

If in step S107 the recording methods are not found desired to be examined for any jump distance other than the distance selected in step S102, step S108 is reached. In step S108, given the user's operation input from the terminal 24, the control unit 23 admits the input of the priority being given either to the rate, or to the selection of the method type within the angle count setting range, i.e., to the number of consecutive angle change units.

In step S109, depending on the priority given to the rate or to the selection of the method type, the control unit 23 selects the best recording method such that the maximum size $U_{max}$ of the angle change unit exceeds the minimum angle change unit size $U_{size}$. Control is then passed on to step S42 of FIG. 16.

Typical results of the calculations carried out by the third recording method selecting process above are shown in FIGS. 24A, 24B and 24C. FIG. 24A is an explanatory view of representative results of the calculations performed on the jump distance of 5,000 sectors selected in step S102, with the jump time $T_{acc}$ set for 0.128 seconds. FIG. 24B is an explanatory view of typical results of the calculations carried out on the jump distance of 20,000 sectors selected in step S102, with the jump time $T_{acc}$ set for 0.166 seconds. FIG. 24C is an explanatory view of what has resulted from the calculations executed on the jump distance of 40,000 sectors selected in step S102, with the jump time $T_{acc}$ set for 0.217 seconds.

As indicated by the expression (7) above, the maximum size $U_{max}$ of the angle change unit is determined by the jump distance "j," by the number M of consecutive angle change units, and by the angle count N. If the jump distance selected in step S102 is 5,000 sectors, then $U_{max}$ with M=1 is calculated at 2.441 ($2^{20}$ bytes) for N=3, 0.160 ($2^{20}$ bytes) for N=9, and 0.257 ($2^{20}$ bytes) for N=20; $U_{max}$ with M=2 is calculated at 1.221 ($2^{20}$ bytes) for N=3, 0.305 ($2^{20}$ bytes) for N=9, and 0.128 ($2^{20}$ bytes) for N=20; and $U_{max}$ with M=4 is calculated at 0.610 ($2^{20}$ bytes) for N=3, 0.153 ($2^{20}$ bytes) for N=9, and 0.064 ($2^{20}$ bytes) for N=20, as shown in FIG. 24A.

If the jump distance selected in step S102 is 20,000 sectors, then $U_{max}$ with M=1 is calculated at 9.766 ($2^{20}$ bytes) for N=3, 2.441 ($2^{20}$ bytes) for N=9, and 1.028 ($2^{20}$ bytes) for N=20; $U_{max}$ with M=2 is calculated at 4.883 ($2^{20}$ bytes) for N=3, 1.221 ($2^{20}$ bytes) for N=9, and 0.514 ($2^{20}$ bytes) for N=20; and $U_{max}$ with M=4 is calculated at 2.441 ($2^{20}$ bytes) for N=3, 0.610 ($2^{20}$ bytes) for N=9, and 0.257 ($2^{20}$ bytes) for N=20, as shown in FIG. 24B.

If the jump distance selected in step S102 is 40,000 sectors, then $U_{max}$ with M=1 is calculated at 19.531 ($2^{20}$ bytes) for N=3, 4.883 ($2^{20}$ bytes) for N=9, and 2.056 ($2^{20}$ bytes) for N=20; $U_{max}$ with M=2 is calculated at 9.766 ($2^{20}$ bytes) for N=3, 2.441 ($2^{20}$ bytes) for N=9, and 1.028 ($2^{20}$ bytes) for N=20; and $U_{max}$ with M=4 is calculated at 4.883 ($2^{20}$ bytes) for N=3, 1.221 ($2^{20}$ bytes) for N=9, and 0.514 ($2^{20}$ bytes) for N=20, as shown in FIG. 24C.

The angle change unit size $U_{size}$ is calculated from the minimum angle change time "t" computed in step S105 and from the AV stream rate $R_{max}$, using the expression (6) above. Thus if the jump distance selected in step S102 is 5,000 sectors, the angle change unit size $U_{size}$ is calculated at 0.312 ($2^{20}$ bytes) with the AV stream rate $R_{max}$ set for $10 \times 10^6$ (bps); the angle change unit size $U_{size}$ is calculated at 0.610 ($2^{20}$ bytes) with the AV stream rate $R_{max}$ set for $20 \times 10^6$ (bps); the angle change unit size $U_{size}$ is calculated at 1.155 ($2^{20}$ bytes) with the AV stream rate $R_{max}$ set for $30 \times 10^6$ (bps); and the angle change unit size $U_{size}$ is calculated at 2.479 ($2^{20}$ bytes) with the AV stream rate $R_{max}$ set for $40 \times 10^6$ (bps), as indicated in FIG. 24A.

If the jump distance selected in step S102 is 20,000 sectors, the angle change unit size $U_{size}$ is calculated at 0.368 ($2^{20}$ bytes) with the AV stream rate $R_{max}$ set for $10 \times 10^6$ (bps); the angle change unit size $U_{size}$ is calculated at 0.754 ($2^{20}$ bytes) with the AV stream rate $R_{max}$ set for $20 \times 10^6$ (bps); the angle change unit size $U_{size}$ is calculated at 1.461 ($2^{20}$ bytes) with the AV stream rate $R_{max}$ set for $30 \times 10^6$ (bps); and the angle change unit size $U_{size}$ is calculated at 3.178 ($2^{20}$ bytes) with the AV stream rate $R_{max}$ set for $40 \times 10^6$ (bps), as shown in FIG. 24B.

If the jump distance selected in step S102 is 40,000 sectors, the angle change unit size $U_{size}$ is calculated at 0.125 ($2^{20}$ bytes) with the AV stream rate $R_{max}$ set for $10 \times 10^6$ (bps); the angle change unit size $U_{size}$ is calculated at 0.945 ($2^{20}$ bytes) with the AV stream rate $R_{max}$ set for $20 \times 10^6$ (bps); the angle change unit size $U_{size}$ is calculated at 1.868 ($2^{20}$ bytes) with the AV stream rate $R_{max}$ set for $30 \times 10^6$ (bps); and the angle change unit size $U_{size}$ is calculated at 4.110 ($2^{20}$ bytes) with the AV stream rate $R_{max}$ set for $40 \times 10^6$ (bps), as shown in FIG. 24C.

In FIGS. 24A through 24C, a mark "OK" is attached to each recording method whereby the maximum size $U_{max}$ of the angle change unit is equal to or greater than the minimum angle change unit size $U_{size}$; and a mark "NG" is given to the recording methods whereby the maximum size $U_{max}$ of the angle change unit does not exceed the minimum angle change unit size $U_{size}$.

Suppose that the angle count setting range is found to include a count of 3 in step S101 and that the jump distance selected in step S102 is 5,000 sectors only. In that case, the AV stream rate $R_{max}$ of $30 \times 10^6$ (bps) is selected if the priority is given to the rate in step S108 and if the number M of consecutive angle change units is set for 2; or the AV stream rate $R_{max}$ of $20 \times 10^6$ (bps) is selected if the priority is given in step S108 to the selection of the recording method type (i.e., number of consecutive angle change units) and if the number M of consecutive angle change units is set for 4. If the jump distance of 20,000 sectors is also selected in step S102, the AV stream rate $R_{max}$ of $40 \times 10^6$ (bps) is selected with the priority given to the rate in step S108 and with the number M of consecutive angle change units set for 2; or the AV stream rate $R_{max}$ of $30 \times 10^6$ (bps) is selected with the priority given in step S108 to the selection of the recording method type and with the number M of consecutive angle change units set for 4. If the jump distance of 40,000 is further selected in step S102, then the AV stream rate $R_{max}$ of $40 \times 10^6$ (bps) is selected with the number M of consecutive angle change units set for 4, regardless of the priority being given to the rate or to the selection of the recording method type in step S108.

Suppose now that the angle count setting range is set for 9 or larger in step S101 and that the jump distance of 5,000 sectors only is selected in step S102. In this case, the AV stream rate $R_{max}$ of $20 \times 10^6$ (bps) is selected with the number M of consecutive angle change units set for 1, regardless of the priority being given to the rate or to the selection of the recording method type in step S108. If the jump distance of 20,000 sectors is also selected in step S102, the AV stream rate $R_{max}$ of $30 \times 10^6$ (bps) is selected with the priority given to the rate in step S108 and with the number M of consecutive angle change units set for 1; or the AV stream rate $R_{max}$ of $10 \times 10^6$ (bps) is selected with the priority given to the selection of the recording method type in step S108 and with the number M of consecutive angle change units set for 4. If the jump distance of 40,000 sectors is further selected in step S108, the AV stream rate $R_{max}$ Of $40 \times 10^6$ (bps) is selected with the priority given to the rate in step S108 and with the number M of consecutive angle change units set for 1; or the AV stream rate $R_{max}$ of $20 \times 10^6$ (bps) is selected with the priority given to the selection of the recording method type in step S108 and with the number M of consecutive angle change units set for 4.

If the angle count setting range is set for 20 or larger in step S101 and if the jump distance of 5,000 sectors only is selected in step S102, then there is no selectable recording method. If the jump distance of 20,000 sectors is selected in step S102, the AV stream rate $R_{max}$ of $20 \times 10^6$ (bps) is selected with the priority given to the rate in step S108 and with the number M of consecutive angle change units set for 1; or the AV stream rate $R_{max}$ of $10 \times 10^6$ (bps) is selected with the priority given to the selection of the recording method type in step S108 and with the number M of consecutive angle change units set for 2. If the jump distance of 40,000 sectors is further selected in step S102, the AV stream rate $R_{max}$ of $30 \times 10^6$ (bps) is selected with the priority given to the rate in step S108 and with the number M of consecutive angle change units set for 1; or the AV stream rate $R_{max}$ of $10 \times 10^6$ (bps) is selected with the priority given to the selection of the recording method type in step S108 and with the number M of consecutive angle change units set for 4.

Through the process described above, it is possible to select the recording method whereby data is recorded with the priority given to the angle count setting range for subsequent seamless data reproduction in compliance with user-designated conditions.

The processes for recording AV stream data, explained above with reference to FIGS. 16 through 24C, may be implemented not only by apparatuses capable of both recording and reproducing data such as the recording/reproducing apparatus 1 in FIG. 4 but also by apparatuses only for recording data. In the foregoing description, the memory 34 was shown holding the table specifying the relations between jump distances and jump times in effect during data reproduction, with the control unit 23 referencing the table in selecting recording methods. However, this is not limitative of the invention. As an alternative, information designating the relations between jump distances and jump times for data reproduction can obviously be input just as effectively from an external source.

Figure 25:
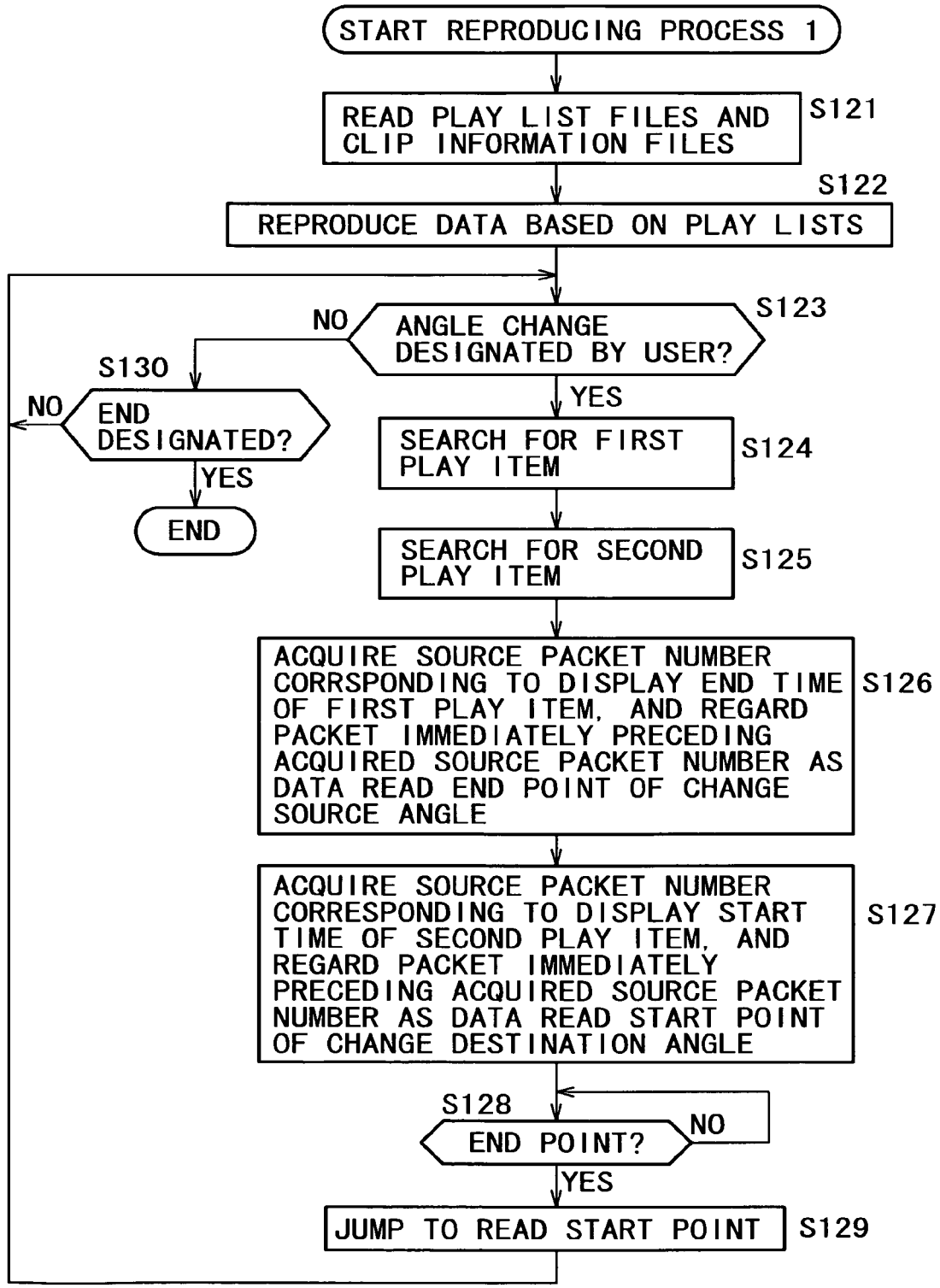
FIG. 25 is a flowchart of steps constituting a reproducing process 1 for reproducing recorded multi-angle AV stream data.

Described below with reference to the flowchart of FIG. 25 is the process for reproducing multi-angle AV stream data recorded as described above. In step S121, the control unit 23 reads from the recording medium 100 all play list files for multi-angle use and the clip information files (including EP_map) of the clips referenced by each of the play lists. This step constitutes a look-ahead operation. Because the EP_map data items are recorded in concentrated fashion, they can be retrieved at high speed.

In step S122, the control unit 23 reproduces AV stream data successively starting from the location identified by the first play item in accordance with the play lists read in step S121. In step S123, the control unit 23 determines whether the user has designated an angle change through the user interface 24.

If in step S123 the user is found to have designated an angle change, step S124 is reached. In step S124, the control unit 23 searches the play list corresponding to the change-source (i.e., currently reproduced) angle for a first play item having the future display end time closest to the current reproduction time. For example, if a change is designated to occur from angle #1 to angle #2 between the timestamps T1 and T2, then the play item a1 is the first play item in question.

In step S125, the control unit 23 searches the play list corresponding to the change-destination angle for a second play item having as its display start time the display end time of the first play item above. If a change is designated to occur from angle #1 to angle #2 between the timestamps T1 and T2 in the example of FIG. 7, then the play item a2 is the second play item in question.

In step S126, the control unit 23 acquires the source packet number corresponding to the display end time of the first play item by looking up EP_map of the clip referenced by the first play item, and regards the source packet immediately preceding the acquired source packet number as the data read end point of the change-source angle.

In step S127, the control unit 23 acquires the source packet number corresponding to the display start time of the second play item by looking up EP_map of the clip referenced by the second play item, and regards the source packet of the acquired source packet number as the data read start point of the change-destination angle.

In step S128, the control unit 23 determines whether the current location has reached the end point calculated in step S126. If the current location is not found to have reached the end point, the control unit 23 waits for the end point to be reached. When the end point is found reached, control is transferred to step S129. In step S129, the control unit 23 causes the reproducing location to jump to the start point calculated in step S127. Step S123 is then reached again and the subsequent steps are repeated.

If in step S123 the user is not found to have designated an angle change, step S130 is reached. In step S130, the control unit 23 determines whether the user designated an end of the ongoing reproduction. If in step S130 an end is not found designated, then step S123 is reached again and the process is repeated. If in step S130 an end of the reproduction is found designated, the reproducing process is terminated.

Figure 26:
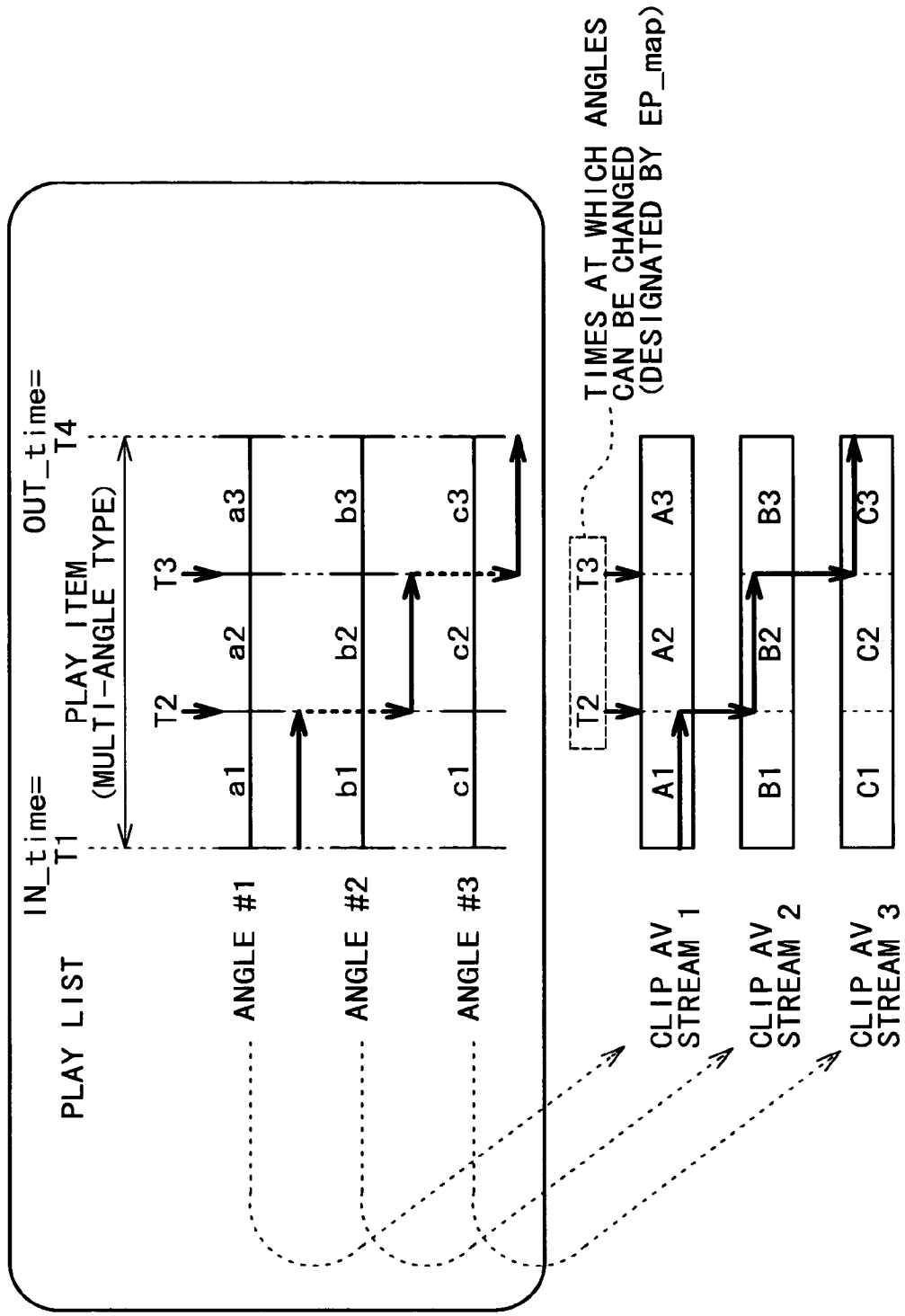
FIG. 26 is a schematic view showing a typical structure of a play list.

FIG. 26 schematically shows another typical structure of a play list for multi-angle use. In the example of FIG. 26, a single multi-angle play list contains a single play item. The play item illustratively has two items of information. The first item is information (designation information) about the AV streams to be referenced as destinations for multi-angle reproduction. In the case of FIG. 26, the first item of information designates angles #1, #2 and #3 referencing clip AV streams 1, 2 and 3 as their destinations respectively. In other words, the designation information points to these destinations (i.e., it serves as pointers). The second item of information is made up of an in-point (IN_time) and an out-point (OUT_time) delimiting the time segment for multi-angle reproduction. In the example of FIG. 26, In_time is. T1 and Out_time is T4. The entry point times representing the angle change points in a given time segment for multi-angle reproduction can be acquired from EP_map of the database (i.e., clip) furnished to the clip AV stream referenced by the first item of information. These entry point times are T2 and T3 in the case of FIG. 26. The structure of EP_map used here is the same as that described earlier with reference to FIG. 14. The entry point times indicative of the angle change points may be acquired from "PTS_EP_start" values of the entries for which "is_AngleChange_point" is "1" in EP_map.

Figure 27:
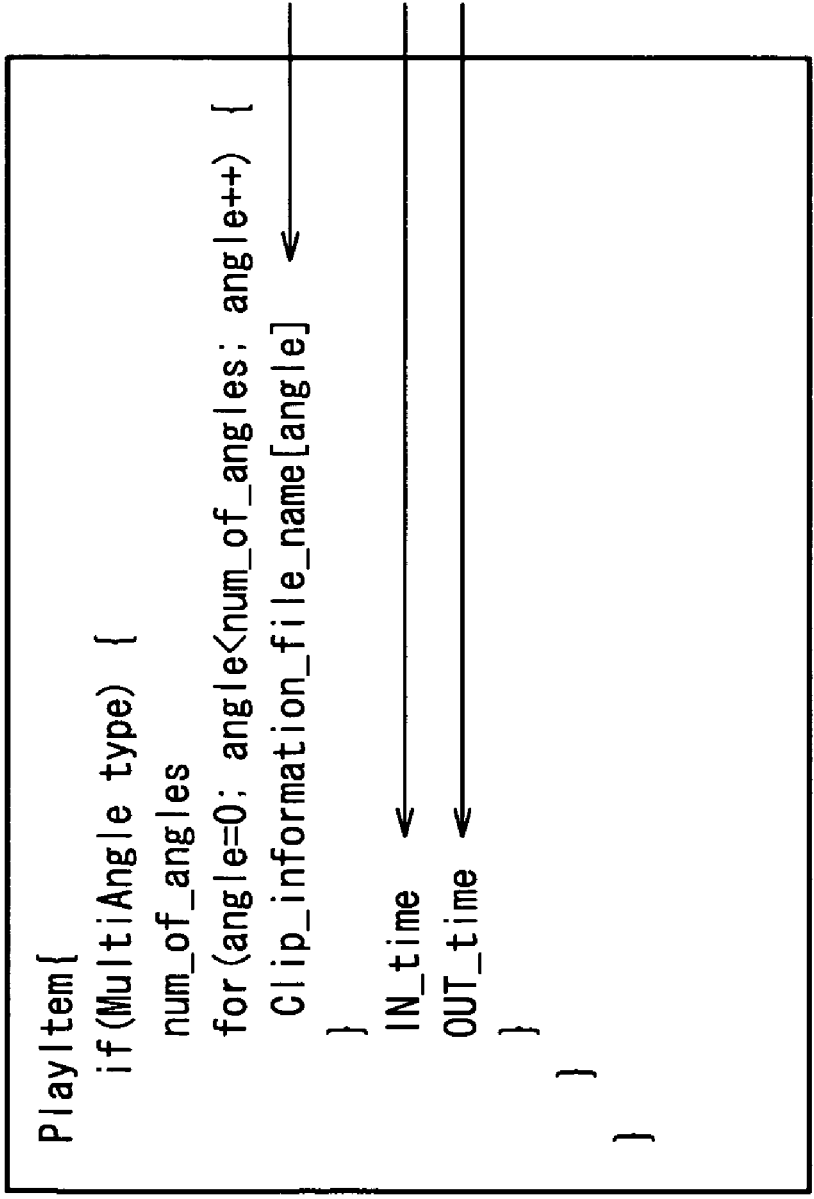
FIG. 27 is a view indicating a syntax of a play item shown in FIG. 26.

FIG. 27 shows a syntax of the play item indicated in FIG. 26. In FIG. 27, "Clip_information_file_name" indicates the AV streams as the destinations to be referenced for use in multi-angle reproduction. In_time and OUT_time delimit the time segment for multi-angle reproduction. Obviously, in the play item of FIGS. 26 and 27, three EP_maps explained with reference to FIG. 14 can be utilized unmodified for conversion from times to data addresses.

Where the play list and play item are structured as shown in FIGS. 26 and 27, the steps for recording AV stream data to the recording medium 100 for multi-angle use are the same as those in the flowchart of FIG. 16 and thus will not be discussed further.

Figure 28:
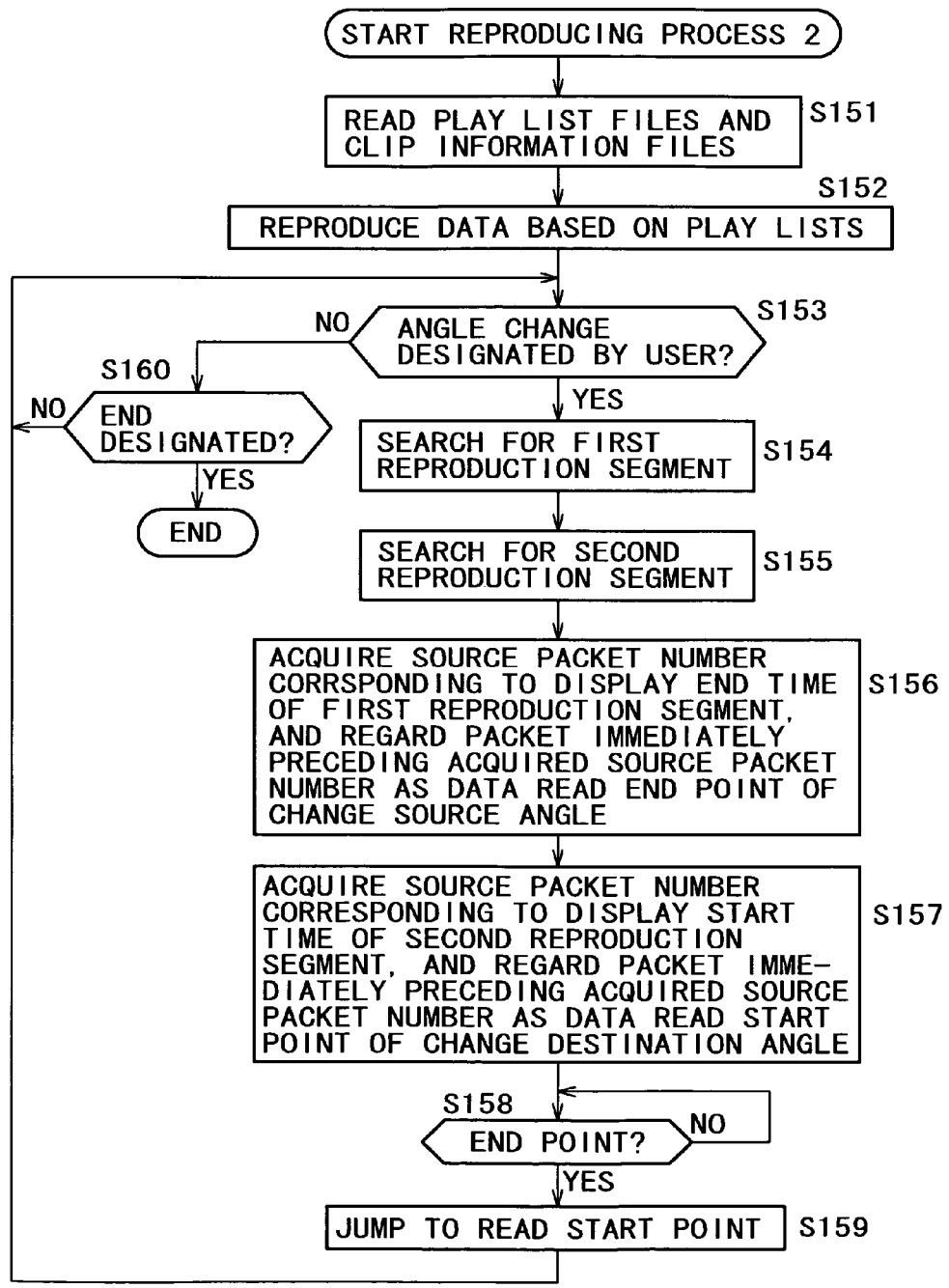
FIG. 28 is a flowchart of steps constituting a reproducing process 2 for reproducing recorded multi-angle AV stream data.

Described below with reference to the flowchart of FIG. 28 is another process (i.e., reproducing process 2) for reproducing recorded multi-angle AV stream data. Steps S151 through S160 are basically the same as steps S121 through 130 in FIG.

25. In step S154, however, the control unit 23 detects not the first play item but a first reproduction segment in the play item. In step S155, the control unit 23 detects not the second play item but a second reproduction segment in the play item. If an angle change is designated to occur from angle #1 to angle #2 between the timestamps T1 and T2 in the example of FIG. 26, the first and the second reproduction segments are the segments a1 and b2.

In step S156, the control unit 23 acquires the source packet number corresponding to the display end time of the segment corresponding to the first reproduction segment by looking up EP_map of the clip referenced by the segment corresponding to the first reproduction segment. In step S157, the control unit 23 acquires the source packet number corresponding to the display start time of the segment corresponding to the second reproduction segment by looking up EP_map of the clip referenced by the segment corresponding to the second reproduction segment. The other steps are the same as their counterparts in FIG. 25 and thus will not be described further. In a multi-angle setup, it is possible to mix seamless-oriented signals with non-seamless-oriented signals that do not guarantee seamless reproduction.

Figure 29:
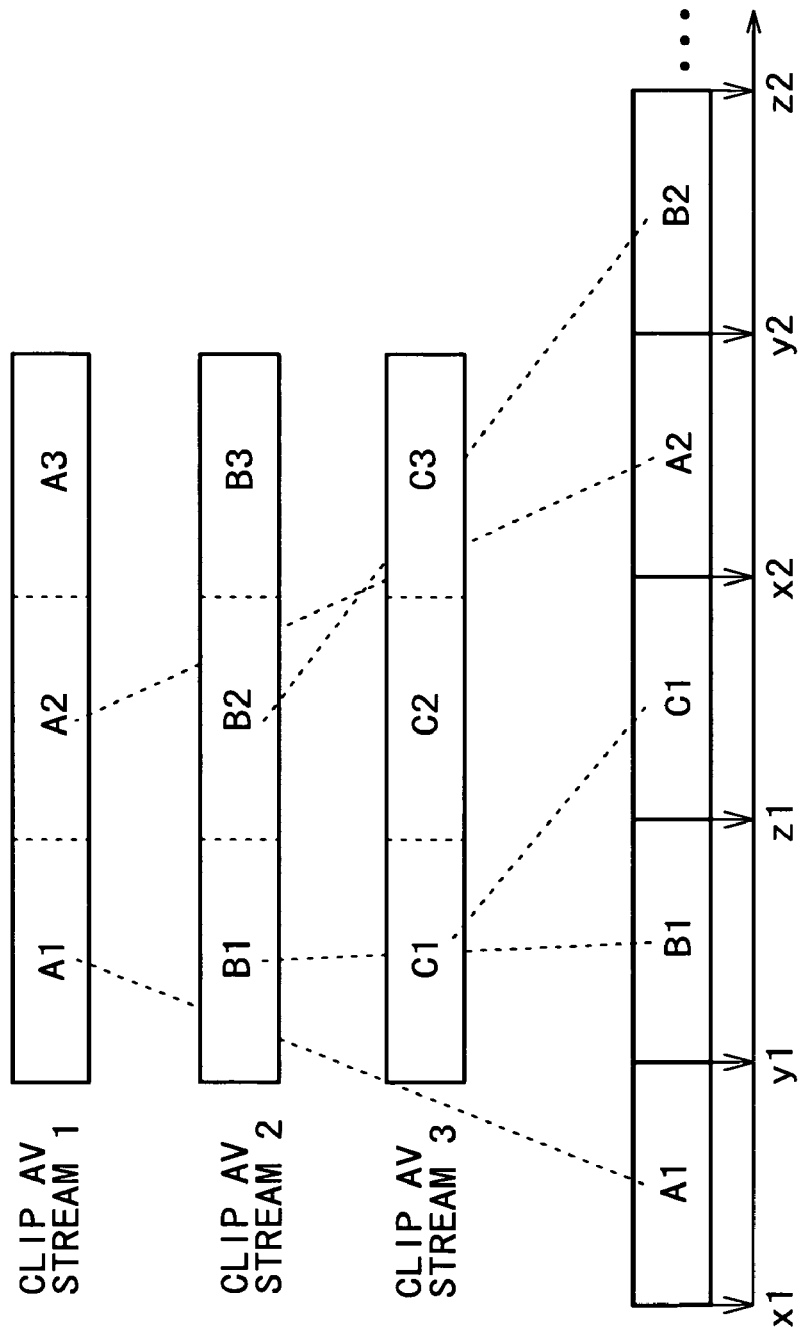
FIG. 29 is a schematic view depicting another structure of the AV stream file.

FIG. 29 schematically depicts another structure of the AV stream file. In the structures of FIGS. 9 and 13, as described earlier, the clip AV streams 1, 2, and 3 are each furnished with EP_map (in the case of FIG. 9, EP_map of the clip information 1 is provided to the clip AV stream 1, EP_map of the clip information 2 to the clip AV stream 2, and EP_map of the clip information 3 to the clip AV stream 3). In the example of FIG. 29, one EP_map is shown furnished illustratively to three clip AV streams (i.e., clip AV streams 1, 2, and 3).

In the case of FIG. 29, the AV stream file is interleaved in the order of AV stream data A1, B1, C1, A2, B2, C2, A3, B3 and C3. Source packet numbers are assigned serially to the source packets in the AV stream file of each of the clip AV streams (i.e., clip AV streams 1, 2, and 3; in the example of FIG. 29, the assigned source packet numbers are x1, y1, z1, x2, y2, z2, x3, y3 and z3.).

Figure 30:
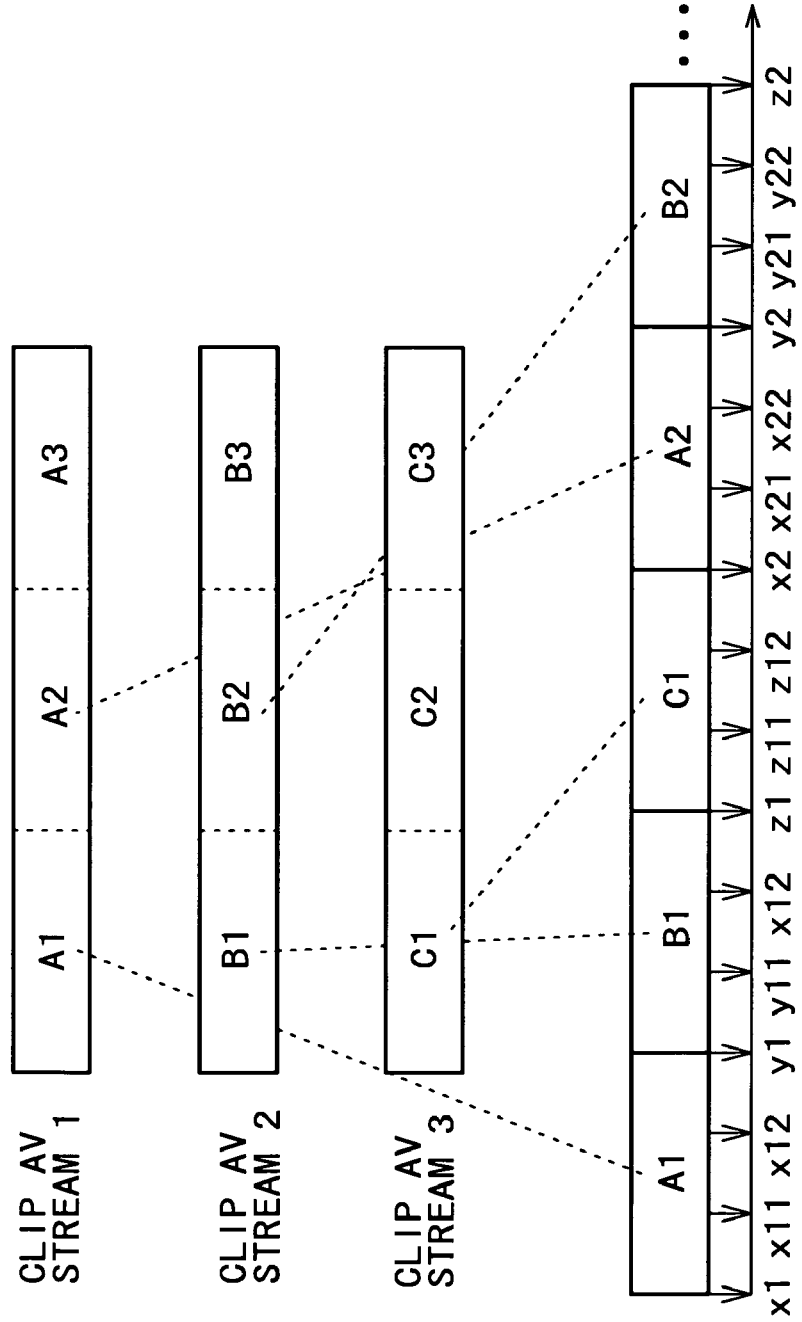
FIG. 30 is a schematic view illustrating yet another structure of the AV stream file.

In FIG. 29, at least two GOP's may be included in the video stream data in each of the AV stream data A1, B1, C1, A2, B2, C2, A3, B3, and C3. In such cases, the second and subsequent GOP's need not be closed GOP's (i.e., they may be unclosed GOP's). However, it is mandatory that encoding be complete within each AV stream data item (e.g., in the AV stream data A1). Suppose that the video stream data in the AV stream data A1 includes one closed GOP and two unclosed GOP's. In this case, as shown in FIG. 30, the source packet numbers are provided illustratively as x1, x11, and x12 in the AV stream file. The source packets having the source packet numbers x11 and x12 correspond to the two unclosed GOP's.

In the example of FIG. 30, the video stream data in the AV stream data B1 also includes on closed GOP and two unclosed GOP's. The source packet numbers are provided illustratively as y1, y11, and y12 in the AV stream file. The source packets with the source packet numbers y11 and y12 correspond to the two unclosed GOP's.

Furthermore, the video stream data in the AV stream data C1 includes one closed GOP and two unclosed GOP's. The source packet numbers are provided illustratively as z1, z11, and z12 in the AV stream file. The source packets with the source packet numbers z11 and z12 correspond to the two unclosed GOP's.

What has been described above regarding the video stream data in the AV stream data A1, B1 and C1 also applies to the AV stream data A2, B2, C2, A3, B3, and C3 in FIG. 30.

Figure 31:
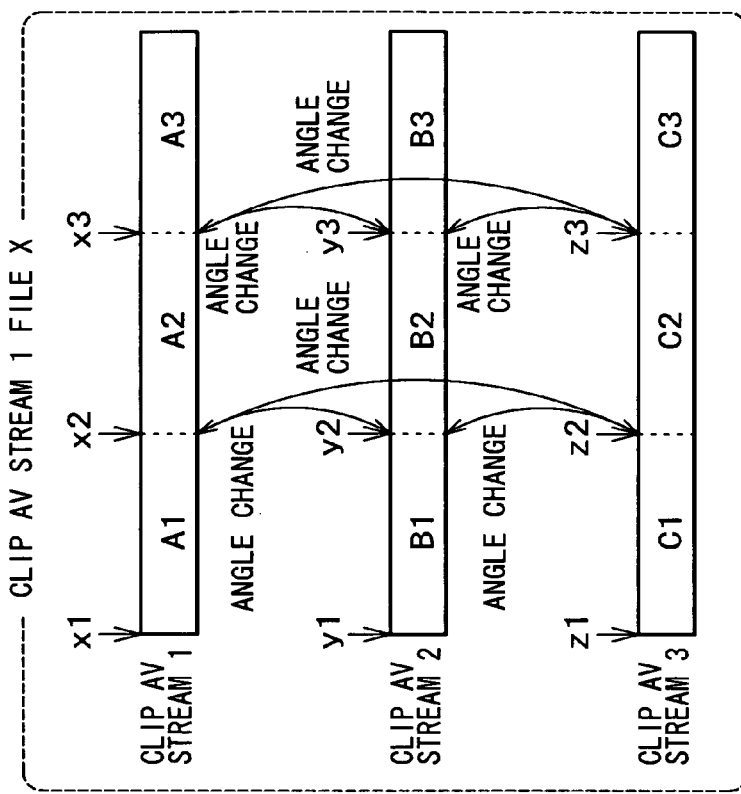
FIG. 31 is a schematic view showing data content of a clip information file included in FIG. 30.

FIG. 31 schematically shows data content of a clip information file included in FIG. 30. The content of the AV stream data A1, B1, C1, A2, B2, C2, A3, B3, and C3 is basically the same as what is shown in FIG. 9 and thus will not be discussed further.

As illustrated in FIG. 31, the clip information file furnished to an AV stream file (clip AV stream file X) has EP_map that describes the relations of correspondence between the timestamps of the entry points in the clip on the one hand, and the source packet numbers from which to start decoding the stream in the clip AV stream file on the other hand.

Each of the entry points in EP_map has field data "is_AngleChange_point," "Angle_number," "PTS_EP_start," and "SPN_EP_start." The data "is_AngleChange_point" indicates whether angles can be changed at the entry point in question. The data "Angle_number," as its name implies, indicates the angle number of the angle to which the entry point in question belongs. The data "SPN_EP_start" indicates the packet number of the entry point in question. The data "PTS_EP_start" indicates the display start time of the entry point in question.

For example, the entry points with their "SPN_EP_start" set for x1, x2 or x3 are points where angles can be changed, so that these points have their data "is_AngleChange_point" set for "1." The entry points with their "SPN_EP_start" set for x11 or x12 are points where angles cannot be changed so that these points have their data "is_AngleChange_point" set for "1." In other words, the data "is_AngleChange_point" signifies that seamless change is not guaranteed even if attempted at an entry point where the data is set for "0," i.e., that the AV stream data is not guaranteed to be supplied continuously at a required bit rate. The same also applies to the entry points with their data "SPN_EP_start" set for y11, y12, z11, or z12.

FIG. 32 shows a syntax of a play item for use in managing the clip AV stream file in FIG. 31. The data "Clip_information_file_name" stands for the reference destination of the AV stream used in multi-angle reproduction (Clip_information_X in the example of FIG. 32). The data "IN_time" (T1 in the case of FIG. 32) and "OUT_time" (T4 in FIG. 32) denote the start and the end points, respectively, of the time segment for multi-angle reproduction. Obviously, in the play item of FIG. 32, the EP_map explained with reference to FIG. 31 is used for conversion from times to data addresses.

The arrangement above allows the clips 1, 2, and 3 to be handled as one file so that the file data may be prevented from getting fragmented. This translates into a less amount of data in the case of FIG. 32 for managing the data in the AV stream file than in the example of FIG. 9.

Figure 33:
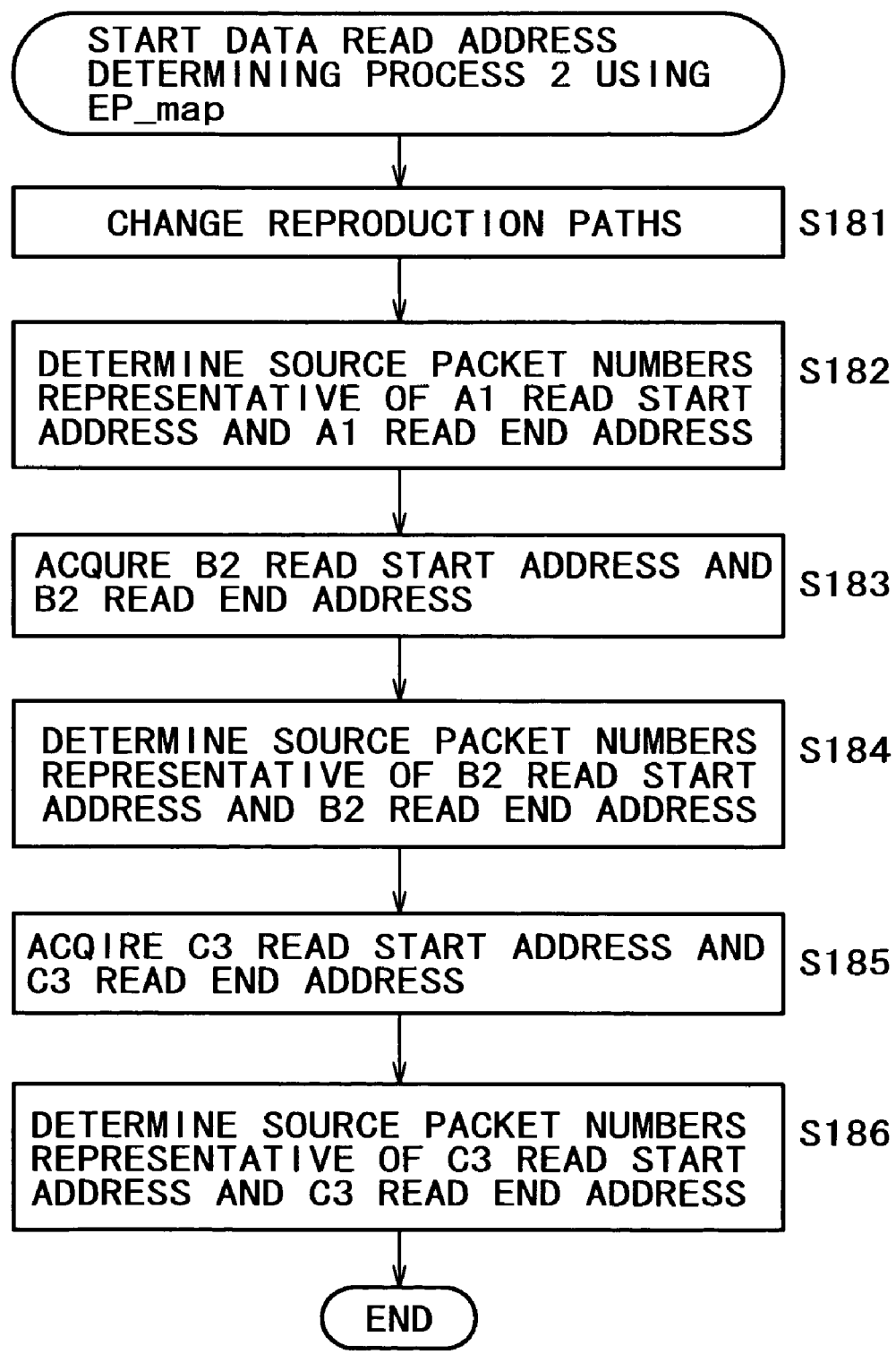
FIG. 33 is a flowchart of steps constituting a data read address determining process 2 using EP_map shown in FIG. 31.

Described below with reference to the flowchart of FIG. 33 is a data read address determining process 2 whereby, through the use of EP_map shown in FIG. 31, angle-changing data reproduction is allowed to proceed from the reproduction segment a1 defined by the first play item of angle #1, to the reproduction segment a2 defined by the second play item of angle #2, and to the reproduction segment a3 defined by the third play item of angle #3.

In step S181, the control unit 23 acquires the read start address and read end address of the AV stream data A1 from the entry point data with "Angle_number" set for "1" in EP_map of FIG. 31, in order to read the AV stream data A1 in the segment corresponding to the reproduction segment a1 defined by the first play item of angle #1. In step S182, the control unit 23 reads from EP_map the source packet number x1 corresponding to the timestamp T1 as the read start address of the AV stream data A1, reads the source packet number y1 corresponding to the timestamp T1 with "Angle_number" set for "2" as the read end address of the AV stream data A1, and determines the source packet number immediately preceding the source packet number y1 (i.e., y1−1, or x12 in this particular case).

In step S183, the control unit 23 acquires the read start address and read end address of the AV stream data B2 from the entry point data with "Angle_number" set for "2" in EP_map of FIG. 31, in order to read the AV stream data B2 in the segment corresponding to the reproduction segment b2 defined by the second play item of angle #2. In step S184, the control unit 23 reads from EP_map the source packet number y2 corresponding to the timestamp T2 as the read start address of the AV stream data B2, reads the source packet number z2 corresponding to the timestamp T2 with "Angle_number" set for "3" as the read end address of the AV stream data B2, and determines the source packet number immediately preceding the source packet number z2 (i.e., z2−1, or y22 in this case).

In step S185, the control unit 23 acquires the read start address and read end address of the AV stream data C3 from the entry point data with "Angle_number" set for "3" in EP_map of FIG. 31, in order to read the AV stream data C3 in the segment corresponding to the reproduction segment c3 defined by the third play item of angle #3. In step S186, the control unit 23 reads from EP_map the source packet number z3 corresponding to the timestamp T3 as the read start address of the AV stream data C3, and determines the last source packet number with "Angle_number" set for "3" as the read end address of the AV stream data C3 (specifically the last source packet number is z32, not shown). The steps above allow the data read addresses to be determined using EP_map in FIG. 31.

The series of steps and processes described above may be executed either by hardware or by software. In any case, the recording/reproducing apparatus 1 may be implemented illustratively in the form of a computer such as one shown in FIG. 34.

In the setup of FIG. 34, a CPU 131 carries out various processes in accordance with programs held in a ROM 132 or with programs loaded from a storage unit 138 into a RAM 133. The RAM 133 may also accommodate data needed by the CPU 131 in executing its processes.

The CPU 131, ROM 132, and RAM 133 are interconnected via a bus 134. An input/output interface 135 is also connected to the bus 134.

The input interface 135 is connected with: an input unit 136 made up of a keyboard and a mouse; an output unit 137 formed by a display unit such as CRT (cathode-ray tube) or LCD (liquid crystal display) and by speakers; the storage unit 138 typically composed of a hard disk drive; and a communication unit 139 constituted by a modem and/or a terminal adapter. The communication unit 139 conducts communications over networks including the Internet (not shown).

Where necessary, the input/output interface 135 is connected with a drive 140 into which a storage medium such as a magnetic disk 151, an optical disk 152, a magneto-optical disk 153, or a semiconductor memory 154 may be loaded. Computer programs retrieved from the loaded storage medium are installed as needed into the storage unit 138.

As shown in FIG. 34, the storage medium carrying the programs to be installed into the computer for execution may be a package medium constituted by the magnetic disk 151 (including floppy disks), optical disk 152 (including CD-ROM (compact disc-read only memory) and DVD (digital versatile disk)), magneto-optical disk 153 (including MD (Mini-disc)), or semiconductor memory 154; or may be offered in the form of the ROM 132 where the programs are stored temporarily or permanently, or hard disks constituting the storage unit 138. The storage medium has the programs recorded thereto as needed through wired or wireless communication means such as local area networks, the Internet, and digital satellite broadcasting networks by way of communication interfaces such as routers and modems.

In this description, the steps which are stored on the program storage medium and which describe the programs to be executed represent not only the processes that are to be carried out in the depicted sequence (i.e., on a time series basis) but also processes that may be performed parallelly or individually. This invention may be applied where AV stream data is recorded to or reproduced from not only DVDs but also other optical disks such as CD-Rs, magneto-optical disks such as MDs, magnetic disks, and other recording media.

In the foregoing description, this invention as embodied in its preferred forms was shown applied to the changing of angles in multi-angle data recording and reproduction. However, this is not limitative of the invention. Alternatively, the invention can also be adapted to the changing of reproduction paths in multi-story and rating control applications.

INDUSTRIAL APPLICABILITY

As described above, the scheme according to the invention enables AV stream data to be recorded and reproduced. In particular, the inventive arrangements allow the user to select recording methods whereby data may be optimally laid out when recorded in such a manner as to let reproduction paths be changed seamlessly during subsequent data reproduction. These features of the invention avert fragmentation of AV stream data in its layout, thus reducing the amount of the AV stream layout information required.

The invention claimed is:

1. An information processing apparatus for recording an AV stream to a recording medium, said information processing apparatus comprising:

generating means for generating said AV stream constituting one of a plurality of reproduction paths, each reproduction path including a plurality of AV segments on a timeline, every reproduction path on the recording medium including at least one AV segment not included in any other of the plurality of reproduction paths;

controlling means for controlling the generation of said AV stream by said generating means;

recording means for recording to said recording medium said AV stream generated by said generating means recording means, the recording means interleaving the plurality of AV segments in increments of a plurality of consecutive angle change units, the plurality of consecutive angle change units being a smallest increment in which angles can be changed; and input means for receiving input from a user of a priority being given to either a stream rate or to a number of consecutive angle change units;

wherein said AV stream is constituted by data blocks making up predetermined units; and wherein said controlling means controls parameters for said AV stream generated by said generating means as well as a layout of said data blocks, in accordance with information indicative of reproducing characteristics in effect when said AV stream recorded on said recording medium is reproduced therefrom, the recording means selecting a best recording method depending on the priority received by the input means and such that a maximum size of an angle change unit exceeds a minimum size of the angle change unit.

2. An information processing apparatus according to claim 1, wherein said information indicative of said reproducing characteristics denotes relations between jump distances between said data blocks recorded in separate locations on one hand, and jump times corresponding respectively to said jump distances on an other hand, for use during reproduction of said AV stream in keeping with said reproduction paths.

3. An information processing apparatus according to claim 1, wherein said parameters for said AV stream under control of said controlling means include a rate of said AV stream.

4. An information processing apparatus according to claim 1, wherein said parameters for said AV stream under control of said controlling means include the number of said reproduction paths.

5. An information processing apparatus according to claim 1, wherein said generating means interleaves said AV stream in such a manner that said plurality of reproduction paths are divided into a predetermined number of said data blocks laid out successively; and wherein said controlling means determines said number of said data blocks in controlling said layout of the interleaved data blocks.

6. An information processing apparatus according to claim 1, further comprising inputting means for admitting an input operation made by a user; wherein, in response to said input operation made by said user through said inputting means, said controlling means controls said parameters for said AV stream generated by said generating means as well as said layout of said data blocks by giving priority to a predetermined parameter among said parameters.

7. An information processing apparatus according to claim 1, further comprising storing means for storing said information indicative of said reproducing characteristics; wherein said controlling means controls said parameters for said AV stream generated by said generating means as well as said layout of said data blocks on the basis of said information indicative of said reproducing characteristics which is stored in said storing means.

8. An information processing apparatus according to claim 1, further comprising reproducing means for reproducing said AV stream recorded on said recording medium; wherein said controlling means controls said parameters for said AV stream generated by said generating means as well as said layout of said data blocks, in accordance with said information indicative of said reproducing characteristics in effect when said AV stream is reproduced by said reproducing means.

9. An information processing apparatus according to claim 1, wherein said controlling means generates first management information which includes map information for indicating locations of entry points of said AV stream and which is used to control AV stream status, said controlling means further generating second management information for managing said reproduction paths by setting up change points of each of said reproduction paths in accordance with said entry points included in said map information; and wherein said recording means further records said first management information and said second management information to said recording medium.

10. An information processing apparatus according to claim 9, wherein said generating means encodes said AV stream in such a manner that said AV stream concludes within each of segments delimited by said change points; and wherein said controlling means creates as said map information a correspondence table describing relations of correspondence between presentation timestamps of said entry points on the one hand and packet numbers on the other hand.

11. An information processing apparatus according to claim 10, wherein said generating means encodes said AV stream in such a manner that each of said segments has a video stream made up of a closed group of packets called the closed GOP starting with an I picture, the first packet of said closed GOP being a video packet; and wherein said AV stream generated by said generating means is included in a transport stream.

12. An information processing apparatus according to claim 11, wherein, on all said reproduction paths, said generating means uses an identical value representing packet ID's of the video packets in said transport stream as well as an identical value representing packet ID's of audio packets in said transport stream.

13. An information processing apparatus according to claim 11, further comprising source packetizing means for turning said transport stream in each of said segments into source packets; wherein said recording means records said transport stream which has been turned into source packets in each of said segments by said source packetizing means, to said recording medium as an AV stream file.

14. An information processing apparatus according to claim 10, wherein said correspondence table further includes change information indicating whether it is possible to change said reproduction paths at each of said entry points; and wherein said controlling means sets said change points on the basis of said change information.

15. An information processing apparatus according to claim 1, wherein said controlling means generates first management information which includes map information for indicating locations of starting points of said AV stream on each of said reproduction paths as well as locations of entry points of the AV streams and which is used to control AV stream status, said controlling means further generating second management information which includes designation information for designating a starting point and an end point of each of said AV streams and for designating the AV stream for each of said reproduction paths and which is used for reproduction management; and wherein said recording means further records said first management information and said second management information to said recording medium.

16. An information processing apparatus according to claim 15, wherein said generating means encodes said AV stream in such a manner that said AV stream concludes within each of segments delimited by said change points; and wherein said controlling means creates a correspondence table describing relations of correspondence between presentation timestamps of said entry points on one hand and packet numbers on an other hand.

17. An information processing apparatus according to claim 16, wherein said generating means encodes said AV stream in such a manner that each of said segments has a video stream made up of a closed group of packets called the closed GOP starting with an I picture, the first packet of said closed GOP being a video packet; and wherein said AV stream generated by said generating means is included in a transport stream.

18. An information processing apparatus according to claim 17, further comprising source packetizing means for turning said transport stream in each of said segments into source packets; wherein said recording means records said transport stream which has been turned into source packets in each of said segments by said source packetizing means, to said recording medium as an AV stream file.

19. An information processing apparatus according to claim 18, wherein said controlling means creates said correspondence table corresponding to each of the AV stream files.

20. An information processing apparatus according to claim 16, wherein said generating means encodes said AV stream in such a manner that each of said segments has a video stream headed by a closed group of packets called the closed GOP, the rest of said video stream comprising unclosed GOP's.

21. An information processing method for use with an information processing apparatus for recording an AV stream to a recording medium, said information processing method comprising:

determining parameters for said AV stream as well as a layout of data blocks constituting said AV stream, in accordance with information indicative of reproducing characteristics in effect when said AV stream recorded on said recording medium is reproduced therefrom;

generating said AV stream constituting one of a plurality of reproduction paths based on said parameters for said AV stream and on said layout of said data blocks determined in said determining along with said parameters, each reproduction path including a plurality of AV segments on a timeline, every reproduction path on the recording medium including at least one AV segment not included in any other of the plurality of reproduction paths;

receiving input from a user of a priority being given to either a stream rate or to a number of consecutive angle change units;

selecting a best recording method depending on the priority and such that a maximum size of an angle change unit exceeds a minimum size of the angle change unit; and controlling, by a processor, the recording to said recording medium using the best recording method of said AV stream generated in said generating, the controlling including interleaving the plurality of AV segments in increments of a plurality of consecutive angle change units, the plurality of consecutive angle change units being a smallest increment in which angles can be changed.

22. A non-transitory computer readable program storage medium which stores a program for causing a computer to perform a method to record an AV stream to a recording medium, said method comprising:

determining parameters for said AV stream as well as a layout of data blocks constituting said AV stream, in accordance with information indicative of reproducing characteristics in effect when said AV stream recorded on said recording medium is reproduced therefrom;

generating said AV stream constituting one of a plurality of reproduction paths based on said parameters for said AV stream and on said layout of said data blocks determined in said determining along with said parameters, each reproduction path including a plurality of AV segments on a timeline, every reproduction path on the recording medium including at least one AV segment not included in any other of the plurality of reproduction paths;

receiving input from a user of a priority being given to either a stream rate or to a number of consecutive angle change units;

selecting a best recording method depending on the priority and such that a maximum size of an angle change unit exceeds a minimum size of the angle change unit; and controlling, by a processor, the recording to said recording medium using the best recording method of said AV stream generated in said generating, the controlling including interleaving the plurality of AV segments in increments of a plurality of consecutive angle change units, the plurality of consecutive angle change units being a smallest increment in which angles can be changed.

23. An information processing apparatus for recording an AV stream to a recording medium, said information processing apparatus comprising:

an AV stream generator configured to generate said AV stream constituting one of a plurality of reproduction paths, each reproduction path including a plurality of AV segments on a timeline, every reproduction path on the recording medium including at least one AV segment not included in any other of the plurality of reproduction paths;

a controller configured to control generation of said AV stream by said AV stream generator;

input means for receiving input from a user of a priority being given to either a stream rate or to a number of consecutive angle change units; and a recorder, including a processor, configured to record to said recording medium said AV stream generated by said AV stream generator, the recorder configured to interleave the plurality of AV segments in increments of a plurality of consecutive angle change units, the plurality of consecutive angle change units being a smallest increment in which angles can be changed, wherein said AV stream is constituted by data blocks making up predetermined units, and said controller is configured to control parameters for said AV stream generated by said AV stream generator as well as a layout of said data blocks in accordance with information indicative of reproducing characteristics in effect when said AV stream recorded on said recording medium is reproduced therefrom, the recorder configured to select a best recording method depending on the priority received by the input means and such that a maximum size of an angle change unit exceeds a minimum size of the angle change unit.

24. An information processing apparatus according to claim 23, wherein each reproduction path includes a plurality of AV segments corresponding with AV segments in other reproduction paths, corresponding AV segments in different reproduction paths having identical start and end times.

25. An information processing apparatus according to claim 23, wherein a number of the plurality consecutive angle change units is based on an access speed of a drive reproducing data from the recording medium.

26. An information processing apparatus according to claim 23, wherein a number of the plurality of consecutive angle change units is based on an amount of management data in file data.

27. An information processing apparatus according to claim 23, wherein a number of the plurality of consecutive angle change units is selected by a user.

* * * * *